(12) United States Patent
Rai et al.

(10) Patent No.: US 6,393,482 B1
(45) Date of Patent: May 21, 2002

(54) INTER-WORKING FUNCTION SELECTION SYSTEM IN A NETWORK

(75) Inventors: Girish Rai, Bartlett; Philip M. Parsons, Lisle, both of IL (US); Mooi Chuah, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/138,905

(22) Filed: Aug. 24, 1998

Related U.S. Application Data
(60) Provisional application No. 60/061,915, filed on Oct. 14, 1997.

(51) Int. Cl.[7] .............................................. G06F 13/00
(52) U.S. Cl. ....................... 709/225; 709/217; 709/238; 709/245
(58) Field of Search ................................. 709/225, 224, 709/223, 203, 217, 218, 200, 201, 220, 227, 228, 238, 239, 245; 713/201

(56) References Cited

U.S. PATENT DOCUMENTS

| | | | | |
|---|---|---|---|---|
| 5,841,970 A | * | 11/1998 | Takaaki ....................... 713/201 |
| 5,878,348 A | * | 3/1999 | Foti ............................ 455/434 |
| 6,075,783 A | * | 6/2000 | Voit ............................ 370/352 |
| 6,094,578 A | * | 7/2000 | Purcell et al. ............... 455/426 |
| 6,115,390 A | * | 9/2000 | Chuah ........................ 370/443 |
| 6,137,791 A | * | 10/2000 | Frid et al. ................... 370/352 |
| H1918 H | * | 11/2000 | Hoffpauir et al. ........... 379/242 |
| 6,148,204 A | * | 11/2000 | Urs et al. ................... 455/435 |
| 6,151,628 A | * | 11/2000 | Xu et al. .................... 709/225 |

* cited by examiner

Primary Examiner—Moustafa M. Meky
(74) Attorney, Agent, or Firm—Morgan & Finnegan

(57) ABSTRACT

An inter-working function selection system in a coupled data network is disclosed. The coupled data network includes a foreign network and a home network. The foreign network includes a foreign mobile switching center with a serving registration server. The home network includes a home mobile switching center with a home registration server and a plurality of unassigned home inter-working functions. A first end system is a subscriber to the home network and operates within the foreign network. The first end system includes an end registration agent to form a registration request, the end registration agent sending the registration request through the serving registration server to the home registration server, the home registration server including a module to select an active home inter-working function from the plurality of unassigned home inter-working functions based on the registration request.

65 Claims, 31 Drawing Sheets

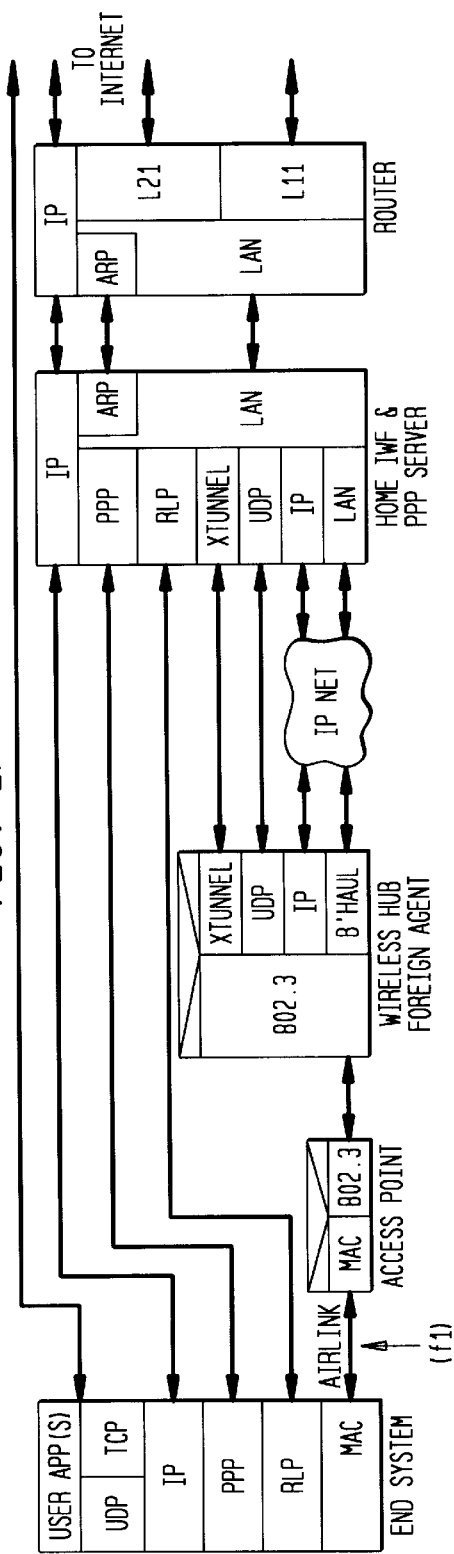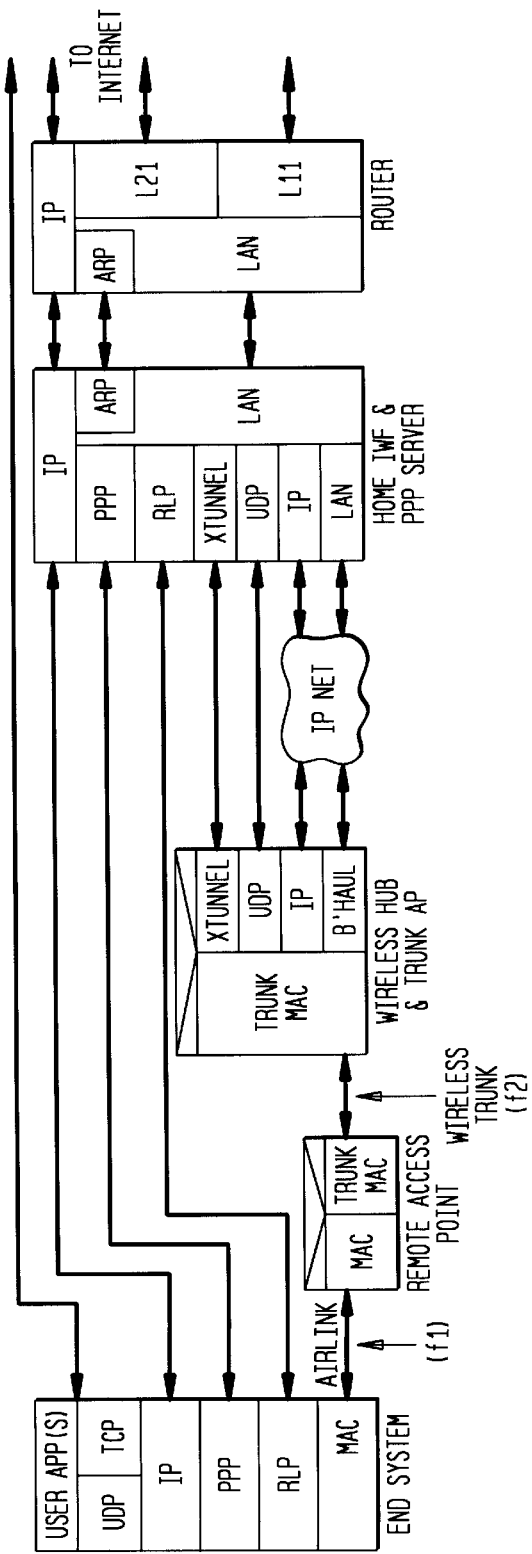

FIG. 27   PROTOCOL STACKS FOR ROAMING MOBILE WHERE HOME IWF IS ALSO A PPP SERVER

FIG. 28 PROTOCOL STACKS FOR ROAMING MOBILE WHERE HOME IWF AND PPP SERVER ARE SEPARATE

LOCAL HANDOFF

INTER-WORKING FUNCTION SELECTION SYSTEM IN A NETWORK

Priority benefit of the Oct. 14, 1997 filing date of provisional application serial No. 60/061,915 is hereby claimed.

BACKGROUND OF THE INVENTION

1. Field of the Invention

The present invention relates to a coupled data network, and more particularly to an inter-working function selection system in the coupled data network.

2. Description of Related Art

FIG. 1 depicts three business entities, whose equipment, working together typically provide remote internet access to user computers 2 through user modems 4. User computers 2 and modems 4 constitute end systems.

The first business entity is the telephone company (telco) that owns and operates the dial-up plain old telephone system (POTS) or integrated services data network (ISDN) network. The telco provides the media in the form of public switched telephone network (PSTN) 6 over which bits (or packets) can flow between users and the other two business entities.

The second business entity is the internet service provider (ISP). The ISP deploys and manages one or more points of presence (POPs) 8 in its service area to which end users connect for network service. An ISP typically establishes a POP in each major local calling area in which the ISP expects to subscribe customers. The POP converts message traffic from the PSTN run by the telco into a digital form to be carried over intranet backbone 10 owned by the ISP or leased from an intranet backbone provider like MCI, Inc. An ISP typically leases fractional or full T1 lines or fractional or full T3 lines from the telco for connectivity to the PSTN. The POPs and the ISP's medium data center 14 are connected together over the intranet backbone through router 12A. The data center houses the ISP's web servers, mail servers, accounting and registration servers, enabling the ISP to provide web content, e-mail and web hosting services to end users. Future value added services may be added by deploying additional types of servers in the data center. The ISP also maintains router 12A to connect to public internet backbone 20. In the current model for remote access, end users have service relationships with their telco and their ISP and usually get separate bills from both. End users access the ISP, and through the ISP, public internet 20, by dialing the nearest POP and running a communication protocol known as the Internet Engineering Task Force (IETF) point-to-point protocol (PPP).

The third business entity is the private corporation which owns and operates its own private intranet 18 through router 12B for business reasons. Corporate employees may access corporate network 18 (e.g., from home or while on the road) by making POTS/ISDN calls to corporate remote access server 16 and running the IETF PPP protocol. For corporate access, end users only pay for the cost of connecting to corporate remote access server 16. The ISP is not involved. The private corporation maintains router 12B to connect an end user to either corporate intranet 18 or public internet 20 or both.

End users pay the telco for the cost of making phone calls and for the cost of a phone line into their home. End users also pay the ISP for accessing the ISP's network and services. The present invention will benefit wireless service providers like Sprint PCS, PrimeCo, etc. and benefit internet service providers like AOL, AT&T Worldnet, etc.

Today, internet service providers offer internet access services, web content services, e-mail services, content hosting services and roaming to end users. Because of low margins and no scope of doing market segmentation based on features and price, ISPs are looking for value added services to improve margins. In the short term, equipment vendors will be able to offer solutions to ISPs to enable them to offer faster access, virtual private networking (which is the ability to use public networks securely as private networks and to connect to intranets), roaming consortiums, push technologies and quality of service. In the longer term, voice over internet and mobility will also be offered. ISPs will use these value added services to escape from the low margin straitjacket. Many of these value added services fall in the category of network services and can be offered only through the network infrastructure equipment. Others fall in the category of application services which require support from the network infrastructure, while others do not require any support form the network infrastructure. Services like faster access, virtual private networking, roaming, mobility, voice, quality of service, quality of service based accounting all need enhanced network infrastructure. The invention described here will be either directly provide these enhanced services or provide hooks so that these services can be added later as future enhancements. Wireless service providers will be able to capture a larger share of the revenue stream. The ISP will be able to offer more services and with better market segmentation.

SUMMARY OF THE INVENTION

The present invention provide end users with remote wireless access to the public internet, private intranets and internet service providers. Wireless access is provided through base stations in a home network and base stations in foreign networks with interchange agreements.

It is an object of the present invention to provide a wireless packet switched data network for end users that divides mobility management into local, micro, macro and global connection handover categories and minimizes handoff updates according to the handover category. It is another object to integrate MAC handoff messages with network handoff messages. It is a further object of the present invention to separately direct registration functions to a registration server and direct routing functions to inter-working function units. It is yet another object to provide an intermediate XTunnel channel between a wireless hub (also called access hub AH) and an inter-working function unit (IWF unit) in a foreign network. It is yet another object to provide an IXTunnel channel between an inter-working function unit in a foreign network and an inter-working function unit in a home network. It is yet another object to enhance the layer two tunneling protocol (L2TP) to support a mobile end system. It is yet another object to perform network layer registration before the start of a PPP communication session.

According to one embodiment of the invention, and inter-working function selection system in a coupled data network is disclosed. The coupled data network includes a foreign network and a home network. The foreign network includes a foreign mobile switching center with a serving registration server. The home network includes a home mobile switching center with a home registration server and a plurality of unassigned home inter-working functions. A first end system is a subscriber to the home network and operates within the foreign network. The first end system includes and end registration agent to form a registration request, the end registration agent sending the registration request through the serving registration server to the home registration server, the home registration server including a nodule to select an active home inter-working function from the plurality of unassigned home inter-working functions based on the registration request.

According to another embodiment of the invention, a data network with a home network is disclosed. The home network includes a home mobile switching center with a home registration server and a plurality of unassigned home inter-working functions. A first end system is a subscriber to the home network and operates within the foreign network. The first end system includes an end registration agent to form a registration request, the end registration agent sending the registration request through the serving registration server to the home registration server, the home registration server including a module to select an active home inter-working function from the plurality of unassigned home inter-working functions based on the registration request.

BRIEF DESCRIPTION OF DRAWINGS

The invention will be described in detail in the following description of preferred embodiments with reference to the following figures wherein:

FIG. 17 is a configuration diagram of protocol stacks showing communications between an end system in a home network and an inter-working function in the home network where the cell site has local access points;

FIG. 18 is a configuration diagram of protocol stacks showing communications between an end system in a home network and an inter-working function in the home network where the cell site has remote access points coupled to a wireless hub through a wireless trunk;

DETAILED DESCRIPTION OF PREFERRED EMBODIMENTS

Figure 1:
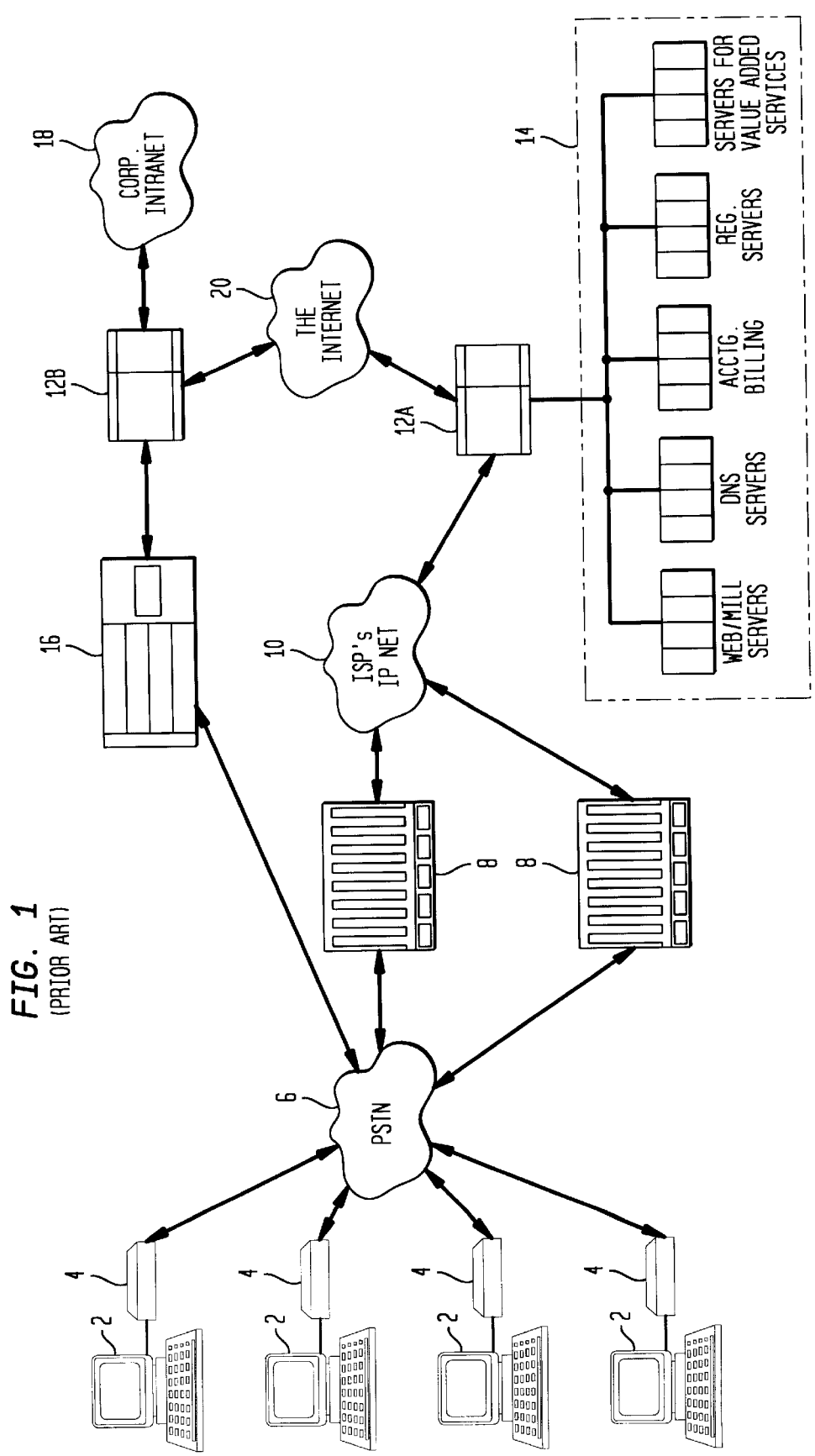
FIG. 1 is a configuration diagram of a known remote access architecture through a public switched telephone network.

The present invention provides computer users with remote access to the internet and to private intranets using virtual private network services over a high speed, packet switched, wireless data link. These users are able to access the public internet, private intranets and their internet service providers over a wireless link. The network supports roaming, that is, the ability to access the internet and private intranets using virtual private network services from anywhere that the services offered by the present system are available. The network also supports handoffs, that is, the ability to change the point of attachment of the user to the network without disturbing the PPP link between the PPP client and the PPP server. The network targets users running horizontal internet and intranet applications. These applications include electronic mail, file transfer, browser based WWW access and other business applications built around the internet. Because the network will be based on the IETF standards, it is possible to run streaming media protocols like RTP and conferencing protocols like H.323 over it.

Other internet remote access technologies that are already deployed or are in various stages of deployment include: wire line dial-up access based on POTS and ISDN, XDSL access, wireless circuit switched access based on GSM/CDMA/TDMA, wireless packet switched access based on GSM/CDMA/TDMA, cable modems, and satellite based systems. However, the present system offers a low cost of deployment, ease of maintenance, a broad feature set, scaleability, an ability to degrade gracefully under heavy load conditions and support for enhanced network services like virtual private networking, roaming, mobility and quality of service to the relative benefit of users and service providers.

For wireless service providers who own personal communications system (PCS) spectrum, the present system will enable them to offer wireless packet switched data access services that can compete with services provided by the traditional wire line telcos who own and operate the PSTN. Wireless service providers may also decide to become internet service providers themselves, in which case, they will own and operate the whole network and provide end to end services to users.

For internet service providers the present system will allow them to by-pass the telcos (provided they purchase or lease the spectrum) and offer direct end to end services to users, perhaps saving access charges to the telcos, which may increase in the future as the internet grows to become even bigger than it is now.

The present systems flexible so that it can benefit wireless service providers who are not internet service providers and who just provide ISP, internet or private intranet access to end users. The system can also benefit service providers who provide wireless access and internet services to end users. The system can also benefit service providers who provide wireless access and internet services but also allow the wireless portion of the network to be used for access to other ISPs or to private intranets.

Figure 2:
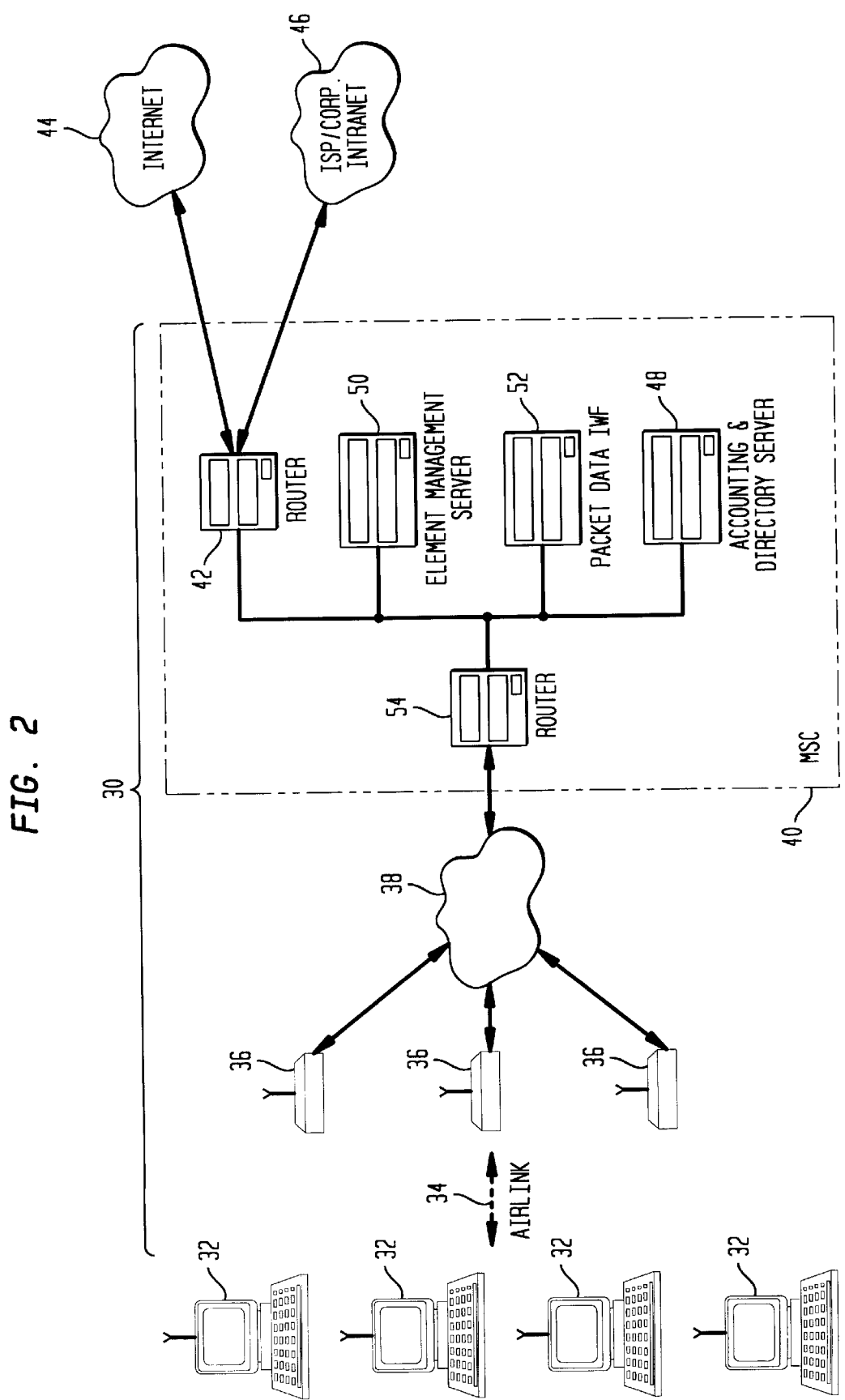
FIG. 2 is a configuration diagram of a remote access architecture through a wireless packet switched data network according to the present invention.

In FIG. 2, end systems 32 (e.g., based on, for example, Win 95 personal computer) connect to wireless network 30 using external or internal modems. These modems allow end systems to send and receive medium access control (MAC) frames over air link 34. External modems attach to the PC via a wired or wireless link. External modems are fixed, and, for example, co-located with roof top mounted directional antennae. External modems may be connected to the user's PC using any one of following means: 802.3, universal serial bus, parallel port, infra-red, or even an ISM radio link. Internal modems are preferably PCMCIA cards for laptops and are plugged into the laptop's backplane. Using a small omni-directional antenna, they send and receive MAC frames over the air link. End systems can also be laptops with a directional antenna, a fixed wireless station in a home with a directional antenna connected via AC lines, and other alternatives.

Wide-area wireless coverage is provided by base stations 36. The base station 36 can employ a 5-channel reuse communication scheme as described in U.S. patent application Ser. No. 08/998,505, filed on Dec. 26, 1997, still pending. The range of coverage provided by base stations 36 depends on factors like link budget, capacity and coverage. Base stations are typically installed in cell sites by PCS (personal communication services) wireless service providers. Base stations multiplex end system traffic from their coverage area to the system's mobile switching center (MSC) 40 over wire line or microwave backhaul network 38.

The system is independent of the MAC and PHY (physical) layer of the air link and the type of modem. The architecture is also independent of the physical layer and topology of backhaul network 38. The only requirements for the backhaul network are that it must be capable of routing internet protocol (IP) packets between base stations and the MSC with adequate performance. At Mobile Switching Center 40 (MSC 40), packet data inter-working function (IWF) 52 terminates the wireless protocols for this network. IP router 42 connects MSC 40 to public internet 44, private intranets 46 or to internet service providers 46. Accounting and directory servers 48 in MSC 40 store accounting data and directory information. Element management server 50 manages the equipment which includes the base stations, the IWFs and accounting/directory servers.

The accounting server will collect accounting data on behalf of users and send the data to the service provider's billing system. The interface supported by the accounting server will send accounting information in American Management Association (AMA) billing record format, or any other suitable billing format, over a TCP/IP (transport control protocol/internet protocol) transport to the billing system (which is not shown in the figure).

The network infrastructure provides PPP (point-to-point protocol) service to end systems. The network provides (1) fixed wireless access with roaming (log-in anywhere that the wireless coverage is available) to end systems and (2) low speed mobility and hand-offs. When an end system logs on to a network, in it may request either fixed service (i.e., stationary and not requiring handoff services) or mobile service (i.e., needing handoff services). An end system that does not specify fixed or mobile is regarded as specifying mobile service. The actual registration of the end system is the result of a negotiation with a home registration server based on requested level of service, the level of services subscribed to by the user of the end system and the facilities available in the network.

If the end system negotiates a fixed service registration (i.e., not requiring handoff services) and the end system is located in the home network, an IWF (inter-working function) is implemented in the base station to relay traffic between the end user and a communications server such as a PPP server (i.e., the point with which to be connected, for example, an ISP PPP server or a corporate intranet PPP server or a PPP server operated by the wireless service provider to provide customers with direct access to the public internet). It is anticipated that perhaps 80% of the message traffic will be of this category, and thus, this architecture distributes IWF processing into the base stations and avoids message traffic congestion in a central mobile switching center.

If the end system requests mobile service (from a home network or a foreign network) or if the end system request roaming service (i.e., service from the home network through a foreign network), two IWFs are established: a serving IWF typically established in the base station of the network to which the end system is attached (be it the home network or a foreign network) and a home IWF typically established in mobile switching center MSC of the home network. Since this situation is anticipated to involve only about 20% of the message traffic, the message traffic congestion around the mobile switching center is minimized. The serving IWF and the wireless hub may be co-located in the same nest of computers or may even be programmed in the same computer so that a tunnel using an XTunnel protocol need not be established between the wireless hub and the serving IWF.

However, based on available facilities and the type and quality of service requested, a serving IWF in a foreign network may alternatively be chosen from facilities in the foreign MSC. Generally, the home IWF becomes an anchor point that is not changed during the communications session, while the serving IWF may change if the end system moves sufficiently.

The base station includes an access hub and at least one access point (be it remote or collocated with the access hub). Typically, the access hub serves multiple access points. While the end system may be attached to an access point by a wire or cable according to the teachings of this invention, in a preferred embodiment the end system is attached to the access point by a wireless "air link", in which case the access hub is conveniently referred to as a wireless hub. While the access hub is referred to as a "wireless hub" throughout the description herein, it will be appreciated that an end system coupled through an access point to an access hub by wire or cable is an equivalent implementation and is contemplated by the term "access hub".

In the invention, an end system includes an end user registration agent (e.g., software running on a computer of the end system, its modem or both) that communicates with an access point, and through the access point to a wireless hub. The wireless hub includes a proxy registration agent (e.g., software running on a processor in the wireless hub) acting as a proxy for the end user registration agent. Similar concepts used in, for example, the IETF proposed Mobile P standard are commonly referred to as a foreign agent (FA). For this reason, the proxy registration agent of the present system will be referred to as a foreign agent, and aspects of the foreign agent of the present system that differ from the foreign agent of Mobile IP are as described throughout this description.

Using the proxy registration agent (i.e., foreign agent FA) in a base station, the user registration agent of an end system is able to discover a point of attachment to the network and register with a registration server in the MSC (mobile switching center) of the home network. The home registration server determines the availability of each of the plural inter-working function modules (IWFs) in the network (actually software modules that run on processors in both the MSC and the wireless hubs) and assigns IWF(s) to the registered end system. For each registered end system, a tunnel (using the XTunnel protocol) is created between the wireless hub in the base station and an inter-working function (IWF) in the mobile switching center (MSC), this tunnel transporting PPP frames between the end system and the IWF.

As used herein, the XTunnel protocol is a protocol that provides in-sequence transport of PPP data frames with flow control. This protocol may run over standard IP networks or over point-to-point networks or over switched networks like ATM data networks or frame relay data networks. Such networks may be based on T1 or T3 links or based on radio links, whether land based or space based. The XTunnel protocol may be built by adapting algorithms from L2TP (level 2 transport protocol). In networks based on links where lost data packets may be encountered, a re-transmission feature may be a desirable option.

The end system's PPP peer (i.e., a communications server) may reside in the IWF or in a corporate intranet or ISP's network. When the PPP peer resides in the IWF, an end system is provided with direct internet access. When the PPP peer resides in an intranet or ISP, an end system is provided with intranet access or access to an ISP. In order to support intranet or ISP access, the IWF uses the layer two tunneling protocol (L2TP) to connect to the intranet or ISP's PPP server. From the point of view of the intranet or ISP's PPP server, the IWF looks like a network access server (NAS). PPP traffic between the end system and the IWF is relayed by the foreign agent in the base station.

In the reverse (up link) direction, PPP frames traveling from the end system to the IWF are sent over the MAC and air link to the base station. The base station relays these frames to the IWF in the MSC using the XTunnel protocol. The IWF delivers them to a PPP server for processing. For internet access, the PPP server may be in the same machine as the IWF. For ISP or intranet access, the PPP server is in a private network and the IWF uses the layer two tunneling protocol (L2TP) to connect to it.

In the forward (down link) direction, PPP frames from the PPP server are relayed by the IWF to the base station using the XTunnel protocol. The base station de-tunnels down link frames and relays them over the air link to the end system, where they are processed by the end system's PPP layer.

To support mobility, support for hand-offs are included. The MAC layer assists the mobility management software in the base station and the end system to perform hand-offs efficiently. Hand-offs are handled transparently from the peer PPP entities and the L2TP tunnel. If an end system moves from one base station to another, a new XTunnel is created between the new base station and the original IWF. The old XTunnel from the old base station will be deleted. PPP frames will transparently traverse the new path.

The network supports roaming (i.e., when the end user connects to its home wireless service provider through a foreign wireless service provider). Using this feature, end systems are able to roam away from the home network to a foreign network and still get service, provided of course that the foreign wireless service provider and the end system's home wireless service provider have a service agreement.

Figure 3:
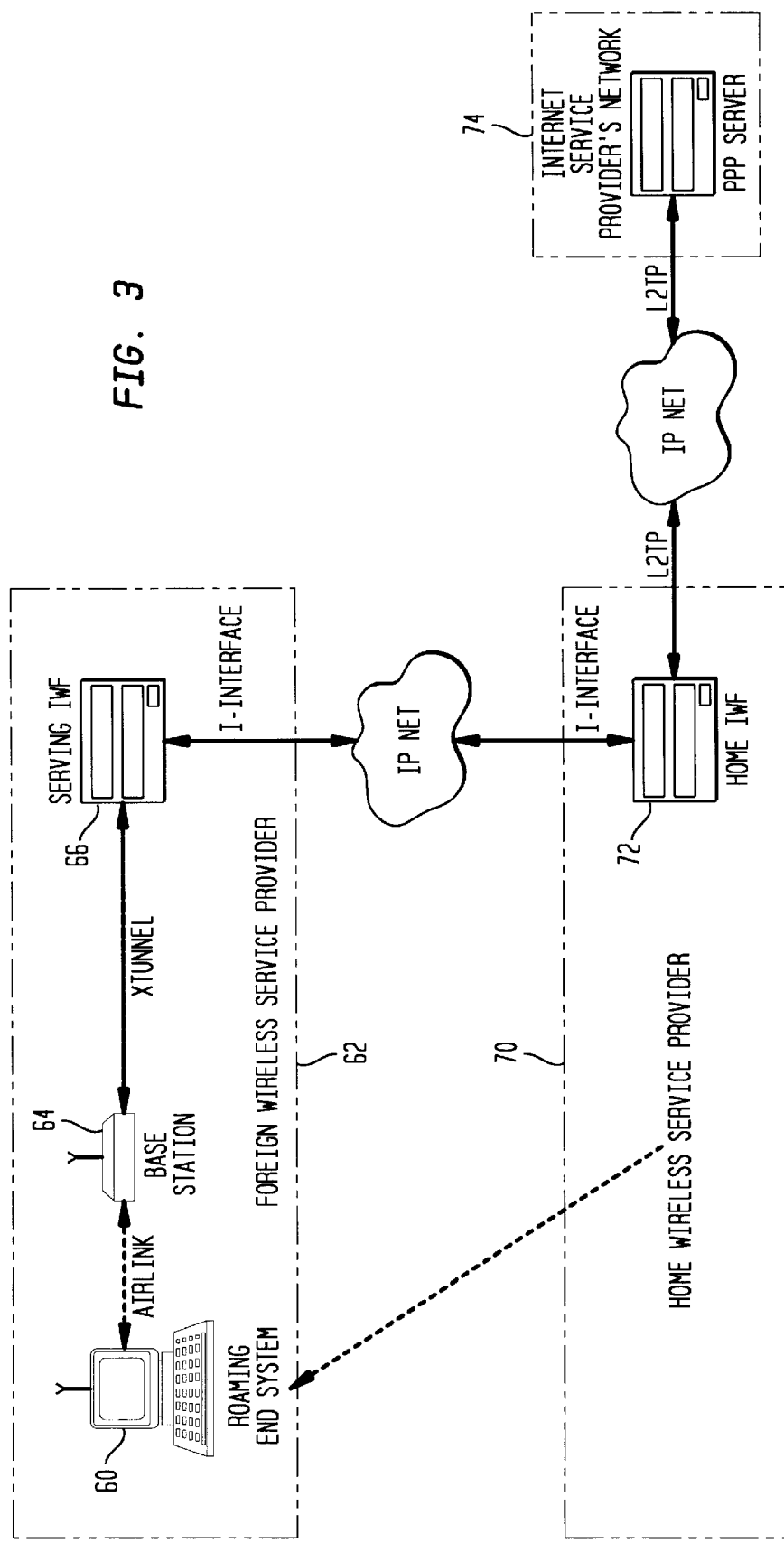
FIG. 3 is a configuration diagram of selected parts of the architecture of the network of FIG. 2 showing a roaming scenario.

In FIG. 3, roaming end system 60 has traveled to a location at which foreign wireless service provider 62 provides coverage. However, roaming end system 60 has a subscriber relationship with home wireless service provider 70. In the present invention, home wireless service provider 70 has a contractual relationship with foreign wireless service provider 62 to provide access services. Therefore, roaming end system 60 connects to base station 64 of foreign wireless service provider 62 over the air link. Then, data is relayed from roaming end system 60 through base station 64, through serving IWF 66 of foreign wireless service provider 62, to home IWF 72 of home wireless service provider 70, or possibly through home IWF 72 of home wireless service provider 70 to internet service provider 74.

An inter-service provider interface, called the I-interface, is used for communications across wireless service provider (WSP) boundaries to support roaming. This interface is used for authenticating, registering and for transporting the end system's PPP frames between the foreign WSP and the home WSP.

PPP frames in the up link and the down link directions travel through the end system's home wireless service provider (WSP). Alternatively, PPP frames directly transit from the foreign WSP to the destination network. The base station in the foreign WSP is the end system's point of attachment in the foreign network. This base station sends (and receives) PPP frames to (and from) a serving IWF in the foreign WSP's mobile switching center. The serving IWF connects over the I-interface to the home IWF using a layer two tunnel to transport the end system's PPP frames in both directions. The serving IWF in the foreign WSP collects accounting data for auditing. The home IWF in the home WSP collects accounting data for billing.

The serving IWF in the foreign WSP may be combined with the base station in the same system, thus eliminating the need for the X-Tunnel.

During the registration phase, a registration server in the foreign WSP determines the identity of the roaming end system's home network. Using this information, the foreign registration server communicates with the home registration server to authenticate and register the end system. These registration messages flow over the I-interface. Once the end system has been authenticated and registered, a layer two tunnel is created between the base station and the serving IWF using the XTUNNEL protocol and another layer two tunnel is created between the serving IWF and the home IWF over the I-interface. The home IWF connects to the end system's PPP peer as before, using L2TP (level 2 tunnel protocol). During hand-offs, the location of the home IWF and the L2TP tunnel remains fixed. As the end system moves from one base station to another base station, a new tunnel is created between the new base station and the serving IWF and the old tunnel between the old base station and the serving IWF is deleted. If the end system moves far enough, so that a new serving IWF is needed, a new tunnel will be created between the new serving IWF and the home IWF. The old tunnel between the old serving and the home will be deleted.

To support roaming, the I-interface supports authentication, registration and data transport services across wireless service provider boundaries. Authentication and registration services are supported using the IETF Radius protocol. Data transport services to transfer PPP frames over a layer two tunnel are supported using the I-XTunnel protocol. This protocol is based on the IETF L2TP protocol.

As used in this description, the term home IWF refers to the IWF in the end system's home network. The term serving IWF refers to the IWF in the foreign network which is temporarily providing service to the end system. Similarly, the term home registration server refers to the registration server in the end system's home network and the term foreign registration server refers to the registration server in the foreign network through which the end system registers while it is roaming.

The network supports both fixed and dynamic IP address assignment for end systems. There are two types of IP addresses that need to be considered. The first is the identity of the end system in its home network. This may be a structured user name in the format user@domain. This is different from the home IP address used in mobile IP. The second address is the IP address assigned to the end system via the PPP IPCP address negotiation process. The domain sub-field of the home address is used to identify the user's home domain and is a fully qualified domain name. The user sub-field of the home address is used to identify the user in the home domain. The User-Name is stored on the end system and in the subscriber data-base at the MSC and is assigned to the user when he or she subscribes to the service. The domain sub-field of the User-Name is used during roaming to identify roaming relationships and the home registration server for purposes of registration and authentication. Instead of the structured user name another unique identifier may be used to identify the user's home network and the user's identity in the home network. This identifier is sent in the registration request by the end system The PPP IPCP is used to negotiate the IP address for the end system. Using IP configuration protocol IPCP, the end system is able to negotiate a fixed or dynamic IP address.

Although the use of the structured user-name field and the non-use of an IP address as the home address is a feature that characterizes the present system over a known mobile IP, the network may be enhanced to also support end systems that have no user-name and only a non-null home address, if mobile IP and its use in conjunction with PPP end systems becomes popular. The PPP server may be configured by the service provider to assign IP addresses during the IPCP address assignment phase that are the same as the end system's home IP address. In this case, the home address and the IPCP assigned IP address will be identical.

Figure 4:
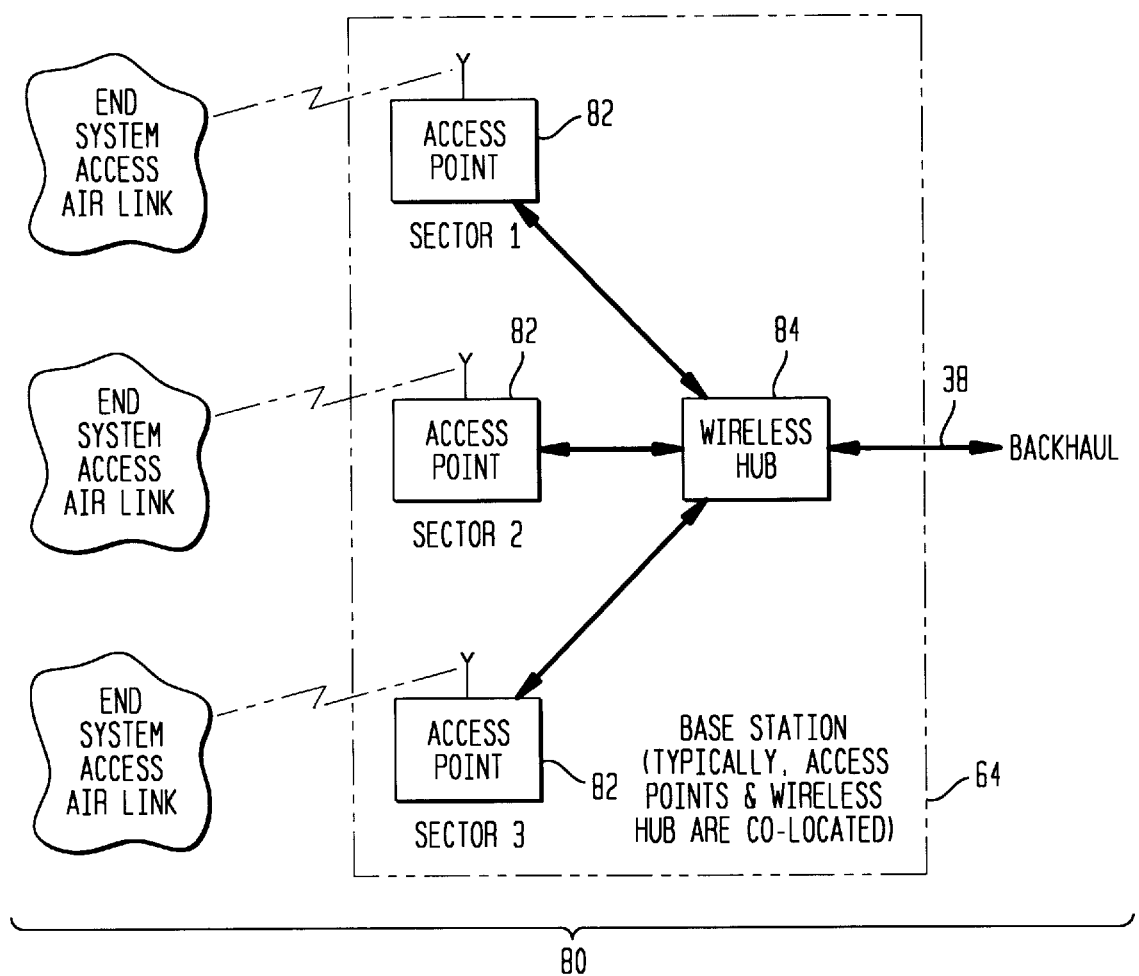
FIG. 4 is a configuration diagram of a base station with local access points.

In FIG. 4, base station 64 and air links from end systems form wireless sub-network 80 that includes the air links for end user access, at least one base station (e.g., station 64) and at least one backhaul network (e.g., 38 of FIG. 2) from the base station to MSC 40 (FIG. 2). The wireless sub-network architecture of, for example, a 3-sectored base station includes the following logical functions.

1. Access point function. Access points 82 perform MAC layer bridging and MAC layer association and dissociation procedures. An access point includes a processor (preferably in the form of custom application specific integrated circuit ASIC), a link to a wireless hub (preferably in the form of an Ethernet link on a card or built into the ASIC), a link to an antenna (preferably in the form of a card with a data modulator/demodulator and a transmitter/receiver), and the antenna to which the end system is coupled. The processor runs software to perform a data bridging function and various other functions in support of registration and mobility handovers as further described herein. See discussion with respect to FIGS. 7, 8 and 11.

Access points (APs) take MAC layer frames from the air link and relay them to a wireless hub and vice versa. The MAC layer association and disassociation procedures are used by APs to maintain a list of end system MAC addresses in their MAC address filter table. An AP will only perform MAC layer bridging on behalf of end systems whose MAC addresses are present in the table. An access point and its associated wireless hub are typically co-located. In its simplest form, an access point is just a port into a wireless hub. When the APs and the wireless hub are co-located in the same cell site, they may be connected together via a IEEE 802.3 link. Sometimes, access points are located remotely from the wireless hub and connected via a long distance link like a wired T1 trunk or even a wireless trunk. For multi-sector cells, multiple access points (i.e., one per sector) are used.

2. Wireless hub function. Wireless hub 84 performs the foreign agent (FA) procedures, backhaul load balancing (e.g., over multiple T1's), backhaul network interfacing, and the xtunnel procedures. When support for quality of service (QOS) is present, the wireless hub implements the support for QOS by running the xtunnel protocol over backhauls with different QOS attributes. In a multi-sector cell site, a single wireless hub function is typically shared by multiple access points.

A wireless hub includes a processor, a link to one or more access points (preferably in the form of an Ethernet link on a card or built into an ASIC), and a link to a backhaul line. The backhaul line is typically a T1 or T3 communications line that terminates in the mobile switching center of the wireless service provider. The link to the backhaul line formats data into a preferred format, for example, an Ethernet format, a frame relay format or an ATM format. The wireless hub processor runs software to support data bridging and various other functions as described herein. See discussion with respect to FIGS. 9, 10 and 11.

The base station design supports the following types of cell architectures.

1. Local AP architecture. In a local AP architecture, access points have a large (>=2 km, typically) range. They are co-located in the cell site with the wireless hub (FIG. 4). Access points may be connected to the wireless hub using an IEEE 802.3 network or may be directly plugged into the wireless hub's backplane or connected to the wireless hub using some other mechanism (e.g. universal serial bus, printer port, infra-red, etc.). It will be assumed that the first alternative is used for the rest of this discussion. The cell site may be omni or sectored by adding multiple access points and sectored antennas to a wireless hub.

2. Remote AP architecture. In a remote AP architecture, access points usually have a very small range, typically around 1 km radius. They are located remotely (either indoors or outdoors) from the wireless hub. A T1 or a wireless trunk preferably links remote access points to the cell site where the wireless hub is located. From the cell site, a wire line backhaul or a microwave link is typically used to connect to the IWF in the MSC. If wireless trunking between the remote AP and the wireless hub is used, omni or sectored wireless radios for trunking are utilized. The devices for trunking to remote access points are preferably co-located with the wireless hub and may be connected to it using an IEEE 802.3 network or may be directly plugged into the wireless hub's backplane. These devices will be referred to by the term trunk AP.

3. Mixed AP architecture. In a mixed architecture, the wireless sub-network will have to support remote and local access points. Remote access points may be added for hole filling and other capacity reasons. As described earlier, T1 or wireless trunks may be used to connect the remote AP to the wireless hub.

Figure 5:
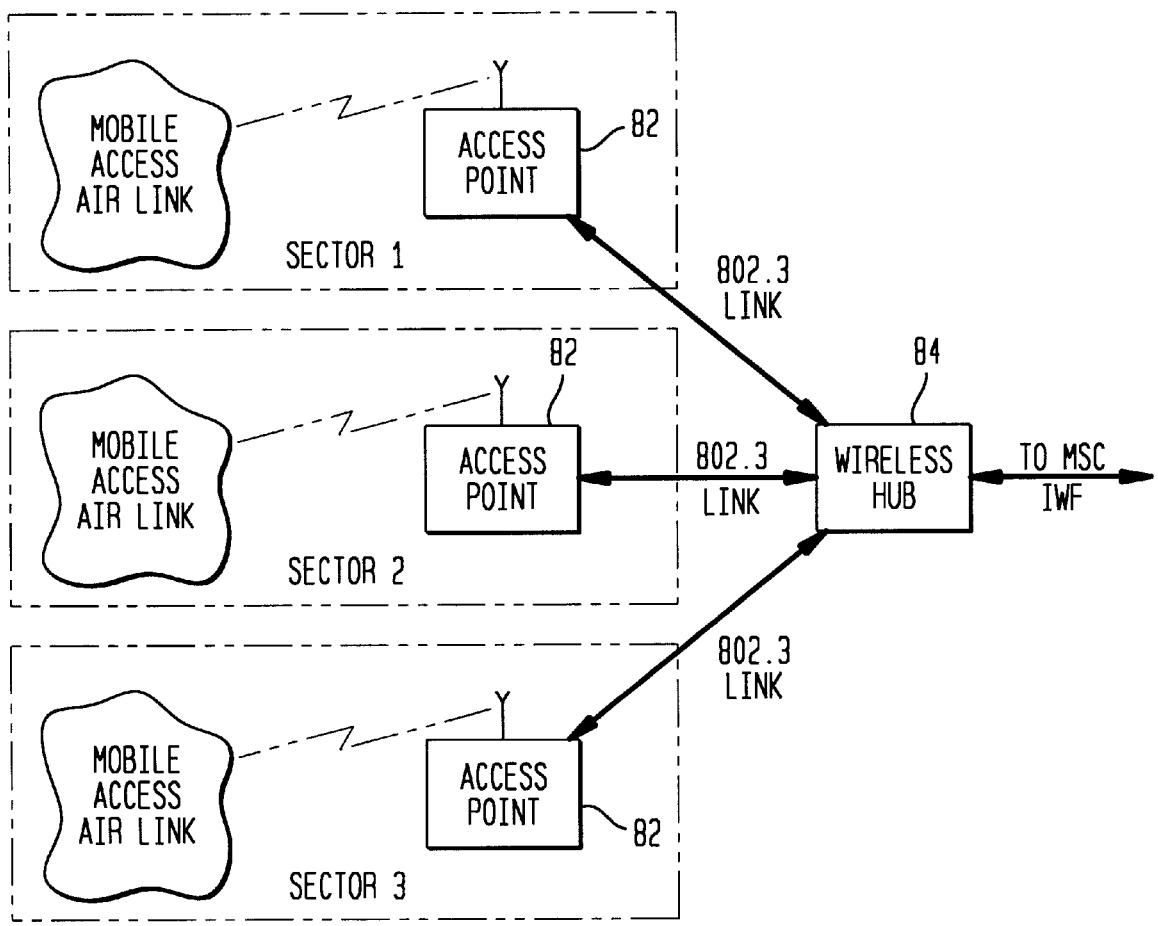
FIG. 5 is a configuration diagram of a base station with remote access points.

FIG. 5 shows a cell with three sectors using local APs only. The access points and the wireless hub are co-located in the base station and are connected to each other with 802.3 links.

Figure 6:
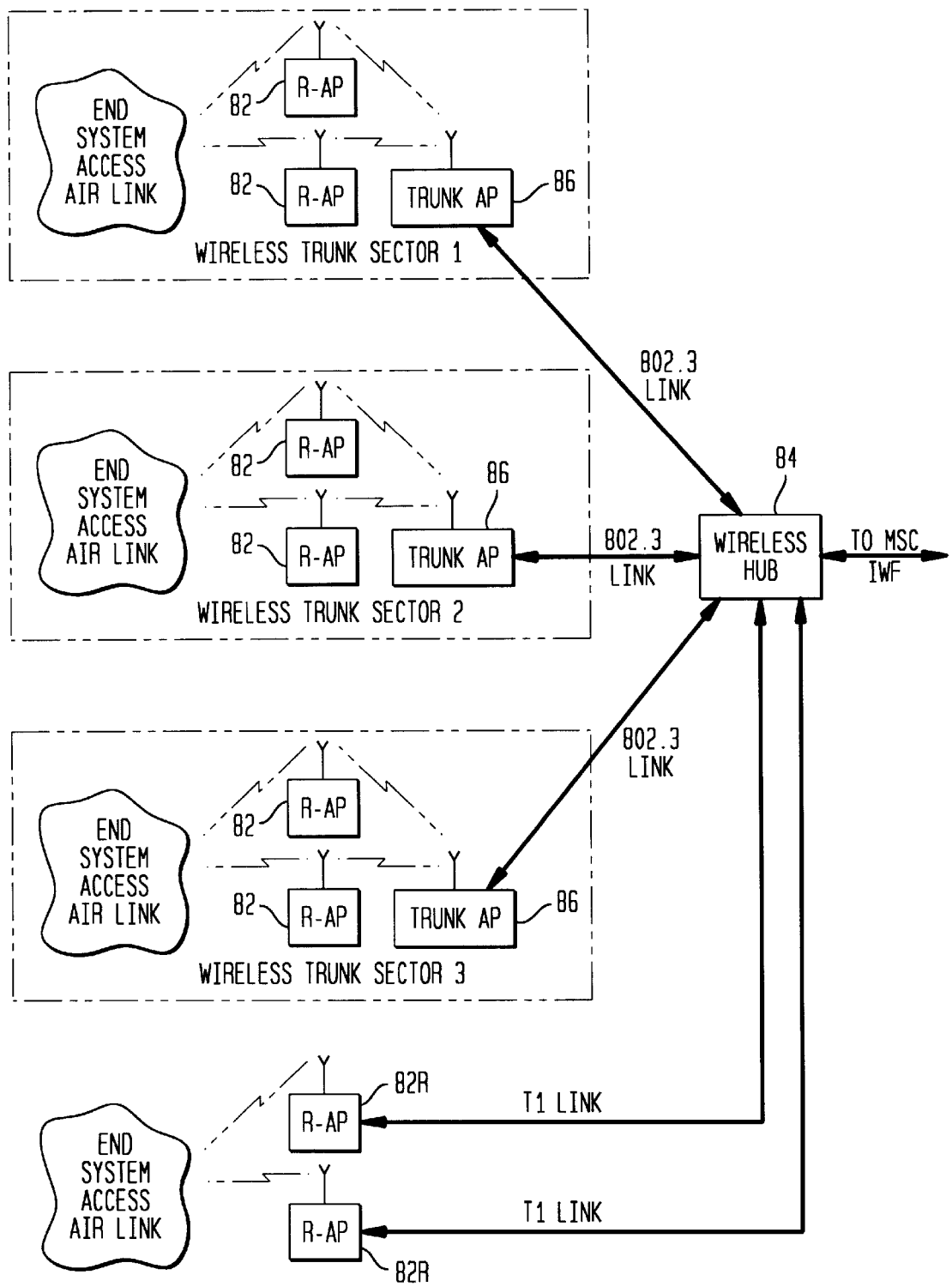
FIG. 6 is a configuration diagram of a base station with remote access points, some of which are connected using a wireless trunk connection.

FIG. 6 shows an architecture with remote access points 82 connected to wireless hub 84 using wireless trunks 86. Each trunk access point in the base station provides a point to multi-point wireless radio link to the remote micro access points (R-AP in figure). The remote access points provide air link service to end systems. The wireless hub and the trunk access points are co-located in the base station and connected together via 802.3 links. This figure also shows remote access points 82R connected to the wireless hub via point to point T1 links. In this scenario, no trunk APs are required.

To support all of the above cell architectures and the different types of access points that each cell might use, the network architecture follows the following rules:

1. Access points function as MAC layer bridges. Remote access points perform MAC bridging between the air link to the end systems and the wireless or T1 trunk to the cell site. Local access points perform MAC bridging between the air link to the end systems and the wireless hub.

2. Trunk access points also function as MAC layer bridges. They perform MAC bridging between the trunk (which goes to the access points) and the wireless hub.

3. The wireless hub is connected to all co-located MAC bridges (i.e. local access points or trunk access points) using a 802.3 link initially.

Additionally, where local access points or remote access points with T1 trunks are used, the following rules are followed.

1. Local access points are co-located with the wireless hub and connected to it using point to point 802.3 links or a shared 802.3 network. Remote access points are connected to the wireless hub using point to point T1 trunks.

2. Sectorization is supported by adding access points with sectored antennas to the cell site.

3. For each access point connected to the wireless hub, there is a foreign agent executing in the wireless hub which participates in end system registration. MAC layer association procedures are used to keep the MAC address filter tables of the access points up to date and to perform MAC layer bridging efficiently. The wireless hub participates in MAC association functions so that only valid MAC addresses are added to the MAC address filter tables of the access points.

4. The foreign agent in the wireless hub relays frames from the access points to the MSC IWF and vice versa using the xtunnel protocol.

The MAC address filter table is used to filter out those unicast MAC data frames whose MAC addresses are not present in the table. The APs always forward MAC broadcast frames and MAC frames associated with end system registration functions regardless of the contents of the MAC address filter table.

5. Local access points use ARP to resolve MAC addresses for routing IP traffic to the wireless hub. Conversely, the wireless hub also uses ARP to route IP packets to access points. UDP/IP is used for network management of access points.

6. Remote access points connected via T1 do not use ARP since the link will be a point to point link.

7. Support for hand-offs is done with assistance from the MAC layer.

In a cell architecture using wireless trunks and trunk APs, the following rules are followed.

1. Trunk access points are co-located with the wireless hub and connected to it using point to point 802.3 links or other suitable means.
2. Wireless trunk sectorization is supported by adding trunk access points with sectored antennas to the cell site.
3. Hand-offs across backhaul sectors are done using the foreign agent in the wireless hub. For each backhaul sector, there is a foreign agent executing in the wireless hub.
4. The trunk APs do not need to participate in MAC layer end system association and hand off procedures. Their MAC address filter tables will be dynamically programmed by the wireless hub as end systems register with the network. The MAC address filter table is used to filter out unicast MAC frames. Broadcast MAC frames or MAC frames containing registration packets are allowed to always pass through.
5. Trunk APs use ARP to resolve MAC addresses for routing IP traffic to the wireless hub. Conversely, the wireless hub use ARP to route IP packets to trunk APs. UDP/IP is used for network management of trunk APs.
6. In a single wireless trunk sector, MAC association and hand-offs from one access point to another is done using the MAC layer with the assistance of the foreign agent in the wireless hub. Using these MAC layer procedures, end systems associate with access points. As end systems move from one access point to another access point, the access points will use a MAC hand off protocol to update their MAC address filter tables. The wireless hub at the cell site provides assistance to access points to perform this function. This assistance includes relaying MAC layer hand off messages (since access points will not be able to communicate directly over the MAC layer with each other) and authenticating the end system for MAC layer registration and hand off and for updating the MAC address filter tables of the access points.
7. The foreign agent for a wireless trunk sector is responsible for relaying frames from its trunk AP to the MSC and vice versa using the xtunnel protocol. Thus, the foreign agent for a trunk AP does not care about the location of the end system with respect to access points within that wireless trunk sector. In the down link direction, it just forwards frames from the tunnel to the appropriate trunk AP which uses MAC layer bridging to send the frames to all the remote access points attached in that backhaul sector. The access points consult their MAC address filter tables and either forward the MAC frames over the access network or drop the MAC frames. As described above, the MAC address filter tables are kept up to date using MAC layer association and hand off procedures. In the up link direction, MAC frames are forwarded by the access points to the backhaul bridge which forwards them to the foreign agent in the wireless hub using the 802.3 link.
8. ARP is not be used for sending or receiving IP packets to the remote access points. The access points determines the MAC address of the wireless hub using BOOTP procedures. Conversely, the wireless hub is configured with the MAC address of remote access points. UDP/IP is used for network management of access points and for end system association and hand off messages.

IEEE Standard 802.3 links in the cell site may be replaced by other speed links.

Figure 7:
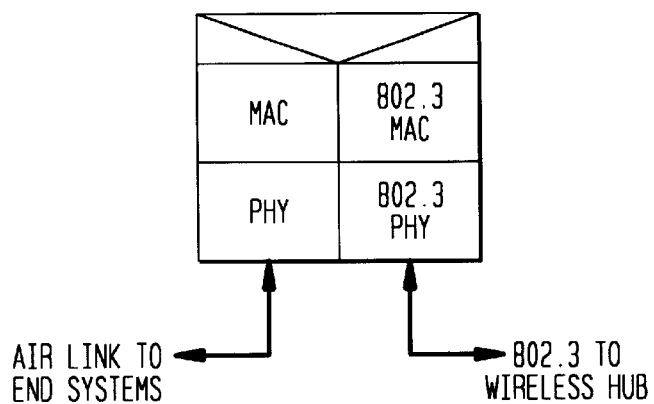
FIG. 7 is a diagram of a protocol stack for a local access point.

FIG. 7 shows the protocol stack for a local access point. At the base of the stack is physical layer PHY. Physical layer PHY carries data to and from an end system over the air using radio waves as an example. When received from an end system, the AP receives data from the physical layer and unpacks it from the MAC frames (the MAC layer). The end system data frames are then repacked into an Ethernet physical layer format (IEEE 802.3 format) where it is send via the Ethernet link to the wireless hub. When the AP's processor receives data from the wireless hub via its Ethernet link (i.e., the physical layer), the data to be transmitted to an end system, the AP packs the data in a medium access control (MAC) format, and sends the MAC layer data to its modulator to be transmitted to the end system using the PHY layer.

Figure 8:
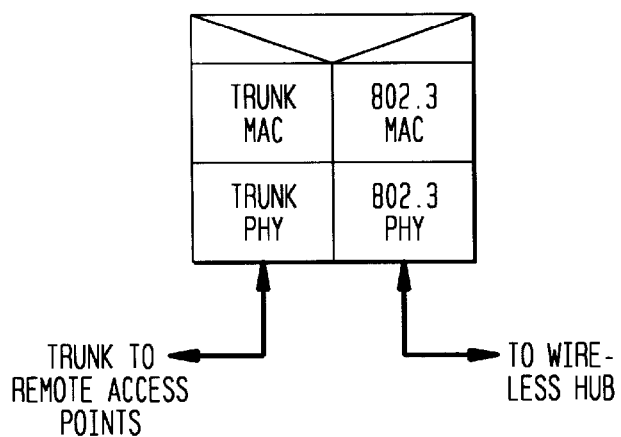
FIG. 8 is a diagram of a protocol stack for a remote access point with a wireless trunk.

In FIG. 8, the MAC and PHY layers to/from the end system of FIG. 7 are replaced by a MAC and PHY for the trunk to the cell site for a remote access point. Specifically, for a T1 trunk, the high level data link control protocol (HDLC protocol) is preferably used over the T1.

Figure 9:
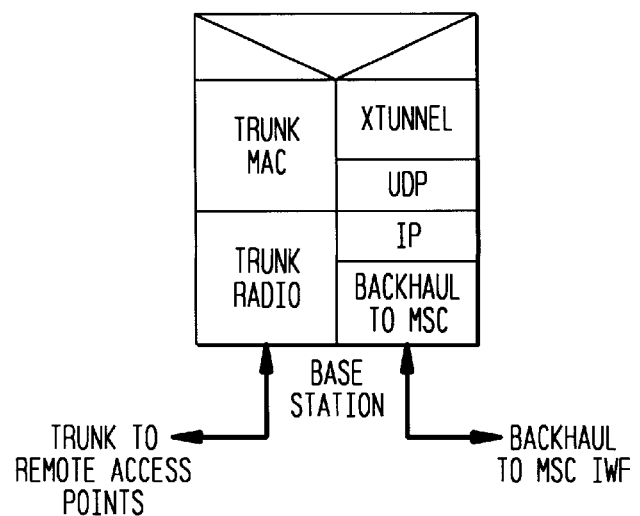
FIG. 9 is a diagram of a protocol stack for a relay function in the base station for supporting remote access points with wireless trunks.

FIG. 9 depicts the protocol stack for the wireless hub that bridges the backhaul line and the trunk to the remote access point. The trunk to the remote APs are only required to support remote access points (as distinct from Ethernet coupled access points). The MAC and PHY layers for the wireless trunk to the remote APs provide a point to multipoint link so that one trunk may be used to communicate with many remote APs in the same sector.

The wireless hub bridges the trunk to the remote APs and the backhaul line (e.g., T1 or T3) to the network's mobile switching center (MSC). The protocol stack in the wireless hub implements MAC and PHY layers to the MSC on top of which is implemented an IP (Internet Protocol) layer on top of which is implemented a UDP layer (Universal Datagram Protocal, in combination referred to as UDP/IP) for network management on top of which is implemented an XTunnel protocol. The XTunnel protocol is a new format that includes aspects of mobility (e.g. as in mobile IP) and aspects of the Level 2 Tunnel Protocol (L2TP). The XTunnel protocol is used to communicate from the wireless hub to the MSC and between inter-working functions (IWFs) in different networks or the same network.

Figure 10:
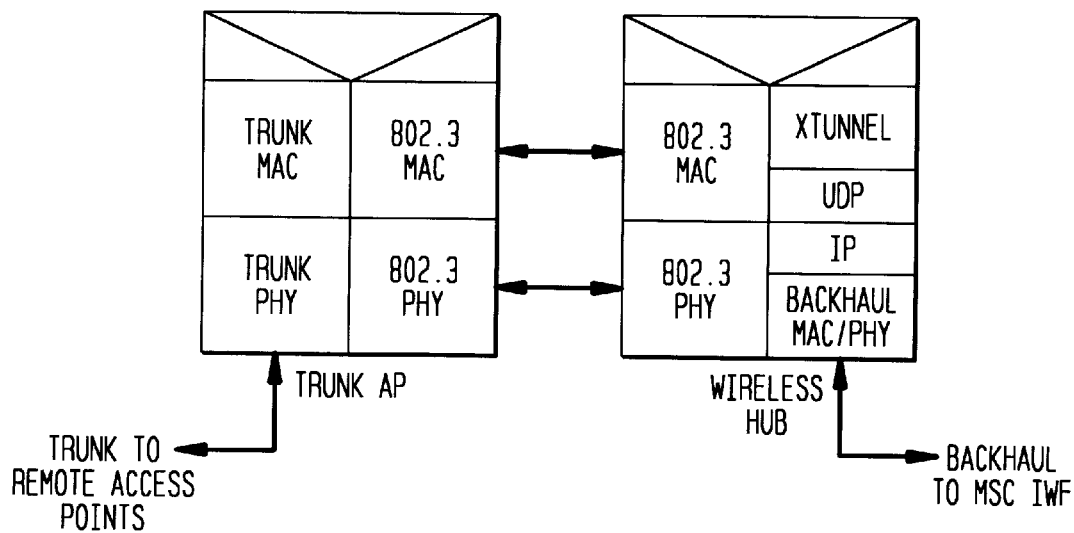
FIG. 10 is a diagram of protocol stacks for implementing the relay function depicted in FIG. 9.

In FIG. 10, the protocol stack for the relay function in the base station for supporting remote access points is shown. The relay function includes an interface to the backhaul line (depicted as the wireless hub) and an interface to the remote AP (depicted as a trunk AP). From the point of view of the wireless hub, the trunk AP (depicted in FIGS. 7 and 10) actually behaves like the AP depicted in FIG. 7. Preferably, the base station protocol stacks are split up into a wireless hub and a trunk AP with an Ethernet in between. In an N-sector wireless trunk, there are N wireless trunk APs in the cell site and one wireless hub.

Figure 11:
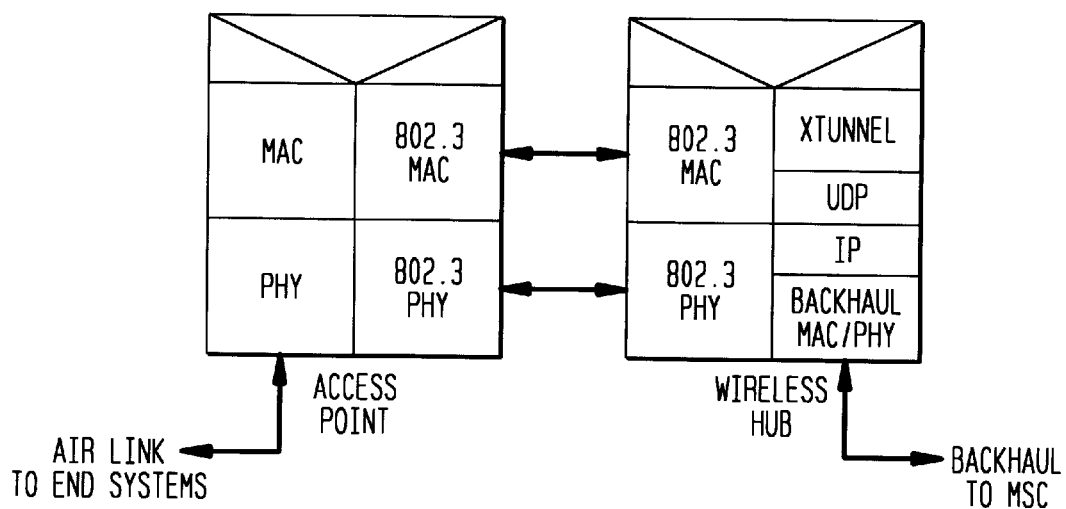
FIG. 11 is a diagram of protocol stacks for a relay function in the base station for supporting local access points.

In FIG. 11, the base station protocol stack for a cell architecture using a local AP is shown. The relay function includes an interface to the backhaul line (depicted as the wireless hub) and an air link interface to the end system (depicted as an AP). From the point of view of the wireless hub, the AP (depicted in FIGS. 8 and 11) actually behaves like the trunk AP depicted in FIG. 8. Preferably, the base station protocol stacks are split up into a wireless hub and a trunk AP with an Ethernet in between. In a N-sector cell, there are N access points and a single wireless hub.

The backhaul network from the base station to the MSC has the following attributes.

1. The network is capable of routing IP datagrams between the base station and the MSC.

2. The network is secure. It is not a public internet. Traffic from trusted nodes only are allowed onto the network since the network will be used for not only transporting end system traffic, but also for transporting authentication, accounting, registration and management traffic.

3. The network has the necessary performance characteristics.

In typical application, the service provider is responsible for installing and maintaining the backhaul network on which the equipment is installed.

The base stations supports the following backhaul interfaces for communicating with the MSC.

1. Base stations support IP over PPP with HDLC links using point to point T1 or fractional T3 links.

2. Base stations support IP over frame relay using T1 or fractional T3 links.

3. Base stations support IP over AAL5/ATM using T1 or fractional T3 links.

4. Base stations support IP over Ethernet links.

Since all of the above interfaces are based on IETF standard encapsulations, commercial routers may be used in the MSC to terminate the physical links of the backhaul network. Higher layers are passed on and processed by the various servers and other processors.

End system registration procedures above the MAC layer are supported. In the following, end system registration procedures at the MAC layer are ignored except where they impact the layers above.

End systems may register for service on their home network or from a foreign network. In both scenarios, the end system uses a foreign agent (FA) in the base station to discover a point of attachment to the network and to register. In the former case, the FA is in the end system's home network. In the latter case, the FA is in a foreign network. In either case, the network uses an IWF in the end system's home network as an anchor point (i.e., unchanging throughout the session in spite of mobility). PPP frames to and from the end system travel via the FA in the base station to the IWF in the home network. If the end system is at home, the home IWF is directly connected by means of the xtunnel protocol to the base station. Note that the home IWF may be combined with the base station in the same node. If the end system is roaming, a serving IWF in the foreign network is connected to the home IWF over an I-interface. The serving IWF relays frames between the base station and the home IWF. Note that the home IWF may be combined with the base station in the same node. From the home IWF, data is sent to a PPP server which may reside in the same IWF or to a separate server using the L2TP protocol. The separate server may be owned and operated by a private network operator (e.g. ISP or corporate intranet) who is different from the wireless service provider. For the duration of the session, the location of the home IWF and the PPP server remains fixed. If the end system moves while connected, it will have to re-register with a new foreign agent. However, the same home IWF and PPP server continues to be used. A new xtunnel is created between the new FA and the IWF and the old xtunnel between the old foreign agent and the IWF is destroyed.

Figure 12:
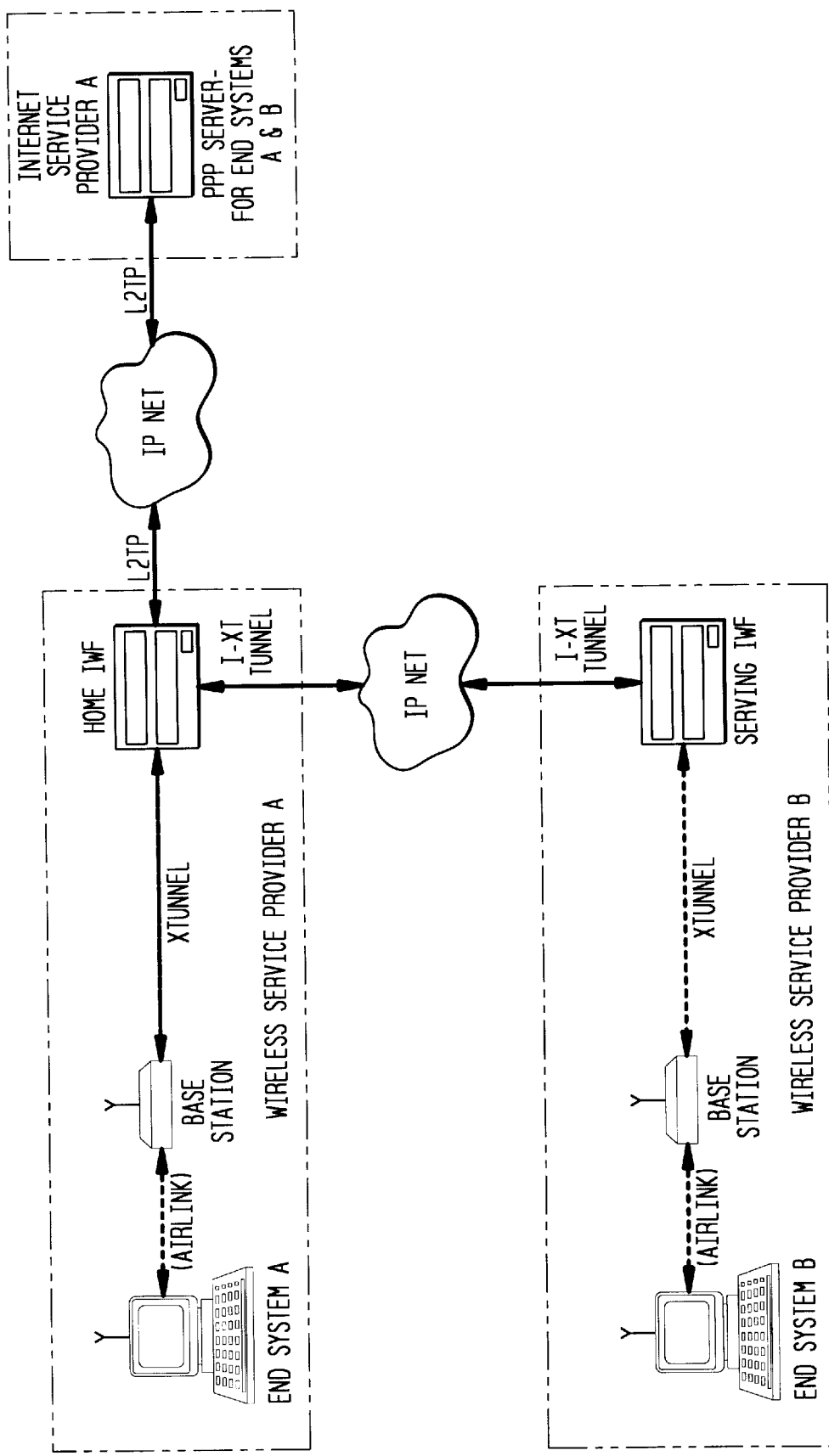
FIG. 12 is a configuration diagram of selected parts of the architecture of the network of FIG. 2 showing a first end system registering in the home network from the home network and a second system registering in the home network from a foreign network using a home inter-working function for an anchor.

FIG. 12 shows this network configuration for two end systems A and B, both of whose home wireless network is wireless service provider A (WSP-A). One end system is registered from the home wireless network and the other from a foreign wireless network. The home IWF in WSP-A serves as the anchor point for both end systems. For both end systems, data is relayed to the home IWF. The home IWF connects to an internet service provider's PPP server owned by ISP-A. Here it is assumed that both end systems have subscribed to the same ISP. If that were not the case, then the home IWF would be shown also connected to another ISP.

Within a wireless service providers network, data between base stations and the IWF is carried using the xtunnel protocol. Data between the IWF and the PPP server is carried using Level 2 Tunneling Protocol (L2TP). Data between the serving IWF and the home IWF is carried using the I-xtunnel protocol.

In a simple scenerio, for a user in their home network requiring fixed service, the home IWF function may be dynamically activated in the base station. Also, the serving IWF function may be activated for a roaming user in the base station.

Always using an IWF in the home network has its advantages and disadvantages. An obvious advantage is simplicity. A disadvantage is that of always having to relay data to and from a possibly remote home IWF. The alternative is to send all the necessary information to the serving IWF so that it may connect to the end system's ISP/intranet and for the serving IWF to send accounting information in near real time back to the accounting server in the home network. This functionality is more complex to implement, but more efficient because it reduces the need to relay data over potentially long distances from the foreign network to the home network.

For example, consider a case of a user who roams from Chicago to Hong Kong. If the user's home network is in Chicago and the user registers using a wireless service provider in Hong Kong, then in the first configuration, the anchor point will be the home IWF in Chicago and all data will have to be relayed from Hong Kong to Chicago and vice versa. The home IWF in Chicago will connect to the user's ISP in Chicago. With the second configuration, the end system user will be assigned an ISP in Hong Kong. Thus, data will not always have to be relayed back and forth between Chicago and Hong Kong. In the second configuration, the serving IWF will serve as the anchor and never change for the duration of the session even if the end system moves. However, the location of the FA may change as a result of end system movement in Hong Kong.

Figure 13:
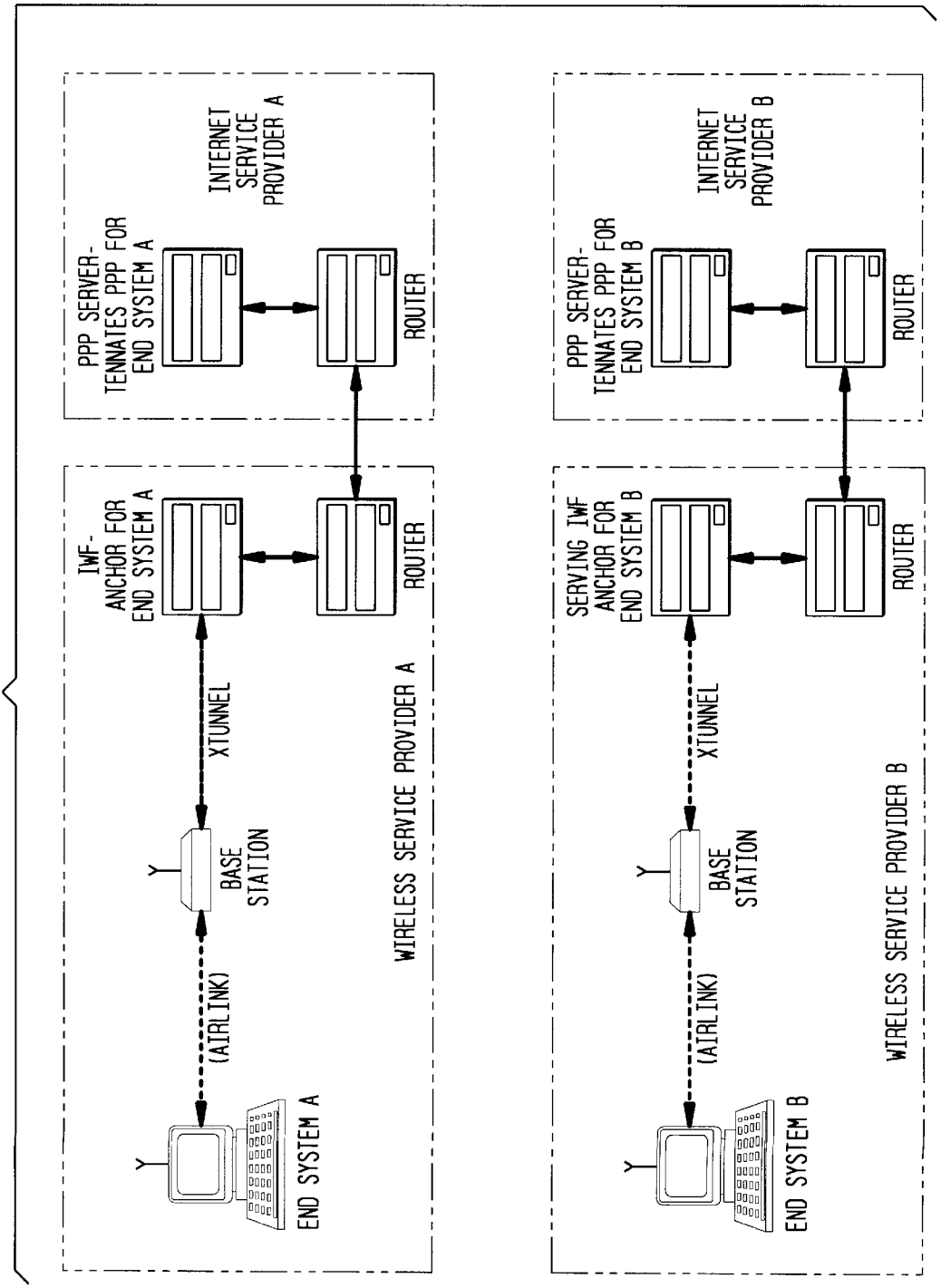
FIG. 13 is a configuration diagram of selected parts of the architecture of the network of FIG. 2 showing a first end system registering in the home network from the home network and a second system registering in the home network from a foreign network using a serving inter-working function for an anchor.

FIG. 13 shows the second network configuration. In this figure, the home network for end system A and B is WSP-A. End system A registers from its home network, using its home IWF as an anchor point, and also connects to its ISP-A using the ISPs PPP server. End system B registers from the foreign network of WSP-B and uses a serving IWF which serves as the anchor point and connects the end system to an ISP using the ISP's PPP server. In this configuration, data for end system B does not have to be relayed from the foreign network to the home network and vice versa.

In order for this configuration to work, not only must there be roaming agreements between the home and the foreign wireless service providers, but there also must be agreements between the foreign wireless service provider and the end system's internet service provider directly or through an intermediary. In the example above, not only must the wireless service provider in Hong Kong have a business agreement with the wireless service provider in Chicago, but the WSP in Hong Kong must have a business agreement with the user's Chicago ISP and access to the Chicago ISPs PPP server in Hong Kong or a business agreement with another ISP locally in Hong Kong who has a business agreement for roaming with the user's Chicago ISP. Additionally, the WSP in Hong Kong must be able to discover these roaming relationships dynamically in order to do user authentication and accounting and to set up the appropriate tunnels.

It is difficult for those companies who are in the Internet infrastructure business to work out suitable standards in the IETF for all of these scenarios. Thus, a preferable embodiment for the present systems to implement the simpler, potentially less efficient configuration, where the IWF in the home network is always used as the anchor point. However, in the presence of suitable industry standardization of protocols for Internet roaming, the second configuration should be regarded as equivalent or alternative embodiment.

An end system will have to register with the wireless network before it can start PPP and send and receive data. The end system first goes through the FA discovery and registration phases. These phases authenticate and register the end system to the wireless service provider. Once these phases are over, the end system starts PPP. This includes the PPP link establishment phase, the PPP authentication phase and the PPP network control protocol phase. Once these phases are over, the end system is able to send and receive IP packets using PPP.

The following discussion assumes that the end system is roaming and registering from a foreign network. During the FA discovery phase, the end system (through its user registration agent) waits for or solicits an advertisement from the foreign agent. The user registration agent uses advertisement messages sent by a near by foreign agent to discover the identity of the FA and to register. During this phase, the user registration agent of the end system selects a FA and issues a registration request to it. The FA acting as a proxy registration agent forwards the registration request to its registration server (the registration server in the foreign WSP). The registration server uses User-Name from the user registration agent's request to determine the end system's home network, and forwards the registration request for authentication to a registration server in the home network. Upon receiving the registration request relayed by the foreign registration server, the home registration server authenticates the identity of the foreign registration server and also authenticates the identity of the end system. If authentication and registration succeeds, the home registration server selects an IWF in the home network to create an I-xtunnel link between the home IWF and the serving IWF (in the foreign WSP). The IWF in the home network serves as the anchor point for the duration of the PPP session.

Once the authentication and registration phases are over, the various PPP phases will be started. At the start of PPP, an L2TP connection is created between the home IWF and requested ISP/intranet PPP server. In the PPP authentication phase, PPP passwords using Password Authentication Protocol (PAP) or Challenge Authentication Protocol CHAP are exchanged and the ISP or intranet PPP server independently authenticates the identity of the end system.

Once this succeeds, the PPP network control phase is started. In this phase, an IP address is negotiated and assigned to the end system by the PPP server and the use of TCP/IP header compression is also negotiated. When this is complete, the end system is able to send and receive IP packets using PPP to its ISP or a corporate intranet.

Note that two levels of authentication are performed. The first authentication authenticates the identity of the end system to the registration server in the home network and the identities of the foreign network and the home network to each other. To perform this function, the foreign agent forwards the end system's registration request using, for example, an IETF Radius protocol to a registration server in its local MSC in a Radius Access-Request packet. Using the end system's domain name, the foreign registration server determines the identity of the end system's home network and home registration server, and acting as a Radius proxy, encapsulates and forwards the request to the end system's home registration server. If the foreign registration server cannot determine the identity of the end system's home, it may optionally forward the Radius request to a registration server that acts like a broker (e.g. one that is owned by a consortium of wireless service providers), which can in turn proxy the Radius Access-Request to the final home registration server. If the local registration server is unable to service the registration request locally or by proxying, then it rejects the foreign agent's registration request and the foreign agent rejects the end system's registration request. Upon receiving the Radius Access-Request, the home registration server performs the necessary authentication of the identities of the foreign network and the end system. If authentication and registration succeeds, the home registration server responds with a Radius Access-Response packet to the foreign registration server which sends a response to the foreign agent so that a round trip can be completed. The registration request is rejected if the home registration server is unable to comply for any reason.

The second level of authentication verifies the identity of the end system to the intranet or ISP PPP server. PPP authentication, separate from mobility authentication allows the infrastructure equipment to be deployed and owned separately from the ISP.

Figure 14:
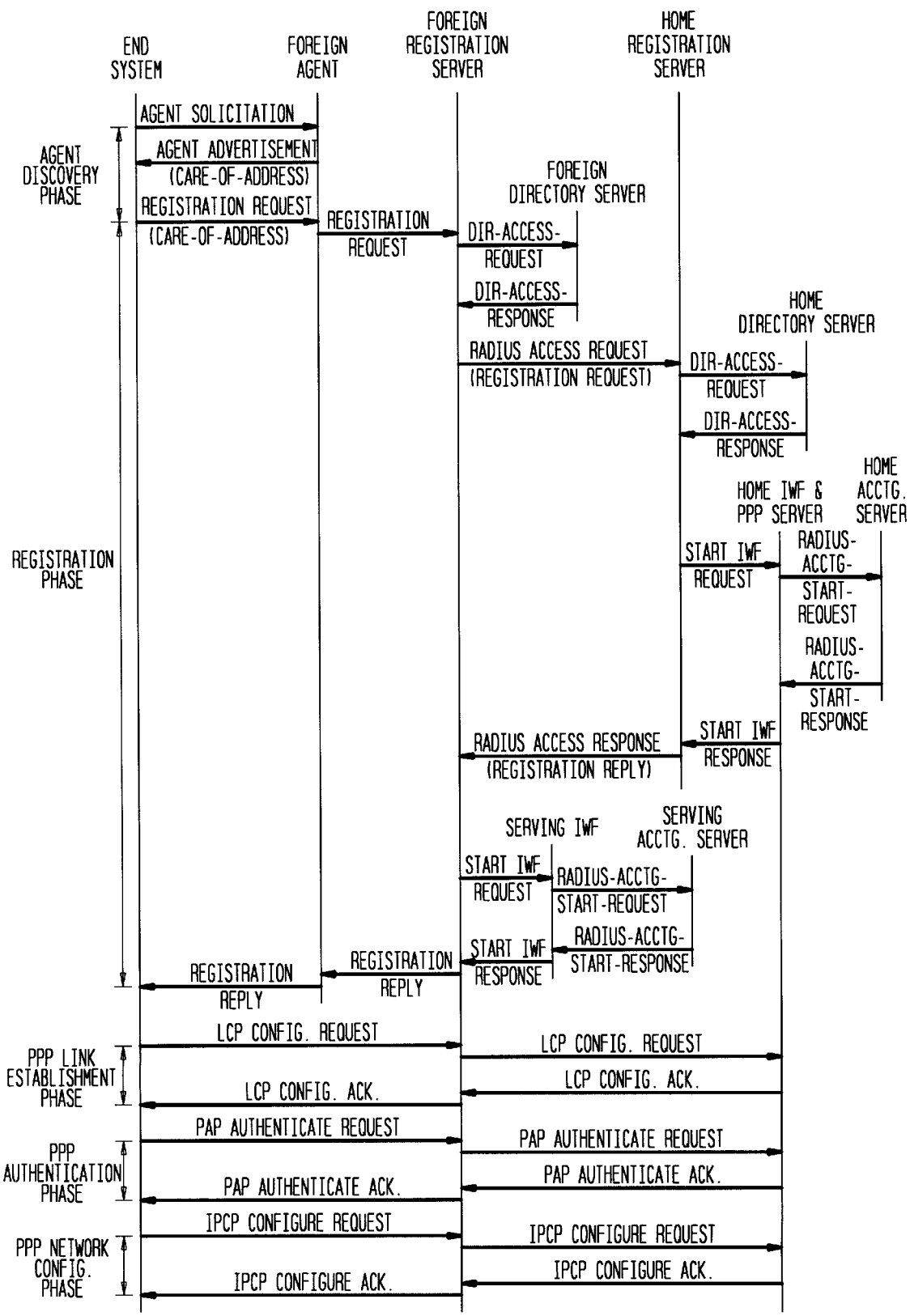
FIG. 14 is a ladder diagram of the request and response messages to register in a home network from a foreign network and to establish, authenticate and configure a data link.

FIG. 14 is a ladder diagram showing the registration sequence for a roaming end system. It is assumed that the PPP server and the home IWF are in the same server and L2TP is not required. Note the interactions with accounting servers to start accounting on behalf of the registering end system and also directory servers to determine the identity of the home registration server and to authenticate the end system's identity. More information on accounting, billing, roaming (between service providers) and settlement will be provided below.

MAC layer messages from the user registration agent of the end system may be used to initiate Agent Solicitation. The MAC layer messages are not shown for clarity.

In FIG. 14, the end system (mobile) initially solicits and advertisement and the foreign agent replies with an advertisement that provides the end system wit information about the network to which the foreign agent belongs including a care-of-address of the foreign agent. Alternatively, this phase may be removed and all network advertisements may be done by a continuously emitted MAC layer beacon message. In this case, the network is assumed to be a foreign wireless service provider. Then, a user registration agent (in the end system) incorporates the information about the foreign agent (including the user name and other security credentials) and its network into a request and sends the request to the foreign agent. The foreign agent, as a proxy registration agent, relays the request to the foreign registration server (i.e., the registration server for the foreign wireless service provider). Then, the foreign registration server, recognizing that it is not the home directory, accesses the foreign directory server with the FDD in the foreign wireless service provider to learn how to direct the registration request to the home registration server of the wireless service provider to which the end system belongs. The foreign registration server responds with the necessary forwarding information. Then, the foreign registration server encapsulates the end system's registration request in a Radius access request and relays the encapsulated request to the home registration server of the wireless service provider to which the end system belongs. The home registration server accesses the home directory server with the HDD of the home registration server to learn at least authentication information about the foreign service provider. Optionally, the home registration server accesses the subscriber's directory to learn detail subscriber service profile information (e.g., quality of service options subscribed to, etc.). When all parties are authenticated, the home registration server sends a start IWF request to the home IWF and PPP server. The home IWF and PPP server starts the home accounting server and then sends a start IWF response to the home registration server. The home registration server then sends a Radius access response to the foreign registration server. The foreign registration server then sends a start IWF request to the serving IWF server. The serving IWF server starts the serving accounting server and then sends a start IWF response to the foreign registration server. The foreign registration server sends a registration reply to the foreign agent, and the foreign agent relays the registration reply to the end system.

A link control protocol (LCP) configuration request is send by the end system through the foreign registration server to the home IWF and PPP server. The home IWF and PPP server sends an LCP configuration acknowledgment through the foreign registration server to the end system.

Similarly, a password authentication protocol (PAP) authentication request is sent to and acknowledged by the home IWF and PPP server. Alternatively, a challenge authentication protocol (CHAP) may be used to authenticate. Both protocols may be used to authenticate or this phase may be skipped.

Similarly, an IP configuration protocol (IPCP) configure request is sent to and acknowledged by the home IWF and PPP server.

The connection to the end system may be terminated because of any one of the following reasons.

1. User initiated termination. Under this scenario, the end system first terminates the PPP gracefully. This includes terminating the PPP network control protocol (IPCP) followed by terminating the PPP link protocol. Once this is done, the end system de-registers from the network followed by termination of the radio link to the access point.
2. Loss of wireless link. This scenario is detected by the modem and reported to the modem driver in the end system. The upper layers of the software are notified to terminate the stacks and notify the user.
3. Loss of connection to the foreign agent. This scenario is detected by the mobility driver in the end system. After trying to re-establish contact with a (potentially new) foreign agent and failing, the driver sends an appropriate notification up the protocol stack and also signals the modem hardware below to terminate the wireless link.
4. Loss of connection to the IWF. This is substantially the same as for loss of connection to the foreign agent.
5. Termination of PPP by IWF or PPP server. This scenario is detected by the PPP software in the end system. The end system's PPP driver is notified of this event. It initiates de-registration from the network followed by termination of the wireless link to the access point.

End system service configuration refers to the concept of configuring the network service for an end system based on the subscriber's service profile. The subscriber's service profile is stored in a subscriber directory. The service profile contains information to enable the software to customize wireless data service on behalf of the subscriber. This includes information to authenticate the end system, allow the end system to roam and set up connections to the end system's internet service provider. Preferably, this information also includes other parameters, like, quality of service. In addition to the subscriber directory, a home domain directory (HDD) and a foreign domain directory (FDD) are used for roaming and for authenticating the foreign and home registration servers to each other. The HDD stores information about the end system's home network and the FDD stores information about foreign networks that a subscriber may visit.

Figure 15:
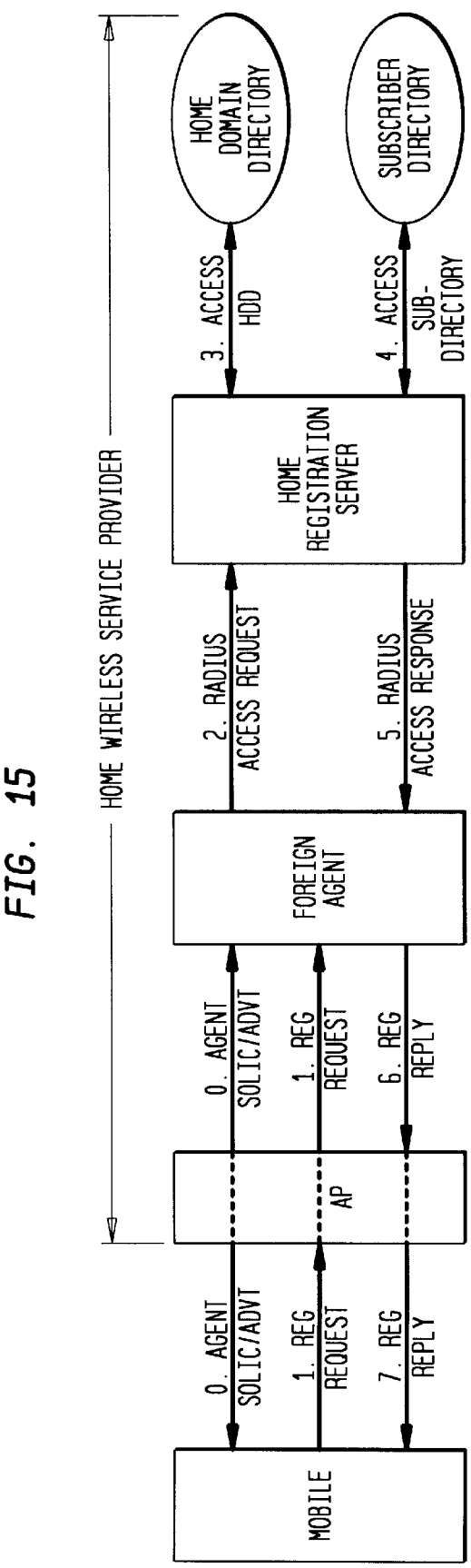
FIG. 15 is a configuration diagram of selected parts of the architecture of the network of FIG. 2 showing registration requests and responses for registering a mobile in a home network from the home network.

FIG. 15 shows how these directories map into the network architecture and are used during registration for an end system that is registering at home. In step 0 the end system (mobile) solicits and receives an advertisement from the foreign agent to provides the end system with information about the network to which the foreign agent belongs. In this case, the network is the home wireless service provider. In step 1, user registration agent (in the end system) incorporates the information about the foreign agent and its network and its security credentials into a request and sends the request to the foreign agent. In step 2, the foreign agent, as a proxy registration agent, relays the request to the home registration server. In step 3, the home registration server accesses the HDD of the home wireless service provider to learn at least authentication information. In step 4, the home registration server accesses the subscriber directory to learn detail subscriber service profile information (e.g., quality of service options subscribed to, etc.). In step 5, the home registration server notifies the foreign agent of the access response. In steps 6 and 7, the foreign agent notifies the end system (i.e., mobile) of the registration reply.

Figure 16:
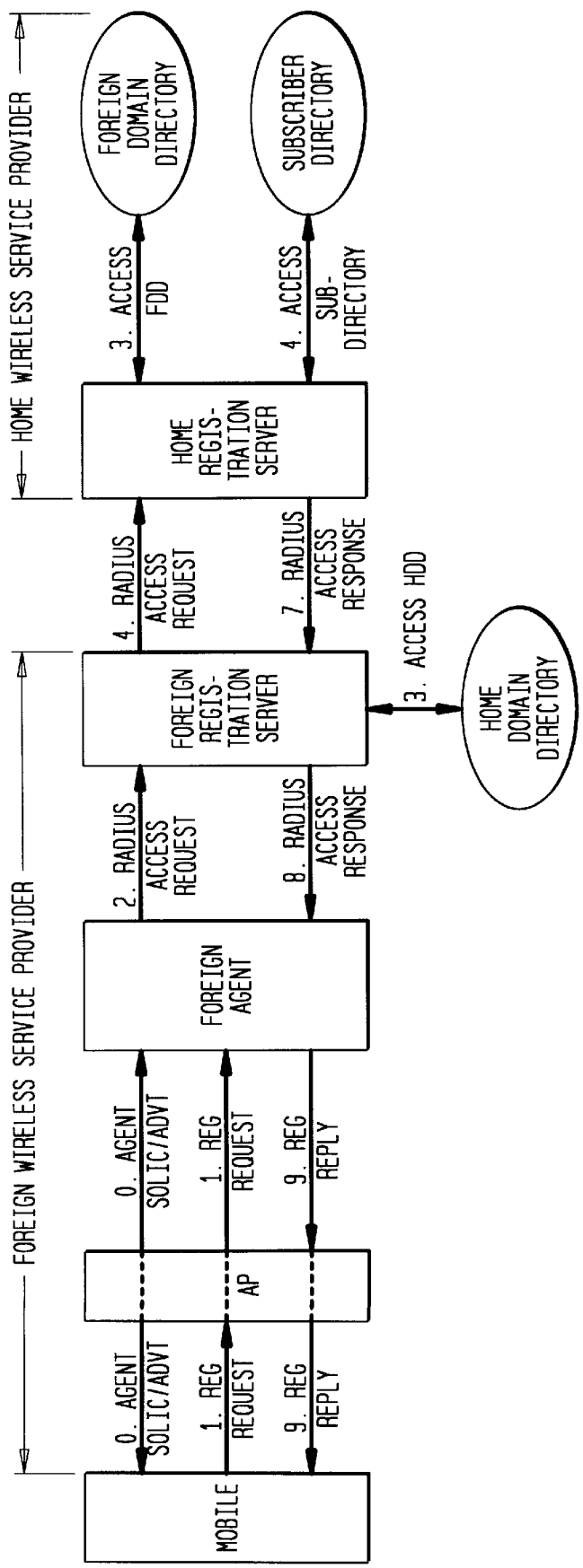
FIG. 16 is a configuration diagram of selected parts of the architecture of the network of FIG. 2 showing registration requests and responses for registering a mobile in a home network from a foreign network.

FIG. 16 shows directory usage for an end system that is registering from a foreign network. In step 0 the end system (mobile) solicits and receives an advertisement and the foreign agent advertises which provides the end system with information about the network to which the foreign agent belongs. In this case, the network is a foreign wireless service provider. In step 1, user registration agent (in the end system) incorporates the information about the foreign agent and its network and its security credential into a request and sends the request to the foreign agent. In step 2, the foreign agent, as a proxy registration agent, relays the request to the foreign registration server (i.e., the registration server for the foreign wireless service provider. In step 3, the foreign registration server accesses the HDD of foreign wireless service provider to learn the network to which the end system belongs. In step 4, the foreign registration server forwards the end system's request to the home registration server of the end system's home wireless service provider. In step 5, the home registration server accesses the FDD of the home registration server to learn at least authentication information about the foreign service provider. In step 6, the home registration server accesses the subscriber's directory to learn detail subscriber service profile information (e.g., quality of service options subscribed to, etc.). In step 7, the home registration server notifies the foreign registration server of the access response. In step 8, the foreign registration server forwards to the foreign agent the access response. In step 9, the foreign agent notifies the end system (i.e., mobile) of the registration reply.

Protocol handling scenarios handle bearer data and the associated stacks for transporting bearer data to and from an end system. The protocol stacks for the cell architectures use local APs (FIG. 17) and remote APs (FIG. 18).

FIG. 17 shows the protocol stacks for handling communications between an end system (in its home network) and a home IWF for End System @ Home. FIG. 17 shows the protocol handling for a cell architecture where the access point and the wireless hub are co-located.

FIG. 18 shows the protocol handling for a cell architecture where the access point is located remotely from the wireless hub. As shown, PPP terminates in the IWF and the configuration provides direct internet access. The configuration for the case where the PPP server is separate from the IWF is described later.

In FIG. 18, PPP frames from the end system are encapsulated in RLP (radio link protocol) frames which are encapsulated at the remote access point in MAC frames for communicating with the trunk access point (i.e., an access point physically located near the wireless hub), the remote access point being coupled to the access point by, for example, a wireless trunk). The access point functions as a MAC layer bridge and relays frames from the air link to the foreign agent in the wireless hub. The foreign agent de-encapsulates the RLP frames out of the MAC frames, and using the xtunnel protocol, relays the RLP frames to the IWF. A similar, albeit reverse, process occurs for transmitting frames from the IWF to the end system.

If the end system moves to another foreign agent, then a new xtunnel will be automatically created between the new foreign agent and the IWF, so that PPP traffic continues to flow between them, without interruption.

In the remote AP cell architecture (FIG. 18) using wireless trunks between the remote AP and the trunk AP, the air link between the end system and the access point may operate at a different frequency (f1) and use a different radio technology as compared to the frequency (f2) and radio technology of the trunk.

Figure 19:
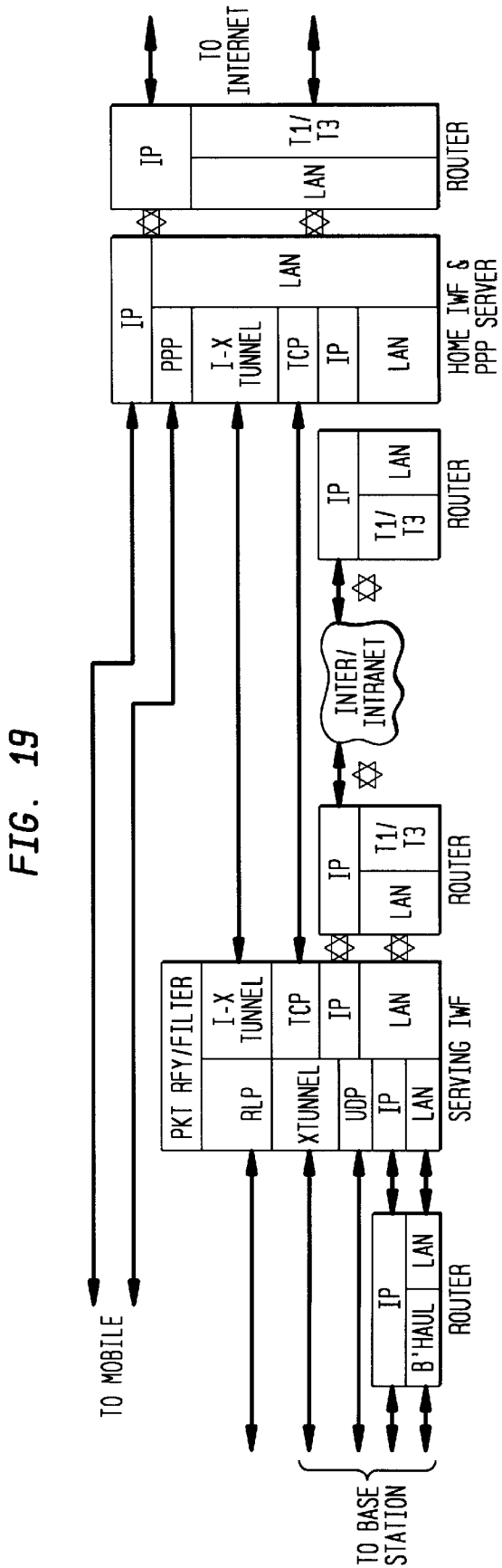
FIG. 19 is a configuration diagram of protocol stacks showing communications between a base station coupled to a roaming end system and a home inter-working function.

FIG. 19 shows the protocol stacks for a roaming end system. The serving IWF uses of the I-xtunnel protocol between the serving IWF and home IWF. The rest of the protocol stacks remain unchanged and are not shown. This architecture may be simplified by merging the serving IWF into the base station, thus eliminating the XWD protocol.

The RLP layer uses sequence numbers to drop duplicate PPP datagrams and provide in-sequence delivery of PPP datagrams between the end system and the IWF. It also provides a configurable keep-alive mechanism to monitor link connectivity between the end system and the IWF. Additionally, in an alternative embodiment, the RLP layer also provides re-transmission and flow control services in order to reduce the overall bit error rate of the link between the end system and the IWF. The RLP between the end system and the IWF is started at the beginning of the session and remains active throughout the session and even across hand-offs.

In contrast to the specification in the mobile IP RFC (RFC 2003), IP in IP encapsulation is not used for tunneling between the foreign agent and the home IWF. Instead a new tunneling protocol, implemented on top of UDP is used. This tunneling protocol is a simplified version of the L2TP protocol. The reasons for this choice are as follows:

1. The encapsulation protocol specified in RFC 2003 does not provide flow control or in-sequence delivery of packets. The presently described network may need these services in the tunnel over the backhaul. Flow control may be needed to reduce the amount of re-transmissions over the air link because of packet loss due to flow control problems over the network between the base station and the MSC or because of flow control problems in the base station or the IWF.

2. By using a UDP based tunneling protocol, the implementation can be done at the user level and then put into the kernel for performance reasons, after it has been debugged.

3. Using RFC 2003, there is no easy way of creating tunnels taking into account quality of service and load balancing. In order to take QOS into account, it should be possible to set up tunnels over links that already provide the required QOS. Secondly, using RFC 2003, there is no easy way to provide load balancing to distribute bearer traffic load over multiple links between the base station and the MSC.

4. In order to implement IP in IP encapsulation as specified in RFC 2003, developers require access to IP source code. In commercial operating systems, source code for the TCP/IP stack is generally proprietary to other equipment manufacturers. Purchasing the TCP/IP stack from a vendor and making changes to the IP layer to support mobile IP tunneling would require a developer to continue supporting a variant version of the TCP/IP stack. This adds cost and risk.

While it is noted that the tunneling protocol between the base station and the IWF is non-standard and that the wireless service provider will not be able to mix and match equipment from different vendors, the use of a non-standard tunneling protocol within a single wireless service provider network is transparent to end systems and equipment from other vendors.

The new tunneling protocol is based on L2TP. By itself, L2TP is a heavyweight tunneling protocol so that L2TP has a lot of overhead associated with tunnel creation and authentication. The new tunneling protocol of the present system has less overhead. The new xtunnel protocol has the following features.

1. The xtunnel creation adds vendor specific extensions to Radius Access Request and Radius Access Response messages between the base station and the registration server. These extensions negotiate tunnel parameters and to create the tunnel.

2. The registration server is able to delegate the actual work of tunneling and relaying packets to a different IP address, and therefore, to a different server in the MSC. This permits the registration server to do load balancing across multiple IWF servers and to provide different QOS to various users.

3. The xtunnel protocol supports in-band control messages for tunnel management. These messages include echo request/response to test tunnel connectivity, disconnect request/response/notify to disconnect the tunnel and error notify for error notifications. These messages are sent over the tunneling media, for example, UDP/IP.

4. The xtunnel protocol sends payload data over the tunneling media, for example, UDP/IP. The xtunnel protocol supports flow control and in-sequence packet delivery.

5. The xtunnel protocol may be implemented over media other than UDP/IP for quality of service.

The network supports direct internet connectivity by terminating the PPP in the home IWF and routing IP packets from the IWF to the internet via a router using standard IP routing techniques. Preferably, the IWF runs Routing Information Process (RIP), and the router also runs RIP and possibly other routing protocols like Open Shortest Path First (OSPF).

The network supports a first configuration for a wireless service provider who is also an internet service provider. In this configuration, the home IWF in the MSC also functions as a PPP server. This IWF also runs internet routing protocols like RIP and uses a router to connect to the internet service provider's backbone network.

The network supports a second configuration for a wireless service provider who wishes to allow end systems to connect to one or more internet service providers, either because the WSP itself is not ISPs, or because the WSP has agreements with other ISPs to provide access to end users. For example, a wireless service provider may elect to offer network access to an end user and may have an agreement with a $3^{rd}$ party ISP to allow the user who also has an account with the $3^{rd}$ party ISP to access the ISP from the WSP network. In this configuration, the PPP server does not run in the home IWF installed at the MSC. Instead, a tunneling protocol like L2TP (Layer Two Tunneling Protocol) is used to tunnel back to the ISP's PPP server. FIG. 10 shows the protocol stacks for this configuration for an end system that is at home.

The location of the home IWF and the ISP PPP server remains fixed throughout the PPP session. Also, the L2TP tunnel between the IWF and the ISP's PPP server remains up throughout the PPP session. The physical link between the IWF and the PPP server is via a router using a dedicated T1 or T3 or frame relay or ATM network. The actual nature of the physical link is not important from the point of view of the architecture.

This configuration also supports intranet access. For intranet access, the PPP server resides in the corporate intranet and the home IWF uses L2TP to tunnel to it.

Figure 20:
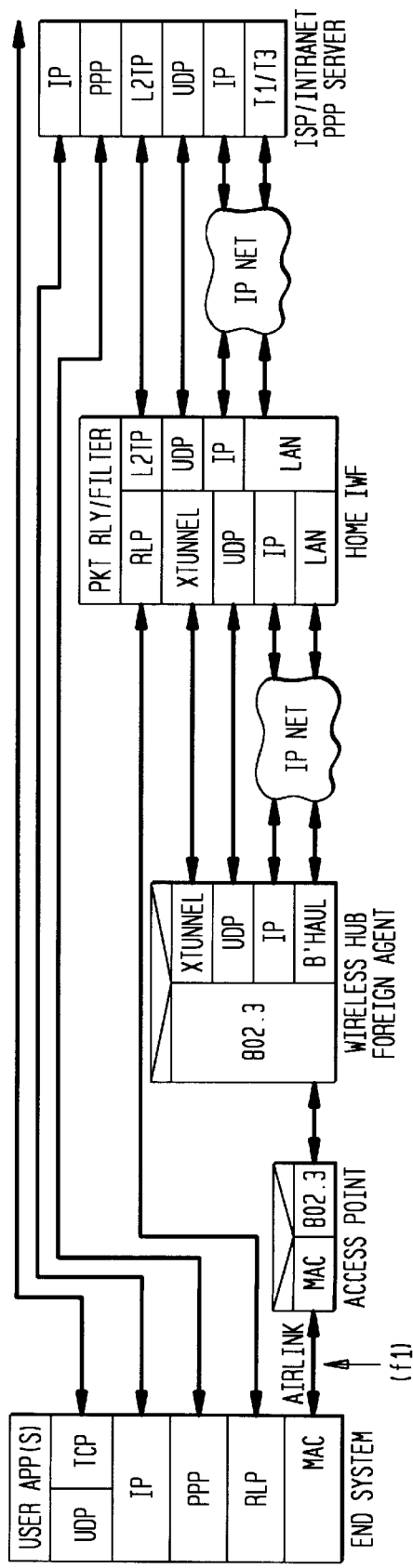
FIG. 20 is a configuration diagram of protocol stacks showing communications between an end system in a home network through an inter-working function in the home network to an internet service provider.

For a fixed end system, the protocol handling for intranet or ISP access is as shown in FIG. 20 with the difference that the roaming end system uses a serving IWF to connect to its home IWF. The protocol handling between a serving IWF and a home IWF has been described earlier. In FIG. 20, the home IWF may be merged into the wireless hub eliminating the X-Tunnel protocol. Also, the serving IWF may be merged into the wireless hub, thus eliminating the X-Tunnel protocol.

Figure 21:
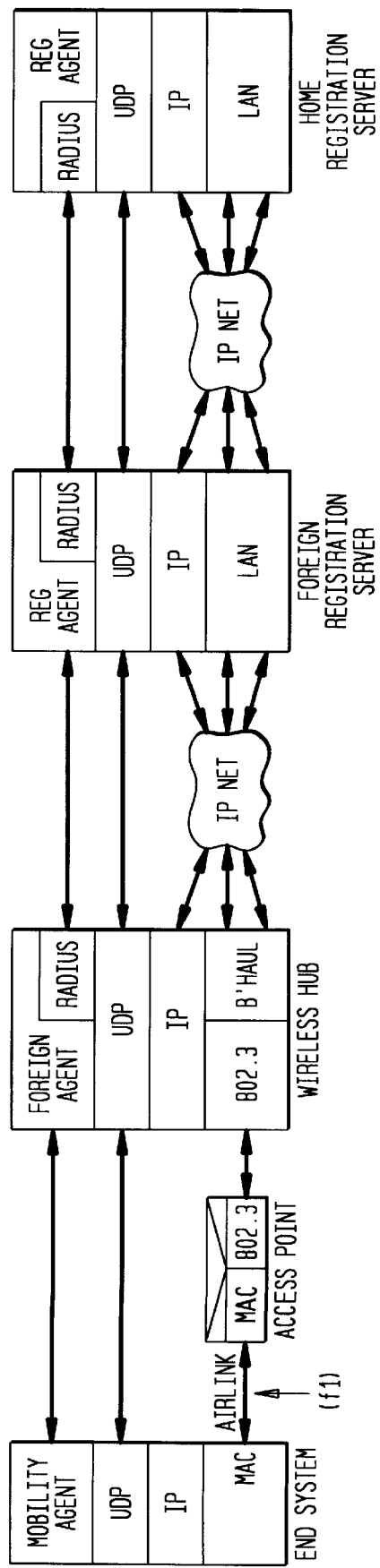
FIG. 21 is a configuration diagram of protocol stacks showing communications between an end system in a foreign network and a home registration server in a home network during the registration phase.

FIG. 21 shows the protocol stacks used during the registration phase (end system registration) for a local AP cell architecture. The stack for a remote AP cell architecture is very similar.

The scenario shown above is for a roaming end system. For an end system at home, there is no foreign registration server in the registration path.

Note the mobility agent in the end system. The mobility agent in the end system and foreign agent in the wireless hub are conceptually similar to the mobile IP RFC 2002. The mobility agent handles network errors using time-outs and re-trys. Unlike the known protocol stacks for bearer data, RLP is not used. The foreign agent and the registration servers use Radius over UDP/IP to communicate with each other for registering the end system.

Several aspects of security must be considered. The first, authenticating the identities of the end system and the foreign/home networks during the wireless registration phase. Second, authenticating the identity of the end system with its PPP server during the PPP authentication phase. Third, authentication for storing accounting data, for billing and for updating home domain information. Fourth, encryption of bearer traffic transmitted to and from the end system. Fifth, encryption for exchanging billing information across service provider boundaries.

Shared secrets are used to authenticate the identity of end systems with their home networks and the identity of the home and foreign networks with each other during wireless registration.

End system authentication uses a 128-bit shared secret to create an authenticator for its registration request. The authenticator is created using the known MD5 message digest algorithm as described in the mobile IP RFC 2002. Alternatively, a different algorithm may be used. The shared secret is not sent in the registration request by the end system. Only the authenticator is sent. On receiving the registration request from the end system, the home registration server re-computes the authenticator over the registration request data using the shared secret. If the computed authenticator value matches the authenticator value sent by the end system, the home registration server allows the registration process to proceed. If the values do not match, the home registration server logs the event, generates a security violation alarm and a nak (i.e., a negative acknowledgment) to the request.

In the registration reply, the home registration server does the same—that is to say, uses the shared secret to create an authenticator for the registration reply that it sends to the end system. Upon receiving the reply, the end system re-computes the authenticator using the shared secret. If the computed value does not match the authenticator value sent by the home registration server in the reply, the end system discards the reply and tries again.

These network security concepts are similar to the concepts defined in mobile IP RFC 2002. According to the RFC, a mobility security association exist between each end system and its home network. Each mobility security association defines a collection of security contexts. Each security context defines an authentication algorithm, a mode, a secret (shared or public-private), style of replay protection and the type of encryption to use. In the context of the present network, the end system's User-Name (in lieu of the mobile IP home address) is used to identify the mobility security association between the end system and its home network. Another parameter, called the security parameter index (SPI), is used to select a security context within the mobility security association. In a basic embodiment of the invention, only the default mobile IP authentication algorithm (keyed-MD5) and the default mode ("prefix+suffix") are supported with 128-bit shared secrets. Network users are allowed to define multiple shared secrets with their home networks. The mechanism for creating security contexts for end users, assigning an SPI to each security context and for setting the contents of the security context (which includes the shared secret) and for modifying their contents are described below. During registration, a 128-bit message digest is computed by the end system in prefix+suffix mode using the MD5 algorithm. The shared secret is used as the prefix and the suffix for the data to be protected in the registration request. The authenticator thus computed, along with the SPI and the User-Name are transmitted in the registration request by the end system. Upon receiving the end system's registration request, the foreign registration server relays the request along with the authenticator and the SPI, unchanged to the home registration server. Upon receiving the registration request directly from the end system or indirectly via a foreign registration server, the home registration server uses the SPI and the User-Name to select the security context. The home server re-computes the authenticator using the shared secret. If the computed authenticator value matches the value of the authenticator sent in the request by the end system, the user's identity will have been successfully authenticated. Otherwise, the home registration server naks (negatively acknowledges) the registration request sent by the end system.

The registration reply sent by the home registration server to the end system is also authenticated using the algorithm described above. The SPI and the computed authenticator value is transmitted in the registration reply message by the home server to the end system. Upon receiving the reply, the end system re-computes the authenticator, and if the computed value does not match the transmitted value, it will discard the reply and retry.

The user's end system has to be configured with the shared secret and SPIs for all security contexts that the user shares with its registration server(s). This configuration information is preferably stored in a Win 95 registry for Windows 95 based end systems. During registration, this information is accessed and used for authentication purposes.

In the network, Radius protocols are used by foreign agent FA to register the end system and to configure the xtunnel between the wireless hub and the home and serving IWFs on behalf of the end system. On receiving a registration request from the end system, the FA creates a Radius Access-Request packet, stores its own attributes into the packet, copies the end system's registration request attributes unchanged into this packet and sends the combined request to the registration server in the MSC.

Radius authentication requires that the Radius client (in this case, the FA in the base station) and the Radius server (in this case, the registration server in the MSC) share a secret for authentication purposes. This shared secret is also used to encrypt any private information communicated between the Radius client and the Radius server. The shared secret is a configurable parameter. The network follows the recommendations in the Radius RFC and uses the shared secret and the MD5 algorithm for authentication and for encryption, where encryption is needed. The Radius-Access Request packet sent by the FA contains a Radius User-Name attribute (which is provided by the end system) and a Radius User-Password attribute. The value of the User-Password attribute is also a configurable value and encrypted in the way recommended by the Radius protocol. Other network specific attributes, which are non-standard attributes from the point of view of the Radius RFC standards, are encoded as vendor specific Radius attributes and sent in the Access-Request packet.

The following attributes are sent by the FA to its registration server in the Radius Access-Request packet.

1. User-Name Attribute. This is the end system's username as supplied by the end system in its registration request.
2. User-Password Attribute. This user password is supplied by the base station/wireless hub on behalf of the user. It is encoded as described in the Radius EFC using the secret shared between the base station and its registration server.
3. NAS-Port. This is the port on the base station.
4. NAS-IP-Address. This is the IP address of the base station.
5. Service-Type. This is framed service.
6. Framed Protocol. This is a PPP protocol.
7. Xtunnel Protocol Parameters. These parameters are sent by the base station to specify the parameters necessary to set up the xtunnel protocol on behalf of the end system. This is a vendor-specific attribute.
8. AP-IP-Address. This is the IP address of the AP through which the user is registering. This is a vendor-specific attribute.
9. AP-MAC-Address. This is the MAC address of the AP through which the user is registering. This is a vendor-specific attribute.
10. End system's Registration Request. The registration request from the end system is copied unchanged into this vendor specific attribute.

The following attributes are sent to the FA from the registration server in the Radius Access-Response packet.

1. Service Type. This is a framed service.
2. Framed-Protocol. This is a PPP.
3. Xtunnel Protocol Parameters. These parameters are sent by the registration server to specify the parameters necessary to set up the xtunnel protocol on behalf of the end system. This is a vendor-specific attribute.
4. Home Registration Server's Registration Reply. This attribute is sent to the FA from the home registration server. The FA relays this attribute unchanged to the end system in a registration reply packet. If there is a foreign registration server in the path, this attribute is relayed by it to the FA unchanged. It is coded as a vendor-specific attribute.

To provide service to roaming end systems, the foreign network and the home network are authenticated to each other for accounting and billing purposes using the Radius protocol for authentication and configuration. This authentication is performed at the time of end system registration. As described earlier, when the registration server in the foreign network receives a registration request from an end system (encapsulated as a vendor specific attribute in a Radius-Access Request packet by the FA), it uses the end system's User-Name to determine the identity of the end system's home registration server by consulting its home domain directory HDD. The following information is stored in home domain directory HDD and accessed by the foreign registration server in order to forward the end system's registration request.

1. Home Registration Server IP Address. This is the IP address of the home registration server to forward the registration request.
2. Foreign Registration Server Machine Id. This is the machine ID of the foreign registration server in SMTP (simplified mail transfer protocol) format (e.g., machine@fqdn where machine is the name of the foreign registration server machine and fqdn is the fully qualified domain name of the foreign registration server's domain).
3. Tunneling Protocol Parameters. These are parameters for configuring the tunnel between the serving IWF and the home IWF on behalf of the end system. These include the tunneling protocol to be used between them and the parameters for configuring the tunnel.
4. Shared Secret. This is the shared secret to be used for authentication between the foreign registration server and the home registration server. This secret is used for computing the Radius User-Password attribute in the Radius packet sent by the foreign registration server to the home registration server. It is defined between the two wireless service providers.
5. User-Password. This is the user password to be used on behalf of the roaming end system. This user password is defined between the two wireless service providers. This password is encrypted using the shared secret as described in the Radius RFC.
6. Accounting Parameters. These are parameters for configuring accounting on behalf of the end system that is registering. These parameters are sent by the registration server to its IWF for configuring accounting on behalf of the end system.

Using this information, the foreign registration server creates a Radius Access-Request, adds its own registration and authentication information into the Radius Access-Request, copies the registration information sent by the end system unchanged into the Radius Access-Request and sends the combined request to the home registration server.

Upon receiving the Radius-Access Request from the foreign registration server (for a roaming end system) or directly from the FA (for an end system at home), the home registration server consults its own directory server for the shared secrets to verify the identity of the end system and the identity of the foreign registration server in a roaming scenario by re-computing authenticators.

After processing the request successfully, the home registration server creates a Radius Access-Accept response packet and sends it to the foreign registration server if the end system is roaming, or directly to the FA from which it received the Radius Access-Request. The response contains the registration reply attribute that the FA relays to the end system.

If the request can not be processed successfully, the home registration server creates a Radius Access-Reject response packet and sends it to the foreign registration server if the end system is roaming, or directly to the FA from which it received the Radius Access-Request. The response contains the registration reply attribute that the FA will relays to the end system.

In a roaming scenario, the response from the home registration server is received by the foreign registration server. It is authenticated by the foreign registration server using the shared secret. After authenticating, the foreign registration server processes the response, and in turn, it generates a Radius response packet (Accept or Reject) to send to the FA. The foreign registration server copies the registration reply attribute from the home registration server's Radius response packet, unchanged, into its Radius response packet.

When the FA receives the Radius Access-Response or Radius Access-Reject response packet, it creates a registration reply packet using the registration reply attributes from the Radius response, and sends the reply to the end system, thus completing the round trip registration sequence.

Mobile IP standards specifies that replay protection for registrations are implemented using time stamps, or optionally, using nonces. However, since replay protection using time stamps requires adequately synchronized time-of-day clocks between the corresponding nodes, the present system implements replay protection during registration using nonces even though replay protection using time stamps is mandatory in the Mobile IP standards and the use nonces is optional. However, replay protection using time stamps as an alternative embodiment is envisioned.

The style of replay protection used between nodes is stored in the security context in addition to the authentication context, mode, secret and type of encryption.

The network supports the use of PPP PAP (password authentication) and CHAP (challenge authenticated password) between the end system and its PPP server. This is done independently of the registration and authentication mechanisms described earlier. This allows a private intranet or an ISP to independently verify the identity of the user.

Authentication for accounting and directory services is described below with respect to accounting security. Access to directory servers from network equipment in the same MSC need not be authenticated.

The network supports encryption of bearer data sent between the end system and the home IWF. End systems negotiate encryption to be on or off by selecting the appropriate security context. Upon receiving the registration request, the home registration server grants the end system's request for encryption based upon the security context. In addition to storing the authentication algorithm, mode, shared secret and style of replay protection, the security context is also used to specify the style of encryption algorithm to use. If encryption is negotiated between the end system and the home agent, then the complete PPP frame is so encrypted before encapsulation in RLP.

The IWF, the accounting server and the billing system are part of the same trusted domain in the MSC. These entities are either connected on the same LAN or part of a trusted intranet owned and operated by the wireless service provider. Transfer of accounting statistics between the IWF and the accounting server and between the accounting server and the customer's billing system may be encrypted using Internet IP security protocols like IP-Sec.

The network makes it more difficult to monitor the location of the end system because it appears that all PPP frames going to and from the end system go through the home IWF regardless of the actual location of the end system device.

Accounting data is collected by the serving IWF and the home IWF in the network. Accounting data collected by the serving IWF is sent to an accounting server in the serving IWF's MSC. Accounting data collected by the home IWF is sent to an accounting server in the home IWF's MSC. The accounting data collected by the serving IWF is used by the foreign wireless service provider for auditing and for settlement of bills across wireless service provider boundaries (to support roaming and mobility). The accounting data collected by the home IWF is used for billing the end user and also for settlement across wireless service provider boundaries to handle roaming and mobility.

Since all data traffic flows through the home IWF, regardless of the end system's location and the foreign agent's location, the home IWF has all the information to generate bills for the customer and also settlement information for the use of foreign networks.

The serving IWF and the home IWF preferably use the Radius accounting protocol for sending accounting records for registered end systems. The Radius accounting protocol is as documented in a draft IETF RFC. For the present invention, the protocol has to be extended by adding vendor specific attributes for the network and by adding check-pointing to the Radius Accounting protocol. Check-pointing in this context refers to the periodic updating of accounting data to minimize risk of loss of accounting records.

The Radius accounting protocol runs over UDP/IP and uses re-trys based on acknowledgment and time outs. The Radius accounting client (serving IWFs or home IWFs) send UDP accounting request packets to their accounting servers which send acknowledgments back to the accounting clients.

In the network, the accounting clients (serving IWF and the home IWF) emit an accounting start indication at the start of the user's session and an accounting stop indication at the end of the user's session. In the middle of the session, the accounting clients emit accounting checkpoint indications. In contrast, the Radius accounting RFC does not specify an accounting checkpoint indication. The software of the present system creates a vendor specific accounting attribute for this purpose. This accounting attribute is present in all Radius Accounting-Request packets which have Acct-Status-Type of Start (accounting start indications). The value of this attribute is used to convey to the accounting server whether the accounting record is a check-pointing record or not. Check-pointing accounting reports have a time attribute and contain cumulative accounting data from the start of the session. The frequency of transmitting check-point packets is configurable in the present invention.

The serving IWF and the home IWF are configured by their respective registration servers for connecting to their accounting servers during the registration phase. The configurable accounting parameters include the IP address and UDP port of the accounting server, the frequency of check-pointing, the session/multi-session id and the shared secret to be used between the accounting client and the accounting server.

The network records the following accounting attributes for each registered end system. These accounting attributes are reported in Radius accounting packets at the start of the session, at the end of the session and in the middle (checkpoint) by accounting clients to their accounting servers.

1. User Name. This is like the Radius User-Name attribute discussed above. This attribute is used to identify the user and is present in all accounting reports. The format is "user@domain" where domain is the fully qualified domain name of the user's home.
2. NAS IP Address. This is like the Radius NAS-IP-Address attribute discussed above. This attribute is used to identify the IP address of the machine running the home IWF or the serving IWF.
3. Radio Port. This attribute identifies the radio port on the access point providing service to the user. This attribute is encoded as a vendor specific attribute.
4. Access Point IP Address. This attribute identifies the IP address of the access point providing service to the user. This attribute is encoded as a vendor specific attribute.
5. Service Type. This is like the Radius Service-Type attribute described above. The value of this attribute is Framed.
6. Framed Protocol. This is like the Radius Framed-Protocol attribute described above. The value of this attribute is set to indicate PPP.
7. Accounting Status Type. This is like the Radius Acct-Status-Type attribute described above. The value of this attribute may be Start to mark the start of a user's session with the Radius client and Stop to mark the end of the user's session with the Radius client. For accounting clients, the Acct-Status-Type/Start attribute is generated when the end system registers. The Acct-Status-type/Stop attribute is generated when the end system de-registers for any reason. For checkpoints, the value of this attribute is also Start and the Accounting Checkpoint attribute is also present.
8. Accounting Session Id. This is like the Radius Acct-Session-Id described above. In a roaming scenario, this session id is assigned by the foreign registration server when the end system issues a registration request. It is communicated to the home registration server by the foreign registration server during the registration sequence. The home network and the foreign network both know the Acct-Session-Id attribute and are able to emit this attribute while sending accounting records to their respective accounting servers. In a "end system-at-home" scenario, this attribute is generated by the home registration server. The registration server communicates the value of this attribute to the IWF which emits it in all accounting records.
9. Accounting Multi-Session Id. This is like the Radius Acct-Multi-Session-Id discussed above. This id is assigned by the home registration server when a registration request is received from a FA directly or via a foreign registration server on behalf of an end system. It is communicated to the foreign registration server by the home registration server in the registration reply message. The registration server(s) communicates the value of this attribute to the IWF(s) which emit it in all accounting records.

With true mobility added to the architecture, the id is used to relate together the accounting records from different IWFs for the same end system if the end system moves from one IWF to another. For hand-offs across IWF boundaries, the Acct-Session-Id is different for accounting records emanating from different IWFs. However, the Acct-Multi-Session-Id attribute is the same for accounting records emitted by all IWFs that have provided service to the user. Since the session id and the multi-session id are known to both the foreign network and the home network, they are able to emit these attributes in accounting reports to their respective accounting servers. With the session id and the multi-session id, billing systems are able to correlate accounting records across IWF boundaries in the same wireless service provider and even across wireless service provider boundaries.

1. Accounting Delay Time. See Radius Acct-Delay-Time attribute.
2. Accounting Input Octets. See Radius Acct-Input-Octets. This attribute is used to keep track of the number of octets sent by the end system (input to the network from the end system). This count is used to track the PPP frames only. The air link overhead, or any overhead imposed by RLP, etc. is not counted.
3. Accounting Output Octets. See Radius Acct-Output-Octets. This attribute is used to keep track of the number of octets sent to the end system (output from the network to the end system). This count is used to track the PPP frames only. The air link overhead, or any overhead imposed by RLP, etc. and is not counted.
4. Accounting Authentic. See Radius Acct-Authentic attribute. The value of this attribute is Local or Remote depending on whether the serving IWF or the home IWF generates the accounting record.
5. Accounting Session Time. See Radius Acct-Session-Time attribute. This attribute indicates the amount of time that the user has been receiving service. If sent by the serving IWF, this attribute tracks the amount of time that the user has been receiving service from that serving IWF. If sent by the home IWF, this attribute tracks the amount of time that the user has been receiving service from the home IWF.
6. Accounting Input Packets. See Radius Acct-Input-Packets attribute.

This attribute indicates the number of packets received from the end system. For a serving IWF, this attribute tracks the number of PPP frames input into the serving IWF from an end system. For a home IWF, this attribute tracks the number of PPP frames input into the home IWF from an end system.
7. Accounting Output Packets. See Radius Acct-Output-Packets attribute. This attribute indicates the number of packets sent to the end system. For a serving IWF, this attribute tracks the number of PPP frames output by the serving IWF to the end system. For a home IWF, this attribute tracks the number of PPP frames sent to the end system from the home IWF.
8. Accounting Terminate Cause. See Radius Acct-Terminate-Cause attribute. This attribute indicates the reason why a user session was terminated. In addition, a specific cause code is also present to provide additional details. This attribute is only present in accounting reports at the end of the session.

9. Network Accounting Terminate Cause. This attribute indicates a detailed reason for terminating a session. This specific attribute is encoded as a vendor specific attribute and is only reported in a Radius Accounting attribute at the end of session. The standard Radius attribute Acct-Terminate-Cause is also present. This attribute provides specific cause codes, not covered by the Acct-Terminate- Cause attribute.

10. Network Air link Access Protocol. This attribute indicates the air link access protocol used by the end system. This attribute is encoded as a vendor specific attribute.

11. Network Backhaul Access Protocol. This attribute indicates the backhaul access protocol used by the access point to ferry data to and from the end system. This attribute is encoded as a vendor specific attribute.

12. Network Agent Machine Name. This attribute is the fully qualified domain name of the machine running the home IWF or the serving IWF. This specific attribute is encoded in vendor specific format.

13. Network Accounting Check-point. Since the Radius accounting RFC does not define a check-point packet, the present network embodiment uses a Radius accounting start packet with this attribute to mark a check-point. The absence of a check-point attribute means a conventional accounting start packet. The presence of this attribute in a accounting start packet means a accounting check-point packet. Accounting stop packets do not have this attribute.

In the preferred embodiment, every accounting packet and the corresponding reply must be authenticated using MD5 and a shared secret. The IWFs are configured with a shared secret that are used by them for authentication during communication with their Radius accounting server. The shared secrets used by the IWFs for communicating with accounting servers are stored in the home/foreign domain directory located in the MSC. The shared secrets for accounting security are communicated to the IWFs by their registration servers during the end system registration sequence.

The accounting server software runs in a computer located in the MSC. The role of the accounting server in the system is to collect raw accounting data from the network elements (the home and the serving IWFs), process the data and store it for transfer to the wireless service provider's billing system. The accounting server does not include a billing system. Instead, it includes support for an automatic or manual accounting data transfer mechanism. Using the automatic accounting data transfer mechanism, the accounting server transfers accounting records in AMA billing format to the customer's billing system over a TCP/IP transport. For this purpose, the system defines AMA billing record formats for packet data. Using the manual transfer mechanism, customers are able to build a tape to transfer accounting records to their billing system. In order to build the tape to their specifications, customers are provided with information to access accounting records so that they may process them before writing them to tape.

Figure 22:
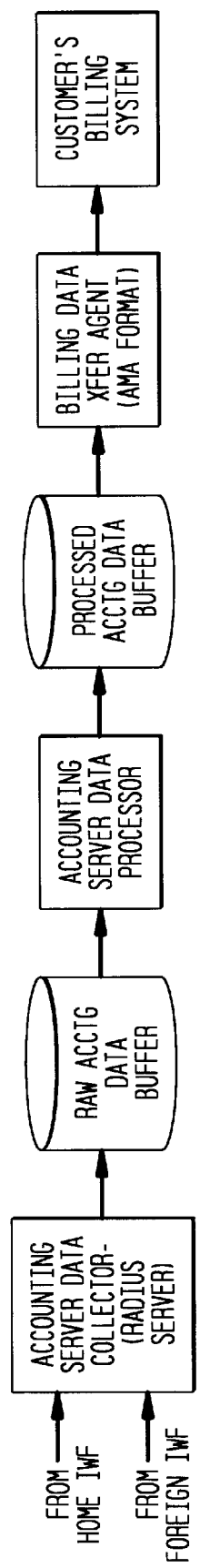
FIG. 22 is a processing flow diagram showing the processing of accounting data through to the customer billing system.

In FIG. 22, the raw accounting data received by the accounting server from the home or serving IWFs are processed and stored by the accounting server. The processing done by the accounting server includes filtering, compression and correlation of the raw accounting data received from the IWF. A high availability file server using dual active/standby processors and hot swappable RAID disks is used for buffering the accounting data while it is transiting through the accounting server.

The accounting server delays processing of the raw accounting data until an end system has terminated its session. When an end system terminates its session, the accounting server processes the raw accounting data that it has collected for the session and stores an accounting summary record in a SQL database. The accounting summary record stored in the SQL data base points to an ASN.1 encoded file. This file contains detailed accounting information about the end system's session. The data stored in the accounting server is then transferred by the billing data transfer agent to the customer's billing system. Alternatively, the wireless service provider may transfer the accounting data from the SQL database and/or the ASN.1 encoded file to the billing system via a tape. The data base scheme and the format of the ASN.1 encoded file are documented and made available to customers for this purpose. If the volume of processed accounting data stored in the accounting system exceeds a high water mark, the accounting server generates an NMS alarm. This alarm is cleared when the volume of data stored in the accounting server falls below a low water mark. The high and low water marks for generating and clearing the alarm are configurable. The accounting server also generates an NMS alarm if the age of the stored accounting data exceeds a configurable threshold. Conversely, the alarm is cleared, when the age of the accounting data falls below the threshold.

The subscriber directory is used to store information about subscribers and is located in the home network. The home registration server consults this directory during the registration phase to authenticate and register an end system. For each subscriber, the subscriber directory stores the following information.

1. User-Name. This field in the subscriber record will be in SMTP format (e.g., user@fqdn) where the user sub-field will identify the subscriber in his or her wireless home domain and the fqdn sub-field will identify the wireless home domain of the subscriber. This field is sent by the end system in its registration request during the registration phase. This field is assigned by the wireless service provider to the subscriber at the time of subscription to the network service. This field is different than the user name field used in PPP.

2. Mobility Security Association. This field in the subscriber record contains the mobility security association between the subscriber and his or her home network. As described above, a mobility security association exists between each subscriber and its home registration server. The mobility security association defines a collection of security contexts. Each security context defines an authentication algorithm, an authentication mode, a shared secret, style of replay protection and the type of encryption (including no encryption) to use between the end system and its home server. During registration, the home registration server retrieves information about the subscriber's security context from the subscriber directory using the User-Name and the security parameter index (SPI) supplied by the end system in its registration request. The information in the security context is used for enforcing authentication, encryption and replay protection during the session. The mobility security association is created by the wireless service provider at the time of subscription. It is up to the wireless service provider to permit the subscriber to modify this association either by calling up a customer service representative or by letting subscribers access to a secure Web site. The Web site software will export web pages which the wireless service provider may make accessible to subscribers from a secure web server. In this way, subscribers are able to view/modify the contents of the mobility security association in addition to other subscriber information that the service provider may make accessible.

3. Modem MAC Address. This field contains the MAC address of the modem owned by the subscriber. In addition to the shared secret, this field is used during registration to authenticate the user. It is possible to turn off MAC address based authentication on a per user basis. The MAC address is communicated to the home registration server during registration.

4. Enable MAC Address Authentication. This field is used to determine if MAC address based authentication is enabled or disabled. If enabled, the home registration server checks the MAC address of the registering end system against this field to validate the end system's identity. If disabled, then no checking is done.

5. Roaming Enabled Flag. If this field is set to enabled, then the end system is allowed to roam to foreign networks. If this field is disabled, then the end system is not permitted to roam to foreign networks.

6. Roaming Domain List. This field is meaningful only if the Roaming Enabled Flag is set to enabled. This field contains a list of foreign domains that the end system is allowed to roam to. When the contents of this list is null and the Roaming Enabled Flag is set to enabled, the end system is allowed to roam freely.

7. Service Enable/Disable Flag. This field may be set to disabled by the system administrator to disable service to a subscriber. If this field is disabled, then the subscriber is permitted to register for service. If the subscriber is registered and the value of this field is set to disabled, then the subscriber's end system is immediately disconnected by the network.

8. Internet Service Provider Association. This field contains information about the subscriber's internet service provider. This information is used by the IWF during the PPP registration phase to perform authentication with the internet service provider on behalf of the end system and also to create a L2TP tunnel between the IWF and the internet service provider's PPP server. This field contains the identity of the subscriber's ISP. The IWF uses this information to access the ISP directory for performing authentication and setting up the L2TP tunnel on behalf of the end system.

9. Subscriber's Name & Address Information. This field contains the subscriber's name, address, phone, fax, e-mail address, etc.

The home domain directory (HDD) is used by the registration server to retrieve parameters about the end system to complete registration on behalf of the end system. Using this information, the registration server determines if the end system is registering at home or if the end system is a roaming end system. In the former case, the registration server assumes the role of a home registration server and proceed with end system registration. In the latter case, the registration server assumes the role of a foreign registration server and, acting as a Radius proxy, it forwards the request to the real home registration server whose identity it gets from this directory. For roaming end system, the parameters stored in the HDD include the IP address of the home registration server, the home-foreign shared secret, the home-serving IWF tunnel configuration etc. The HDD is located in the MSC.

The following information is stored in the HDD.

1. Home Domain Name. This field is used as the key to search the HDD for an entry that matches the fully qualified home domain name provided by the end system in its registration request.

2. Proxy Registration Request. This field is used by the registration server to determine if it should act as a foreign registration server and proxy the end system's registration request to the real home registration server.

3. Home Registration Server DNS Name. If the proxy registration request flag is TRUE, this field is used to access the DNS name of the real home registration server. Otherwise, this field is ignored. The DNS name is translated to an IP address by the foreign registration server. The foreign registration server uses the IP address to relay the end system's registration request.

4. Foreign Domain Name. If the proxy registration request flag is TRUE, this field is used to identify the foreign domain name to the end system's home registration server. Otherwise, this field is ignored. The foreign registration server uses this information to create the foreign server machine id in SMTP format, for example, machine@fqdn. This machine id is sent to the home registration server by the foreign registration server in the Radius-Access Request.

5. Shared Secret. If the proxy registration request flag is TRUE, the shared secret is used between the foreign and home registration servers to authenticate their identity with each other. Otherwise this field is ignored.

6. Tunneling Protocol Parameters. This field is used to store parameters to configure the tunnels to provide service to the end system. For an end system at home, this includes information on tunnel parameters between the base station and the home IWF and from the home IWF to the PPP server. For a roaming end system, this includes tunneling parameters from the base station to the serving IWF and from the serving IWF to the home IWF. At a minimum, for each tunnel, this field contains the type of tunneling protocol to use and any tunneling protocol specific parameters. For example, this field may contain the identifier for the tunneling protocol L2TP and any additional parameters required to configure the L2TP tunnel between the IWF and its peer.

7. Accounting Server Association. This field is used to store information needed by the IWF to generate accounting data on behalf of the end system. It contains the name of the accounting protocol (e.g. RADIUS), the DNS name of the accounting server and additional parameters specific to the accounting protocol like the UDP port number, the shared secret that the IWF must use in the Radius Accounting protocol, the frequency of check-pointing, the seed for creating the session/multi-session id, etc. The accounting server's DNS name is translated to the accounting server's IP address, which is sent to the IWF.

For wireless service providers that have roaming agreements with each other, the HDD is used for authentication and to complete the registration process. If an end system roams from its home network to a foreign network, the foreign registration server in that network consults the HDD in its MSC to get information about the visiting end system's home registration and to authenticate the home network before it provides service to the visiting end system.

The software for home domain directory management preferably provides a graphical user interface (GUI) based HDD management interface for system administrators. Using this GUI, system administrators are able to view and update entries in the HDD. This GUI is not intended for use by foreign wireless network service providers to perform remote updates based on roaming agreements. It is only intended for use by trusted personnel of the home wireless service provider operating behind fire walls.

The foreign domain directory (FDD) provides functionality that is the reverse of the home domain directory. The FDD is used by the home registration server to retrieve parameters about the foreign registration server and the foreign network in order to authenticate the foreign network and create a tunnel between a serving IWF and a home IWF. These parameters include the home-foreign shared secret, the home IWF-serving IWF tunnel configuration, etc. The FDD is preferably located in the home registration server's MSC. The FDD is used by home registration servers for registering roaming end systems.

The following information will be stored in the FDD.
1. Foreign Domain Name. This field is used as the key to search the FDD for an entry that matches the fully qualified domain name of the foreign registration server relaying the registration request.
2. Shared Secret. This is the shared secret used between the foreign and home registration servers to authenticate their identity mutually with each other.
3. Home IWF-Serving IWF Tunneling Protocol Parameters. This field is used to store parameters to configure the tunnel between the home IWF and the serving IWF. At a minimum, this field contains the type of tunneling protocol to use and any tunneling protocol specific parameters. For example, this field may contain the identifier for the tunneling protocol L2TP and any additional parameters required to configure the L2TP tunnel between the serving IWF and the home IWF.
4. Accounting Server Association. This field is used to store information needed by the home IWF to generate accounting data on behalf of the end system. It contains the name of the accounting protocol (e.g. RADIUS), the DNS name of the accounting server and additional parameters specific to the accounting protocol like the UDP port number, the shared secret that the IWF must use in the Radius Accounting protocol, the frequency of check-pointing, the seed for creating the session/multisession id, etc. The accounting server's DNS name is translated to the accounting server's IP address, which is sent to the foreign agent.

For wireless service providers that have roaming agreements with each other, the FDD is used to do authentication and complete the registration process. If an end system roams from its home network to a foreign network, the registration server in the home network consults the FDD in its MSC to get information and authenticate the foreign network providing service to the end system.

The foreign domain directory management software provides a graphical user interface (GUI) based FDD management interface for system administrators. Using this GUI, system administrators are able to view and update entries in the FDD. This GUI is not intended for use by foreign wireless network service providers to perform remote updates based on roaming agreements. It is only intended for use by trusted personnel of the home wireless service provider operating behind firewalls.

The internet service provider directory (ISPD) is used by the home IWF to manage connectivity with ISPs that have service agreements with the wireless service provider so that subscribers may access their ISPs using the network. For each subscriber, the subscriber directory has an entry for the subscriber's ISP. This field points to an entry in the ISPD. The home IWF uses this information to set up the connection to the ISP on behalf of the subscriber.

The network architecture supports roaming. In order for roaming to work between wireless service providers, the architecture must support the setting up of roaming agreements between wireless service providers. This implies two things: (1) updating system directories across wireless service providers and (2) settlement of bills between service providers.

In order to allow subscribers access to internet service providers, the architecture supports roaming agreements with internet service providers. This implies that the architecture must be able to send data to and receive data from ISP PPP servers (i.e., that support industry standard protocols like PPP, L2TP and Radius). It also implies that the architecture handles directory updates for ISP access and settlement of bills with ISPs.

When roaming agreements are established between two wireless service providers, both providers have to update their home and foreign domain directories in order to support authentication and registration functions for end systems visiting their networks from the other network. At a minimum, the architecture of the present embodiment supports manual directory updates. When a roaming agreement is established between two wireless service providers, then the two parties to the agreement exchange information for populating their home and foreign domain directories. The actual updates of the directories is done manually by the personnel of the respective service providers. If later, the information in the home and foreign domain directories needs to be updated, the two parties to the agreement exchange the updated information and then manually apply their updates to the directories.

In an alternative embodiment, the directory management software incorporates developing standards in the IETF to enable roaming between internet service providers and to enable ISPs to automatically manage and discover roaming relationships. This makes manual directory management no longer necessary. The network system automatically propagates roaming relationships, and discovers them, to authenticate and register visiting end systems.

At a minimum, the network architecture just processes and stores the accounting data and makes the data available to the wireless service provider's billing system. It is up to the billing system to handle settlement of bills for roaming.

In an alternative embodiment, developing standards in the IETF to handle distribution of accounting records between internet service providers are incorporated into the network architecture to enable ISPs to do billing settlement for roaming end systems.

The system software supports access to ISPs and private intranets by supporting L2TP between the home IWF and the ISPs or intranet PPP server. The internet service provider directory contains information useful to the IWF for creating these tunnels. As access agreements between the wireless service provider and internet service providers are put in place, this directory is updated manually by the wireless service provider's personnel. Automatic updates and discovery of access relationships between the wireless service provider and internet service providers are presently contemplated and implemented as the internet standards evolve.

While accessing an internet service provider, the subscriber receives two bills—one from the wireless service provider for the use of the wireless network and the second from the internet service provider. Although common billing that combines both types of charges is not handled by the minimum embodiment software, it is contemplated that the software will take advantage of internet standards for billing settlement as they evolve so that subscribers may receive a common bill based on roaming agreements between the ISP and wireless service providers.

The system includes a element management system for managing the network elements. From the element manager, system administrators perform configuration, performance and fault/alarm management functions. The element management applications run on top of a web browser. Using a web browser, system administrators manage the network from anywhere that they have TCP/IP access. The element manager also performs an agent role for a higher level manager. In this role it exports an SNMP MIB for alarm and fault monitoring.

A higher level SNMP manager is notified of alarm conditions via SNMP traps. The higher level SNMP manager periodically polls the element manager's MIB for the health and status of the network. System management personnel at the higher level manager are able to view an icon representation of the network and its current alarm state. By pointing and clicking on the network element icon, systems management personnel execute element management applications using a web browser and perform more detailed management functions.

Inside the network, management of the physical and logical network elements is performed using a combination of the SNMP protocol and internal management application programming interfaces. Applications in the element manager use SNMP or other management APIs to perform network management functions.

Architecturally, the element management system includes two distinct sets of functional elements. The first set of functional elements, including the configuration data server, performance data monitor and health/status monitor and network element recovery software, executes on an HA server equipped with RAID disks. The second set of functional elements, including the management applications, executes on a dedicated, non-HA management system. Even if the element manager system becomes non-operational, the network elements continue to be able to run and report alarms and even be able to recover from fault conditions. However, since all the management applications execute in the non-HA element manager, if the element manager goes down, then recovery actions requiring human intervention are not possible until the element manager becomes operational.

The wireless hubs (WHs) in the base stations are typically owned by a wireless service provider (WSP), and they are connected to the WSP's registration server (RS) either via point-to-point links, intranets or the Internet. The WSP's registration server is typically a software module executing on a processor to perform certain registration functions. Inter-working function units (IWF units) are typically software modules executing on a processor to perform certain interfacing functions. IWF units are typically connected to the registration servers via intranets/WAN, and the IWF units are typically owned by the WSP. However, the IWF units need not be located within the same LAN as the registration servers. Typically, accounting and directory servers (also software modules executing on a processor) are connected to the registration servers via a LAN in the service provider's Data Center (e.g., a center including one or more processors that hosts various servers and other software modules). Traffic from the end system is then routed via a router (connected to the LAN) to the public Internet or to an ISP's intranet.

The registration server located in a foreign WSP's network is referred to as the foreign registration server (FRS), and the registration server located in the end system's home network (where the mobile purchases its service) is referred to as the home registration server (HRS). The inter-working function unit in the home network is referred to as the home IWF while the inter-working function unit in the foreign network (i.e., the network the end system is visiting) is referred to as the serving IWF.

For fixed wireless service (i.e., a non-moving end system), an end system may register for service on the home network from the home network (e.g., at home service) or from a foreign network (e.g., roaming service). The end system receives an advertisement sent by an agent (e.g., an agent function implemented in software) in the wireless hub via the access point. There are both MAC-layer registration as well as network-layer registration to be accomplished. These may be combined together for efficiency.

Figure 23:
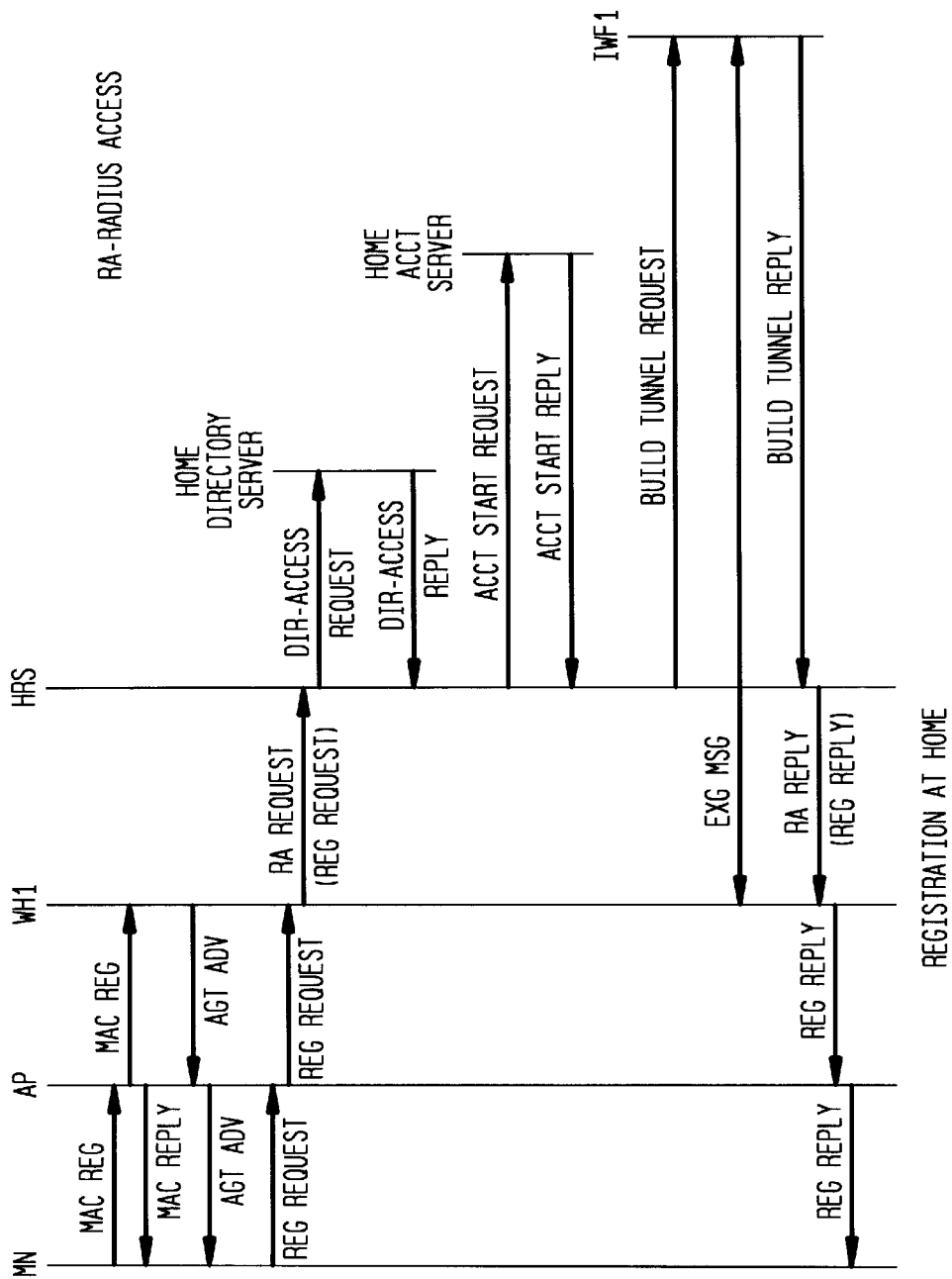
FIGS. 23 and 24 are ladder diagrams depicting the registration process for an end system in a home network and in a foreign network, respectively.

For end systems at home (FIG. 23), the network layer registration (like a local registration) make's known to the home registration server the wireless hub to which the end system is currently attached. An IWF in the end system's home network will become the anchor or home IWF. Thus, PPP frames to and from the end system travel via the wireless hub to the home IWF in the home network. If the end system is at home, the home IWF is connected to the wireless hub via an XTunnel protocol.

Figure 24:
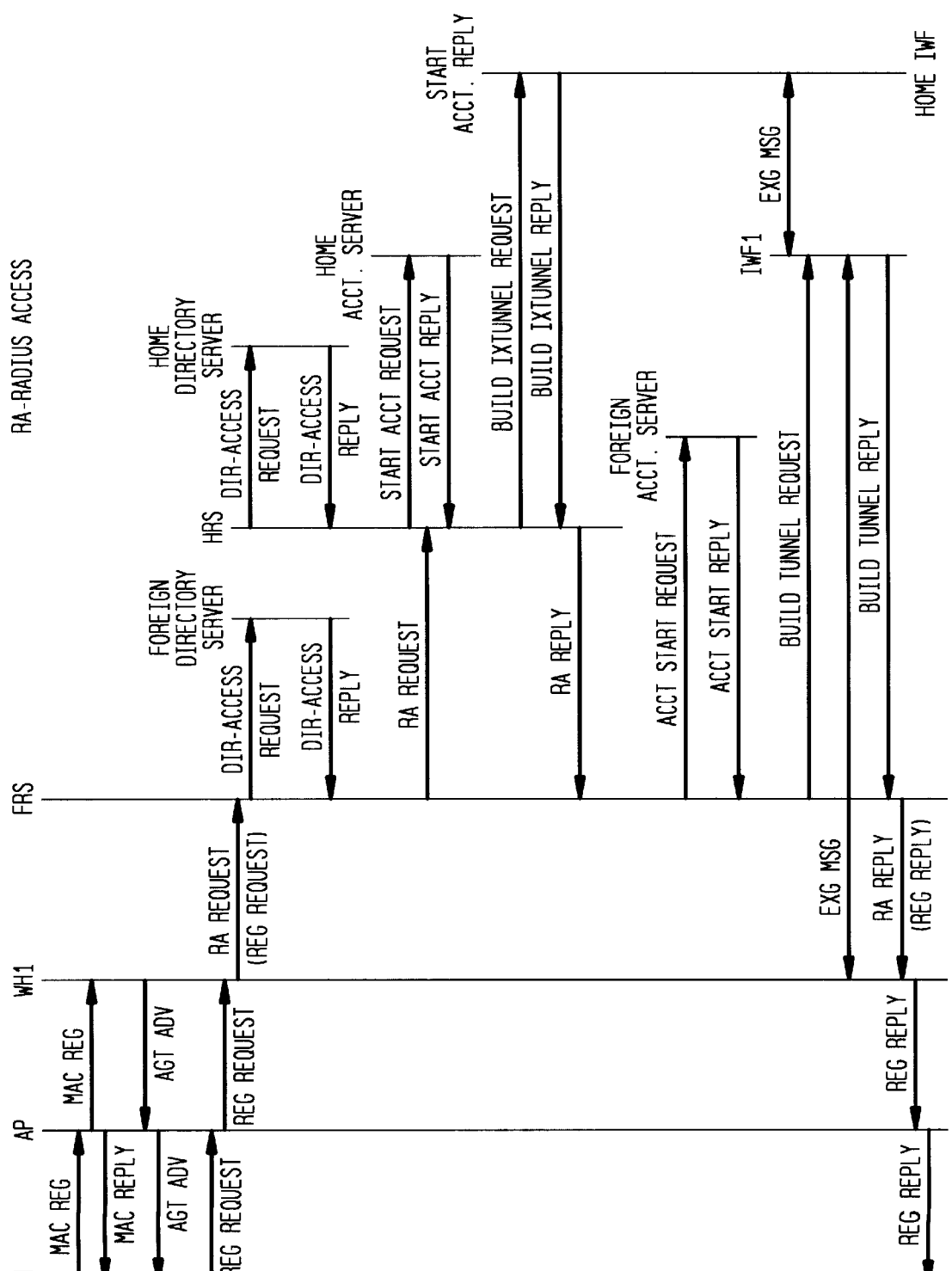

For roaming wireless service (FIG. 24), the foreign registration server determines the identity of the home network of the roaming end system during the registration phase. Using this information, the foreign registration server communicates with the home registration server to authenticate and register the end system. The foreign registration server then assigns a serving IWF, and an I-XTunnel protocol connection is established between the home IWF and the serving IWF for the roaming end system. The serving IWF relays frames between the wireless hub and the home IWF. From the home IWF, data is sent to a PPP server (i.e., point-to-point protocol server) which may reside in the same IWF. However, if the data is to go to a corporate intranet or an ISP's intranet that has its own PPP server, the data is sent to the separate PPP server via the L2TP protocol. The separate server is typically owned and operated by an Internet service provider who is different from the wireless service provider. For the duration of the session, the locations of the home IWF and PPP server remain fixed. The MAC layer registration can be combined with the network registration to economize on the overhead of separate communications for MAC layer and network layer registration; however, it may be advantageous to not combine these registration processes so that the WSP's equipment will be interoperable with other wireless networks that supports pure IETF Mobile-IP.

Registration sets up three tables. Table 1 is associated with each access point, and Table 1 identifies each connection (e.g., each end system) by a connection id (CID) and associates the connection id with a particular wireless (WM) modem address (i.e., the address of the end system or end system). Table 2 is associated with each wireless hub (WH), and Table 2 associates each connection id with a corresponding wireless modem address, access point and XTunnel id (XID). Table 3 is associated with each inter-working function (IWF), and Table 3 associates each connection id with a corresponding wireless modem address, wireless hub address, XTunnel id and IP port (IP/port). The entries described for these tables are described to include only relevant entries that support the discussion of mobility management. In reality, there are other important fields that need to be included as well.

TABLE 1

Connection Table at AP

| CID | WM |
|---|---|
| C1 | WM1 |
| C2 | WM1 |
| C1 | WM2 |

TABLE 2

Connection Table at WH

| CID | WM | AP | XID |
|---|---|---|---|
| C1 | WM1 | AP1 | 5 |
| C2 | WM1 | AP1 | 5 |
| C1 | WM2 | AP1 | 6 |
| C1 | WM3 | AP2 | 7 |

TABLE 3

Connection Table at IWF

| CID | WM | WH | XID | IP/Port |
|---|---|---|---|---|
| C1 | WM1 | WH1 | 5 | IP1/P1 |
| C2 | WM1 | WH1 | 5 | 1P1/P2 |
| C1 | WM2 | WH1 | 6 | 1P2/P3 |
| C1 | WM3 | WH1 | 7 | 1P3/P1 |
| C5 | WM5 | WH2 | 8 | 1P4/P1 |

Figure 25:
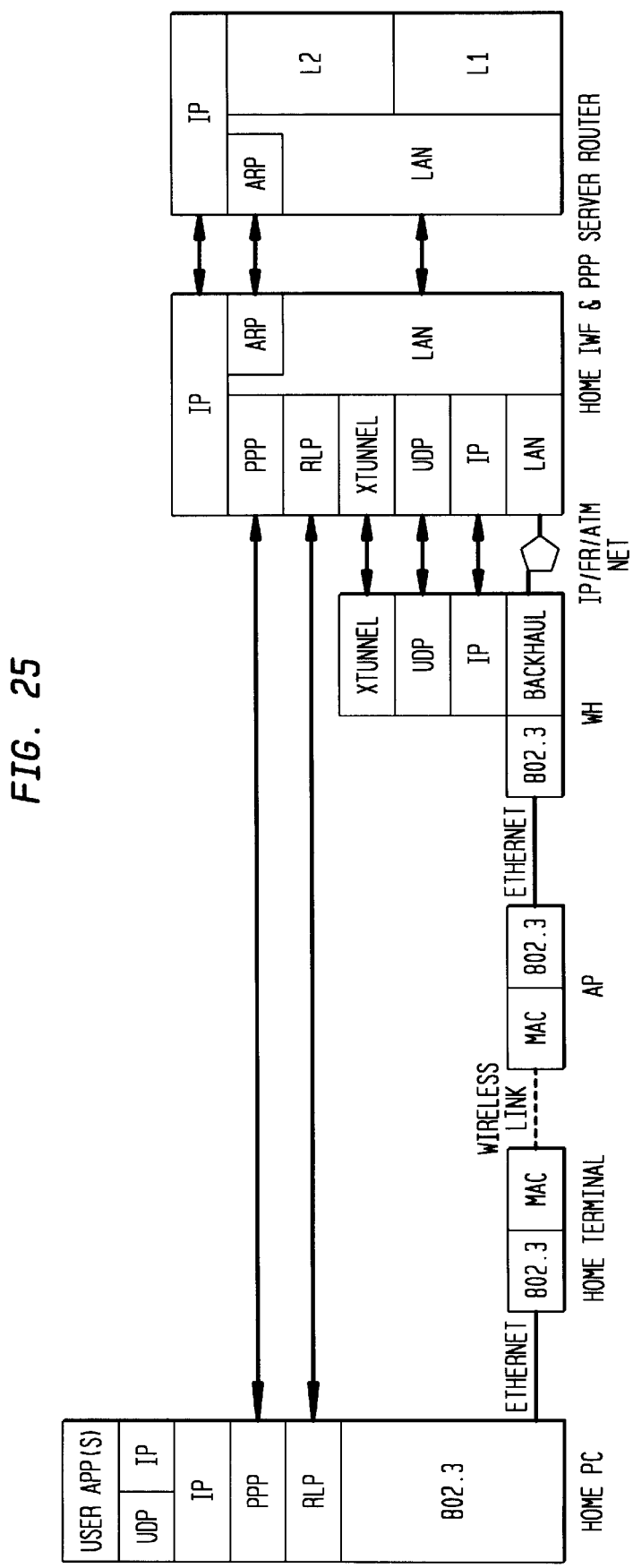
FIGS. 25 and 26 are protocol stack diagrams depicting an end system connection in a home network where a PPP protocol terminates in an inter-working function of the home network and where the PPP protocol terminates in an ISP or intranet, respectively.
Figure 26:
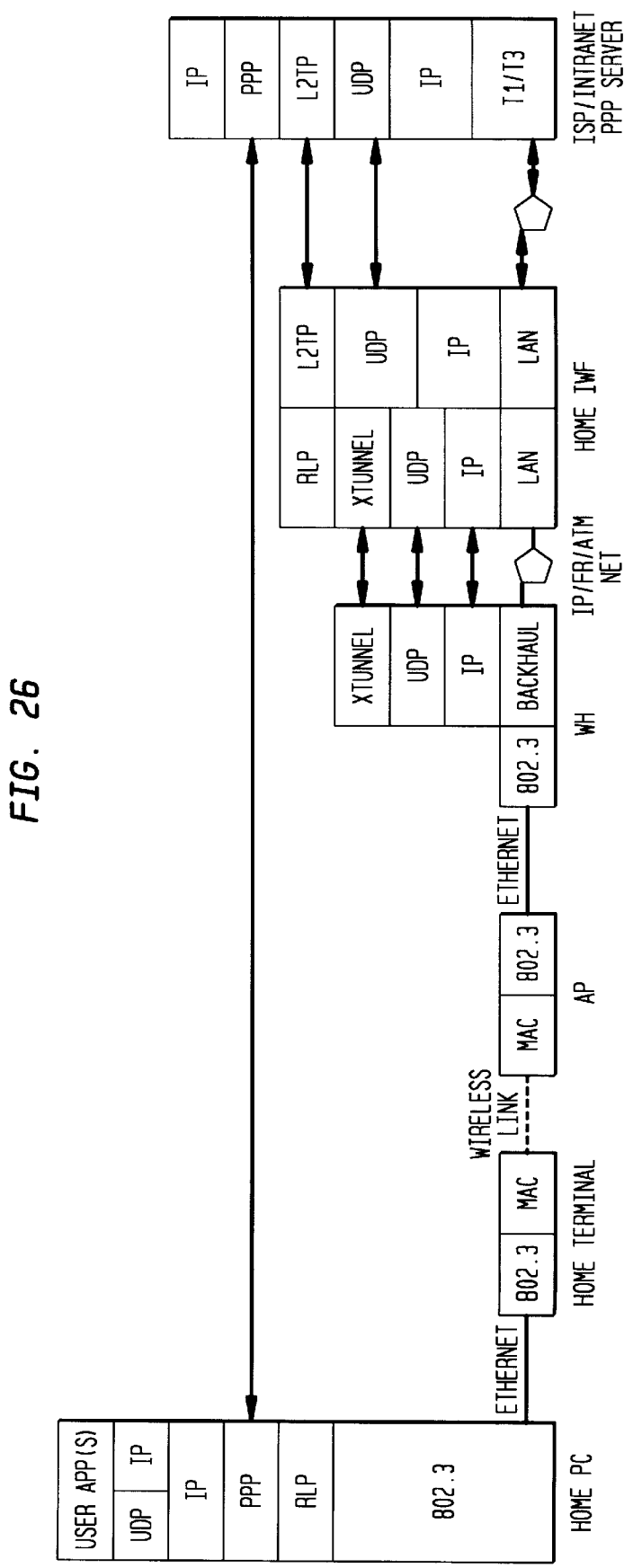
Figure 27:
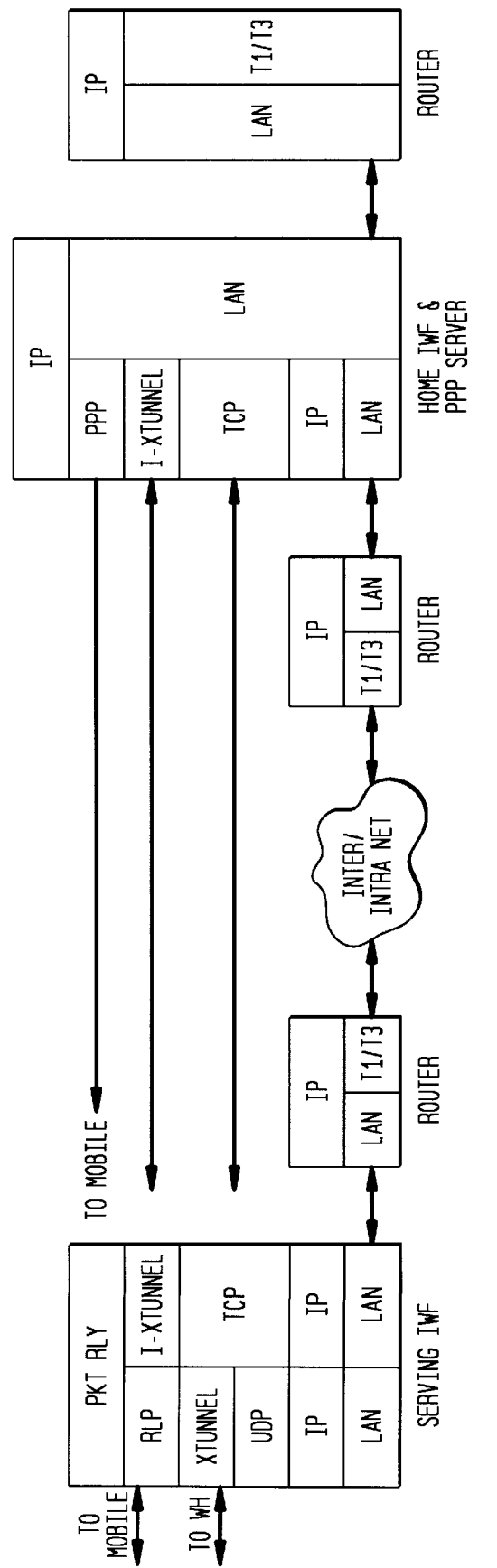
FIGS. 27 and 28 are protocol stack diagrams depicting an end system connection in a foreign network where a PPP protocol terminates in an inter-working function of the foreign network and where the PPP protocol terminates in an ISP or intranet, respectively.
Figure 28:
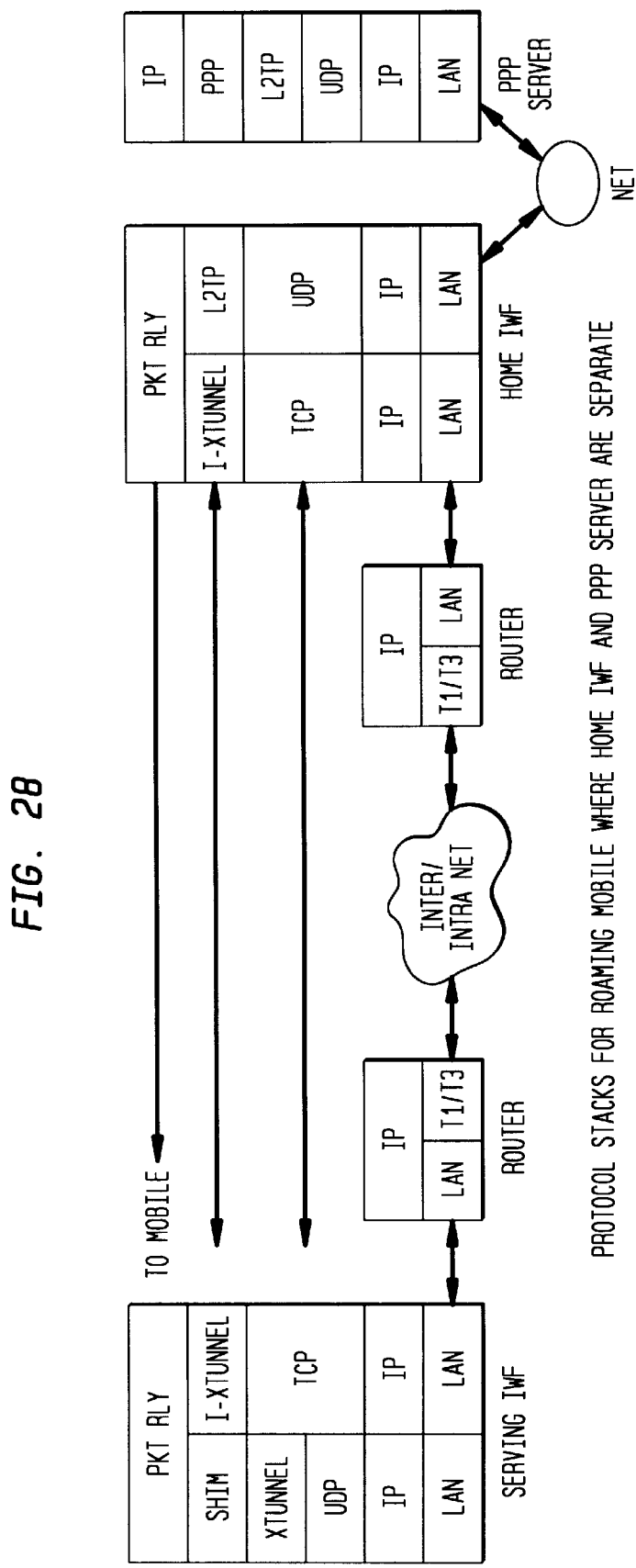

The protocol stacks for dial-up users at home in a network as well as roaming users are illustrated in FIGS. 25–28. FIG. 25 depicts protocol stacks used for direct internet access by a fixed (i.e., non-moving) end system at home where a PPP protocol message terminates in the home IWF (typically collocated with the wireless hub) which relays message to and from an IP router and from there to the public internet. FIG. 26 depicts protocol stacks used for remote intranet access (i.e., either private corporate nets or an ISP) by a fixed (i.e., non-moving) end system at home where a PPP protocol message is relayed through the home IWF (typically collocated with the wireless hub) to a PPP server of the private corporate intranet or ISP. FIG. 27 depicts protocol stacks used for direct internet access by a roaming but fixed (i.e., non-moving) or a moving end system where the PPP protocol terminates in the home IWF (typically located in a mobile switching center of the home network) which relays message to and from an IP router. In FIG. 27, note how message traffic passes through a serving IWF (typically collocated with the wireless hub) in addition to the home IWF. FIG. 28 depicts protocol stacks used for remote intranet access (i.e., either private corporate nets or an ISP) by a roaming but fixed (i.e., non-moving) or a moving end system where a PPP protocol message is relayed through the home IWF (typically located in a mobile switching center of the home network) to a PPP server of the private corporate intranet or ISP. In FIG. 28, note how message traffic passes through a serving IWF (typically collocated with the wireless hub) in addition to the home IWF. When the serving IWF and the wireless hub are co-located in the same nest of computers or are even programmed into the same computer, it is not necessary to establish a tunnel using the XTunnel protocol between the serving IWF and the wireless hub.

Equivalent variations to these protocol stacks (e.g. the RLP can be terminated at the wireless hub rather than at the serving IWF or home IWF for mobiles at home) are also envisioned. If the IWF is located far from the wireless hub, and the packets can potentially be carried over a lossy IP network between the IWF and wireless hub, then it would be preferred to terminate the RLP protocol at the wireless hub. Another variation is the Xtunnel between wireless hub and IWF need not be built on top of the UDP/IP. Xtunnels can be built using the Frame Relay/ATM link layer. However, the use of UDP/IP makes it easier to move the wireless hub and IWF software from one network to another.

Figure 29:
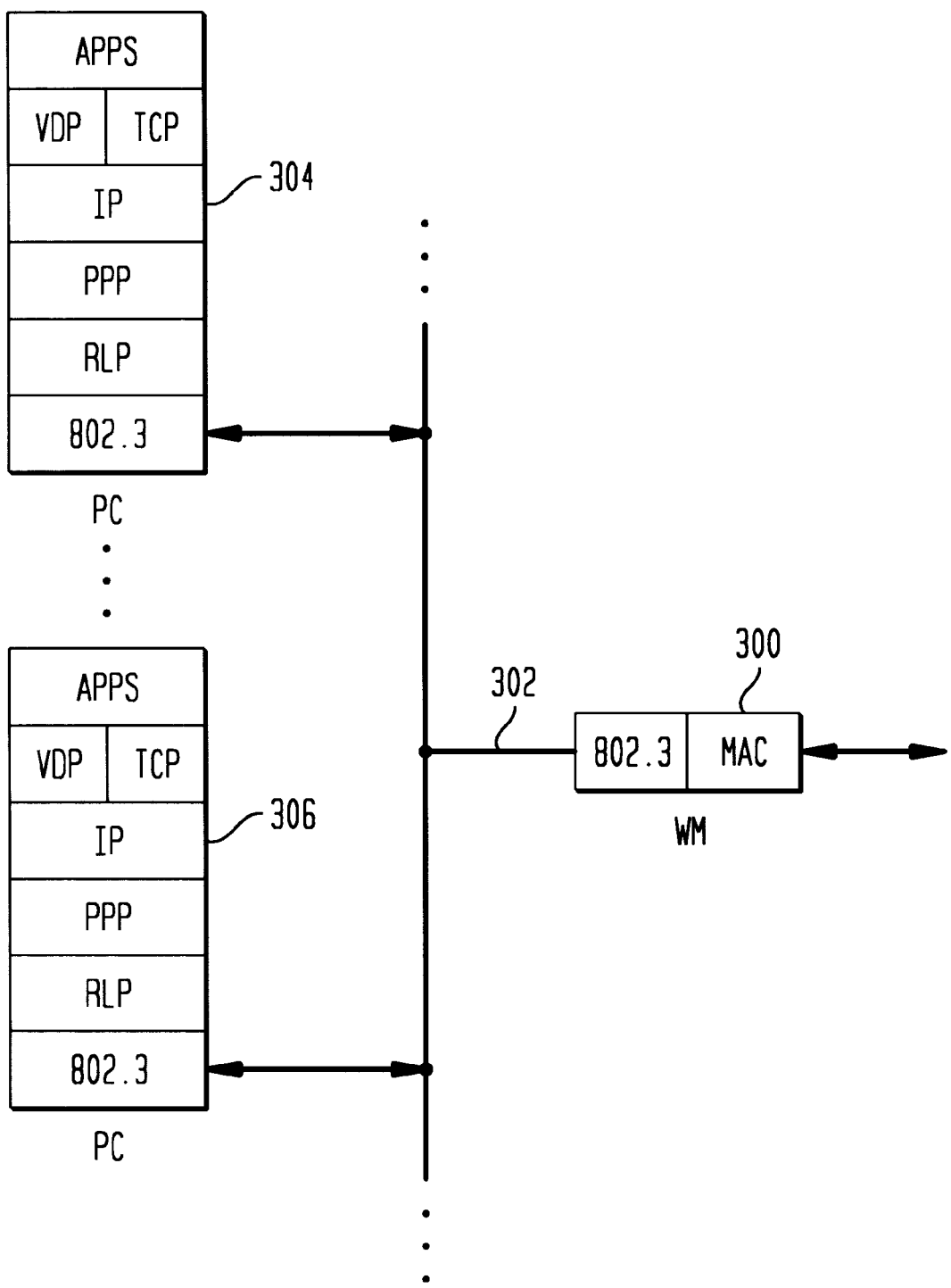
FIG. 29 illustrates end systems connected via ethernet to a wireless modem where PPP protocol is encapsulated in an ethernet frame.

Furthermore, the PPP protocol can be terminated in a wireless modem and sent to one or more endsystems via an ethernet connection. As illustrated in FIG. 29, the wireless modem 300 receives the PPP protocol information and encapsulates the PPP payload in an ethernet frame to be transported to at least one of the end systems 304 and 306 via the internet connection 302.

Figure 30:
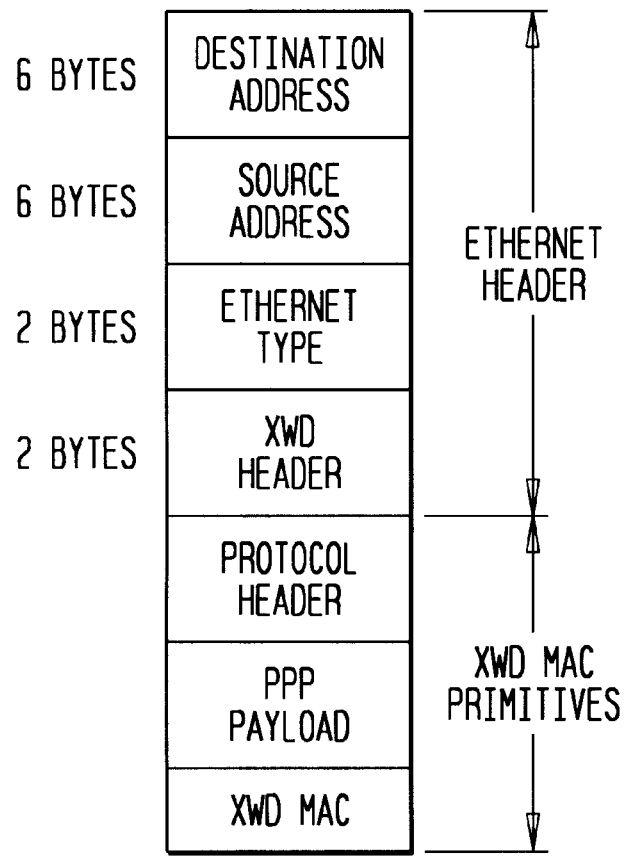
FIG. 30 illustrates an ethernet frame format.

DIX ethernet can be used for encapsulating the XWD MAC primitives but the invention is not limited thereto. The ethernet frame format for XWD control frames is illustrated in FIG. 30. The ethernet header contains a destination address, a source address and an ethernet type field. The destination address field contains the ethernet address of the MAC entity to which the primative is being sent. For MAC primitives invoked by the MAC user, this field will contain the ethernet address of the MAC user. For broadcast primitives, this address will be the ethernet broadcast address. The source address field contains the ethernet address of the MAC entity invoking the primitive. The ethernet type field contains the ethernet type for XWD. Possible values are XWD_Control for control frames and XWD_Data for data frames. These values must be different from all the ethernet type values that have been stnadardized and must be registered with the controlling authority.

Figure 31:
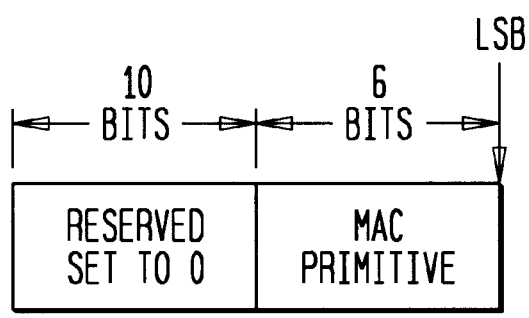
FIG. 31 illustrates XWD Header fields.

The ethernet frame then has an XWD header field. The XWD header can be 16 bits long and will only be present for XWD control frames. The fields are illustrated in FIG. 31. The ethernet frame also contains a protocol header, a PPP payload field and a XWD MAC field. The header values for primitives using ethernet encapsulation are illustrated in Table 4 below.

| Primitive Name | Destination Address | Source Address | Ethernet Type | XWD MAC Primitive |
|---|---|---|---|---|
| M_Discover.Req | Broadcast or unicast MAC Providider | MAC User | XWD_Control | 0 |
| M_Discover.Cnf | MAC User | MAC Provider | XWD_Control | 1 |
| M_OpenSap.Req | MAC Provider | MAC User | XWD_Control | 2 |
| M_OpenSap.Cnf | MAC User | MAC Provider | XWD_Control | 3 |
| M_CloseSap.Req | MAC Provider | MAC User | XWD_Control | 4 |
| M_CloseSap.Cnf | MAC User | MAC Provider | XWD_Control | 5 |
| M_EchoSap.Req | MAC User | MAC Provider | XWD_Control | 6 |
| M_EchoSap.Cnf | MAC Provider | MAC User | XWD_Control | 7 |
| M_Connect.Req | MAC Provider | MAC User | XWD_Control | 8 |

-continued

| Primitive Name | Destination Address | Source Address | Ethernet Type | XWD MAC Primitive |
|---|---|---|---|---|
| | (modem only) | (end system only) | | |
| M_Connect.Ind | MAC User (wireless hub only) | MAC Provider (AP only) | XWD_Control | 9 |
| M_Connect.Rsp | MAC Provider (AP only) | MAC User (wireless hub only) | XWD_Control | 10 |
| M_Connect.Cnf | MAC User (end system only) | MAC Provider (modem only) | XWD_Control | 11 |
| M_Disconect.Req | MAC Provider | MAC User | XWD_Control | 12 |

Figure 32:
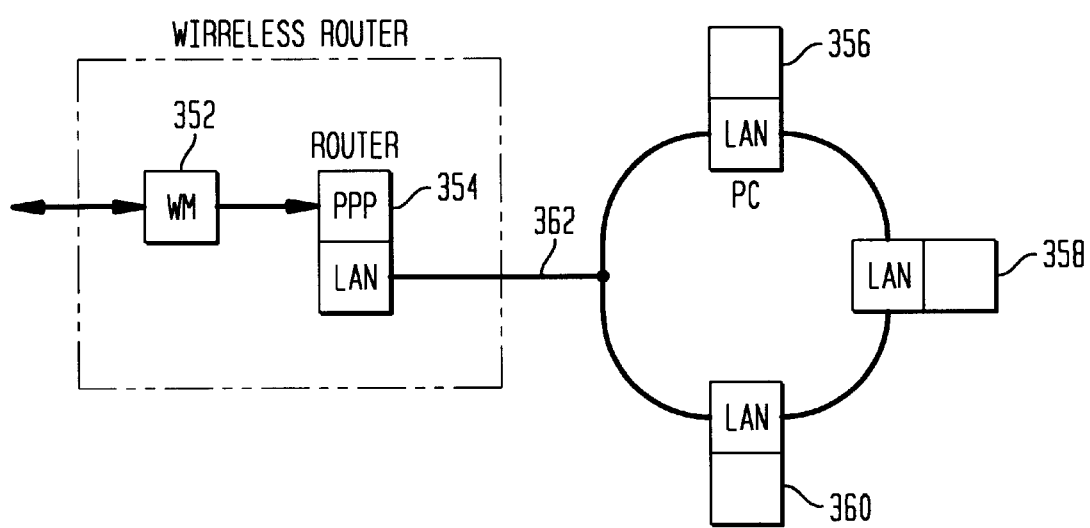
FIG. 32 illustrates end systems connected via a local area network to a wireless router where PPP protocol terminates at the wireless router.

In another alternative, the PPP protocol can be terminated in a wireless router and then sent on to at least one end system connected to a local area network (LAN). As illustrated in FIG. 32, the wireless router 350 receives the PPP protocol information via the wireless modem 352. The router 354 receives the PPP information from the wireless modem 352 and sends the PPP information to at least one of the end systems 356, 358, 360 via a LAN link 362.

Four types of handoff scenarios may occur, and they are labeled: (i) local mobility, (ii) micro mobility, (iii) macro mobility, and (iv) global mobility. In all four scenarios (in one embodiment of the invention), a route optimization option is not considered so that the locations of the home registration server and the ISP's PPP server do not change. In another embodiment of the system with route optimization, the ISP's PPP server may change. However, this aspect is discussed below. In addition, the locations of the foreign registration server and IWF do not change in the first three scenarios.

The proposed IETF Mobile IP standard requires that whenever an end system changes the IP subnet to which it is attached, it sends a registration request message to a home agent in its home subnet. This message carries a care-of address where the end system can be reached in the new subnet. When traffic is sent, for example, from an ISP to an end system, the home agent intercepts the traffic that is bound for the end system as it arrives in the home subnet, and then forwards the traffic to the care-of address. The care-of address identifies a particular foreign agent in the foreign subnet. An end system's foreign agent can reside in the end system itself, or in a separate node that in turn forwards traffic to the end system (i.e., proxy registration agent). Mobile IP handoffs involve exchange of control messages between an end system's agent, the end system's home agent and potentially its corresponding hosts (CHs) (with route optimization option).

The proposed IETF Mobile IP standard would find it difficult to meet the latency and scalability goals for all movements in a large internetwork. However, the present hierarchical mobility management meets such goals. For small movements (e.g. a change of Access Points), only MAC-layer re-registrations are needed. For larger movements, network-layer re-registrations are performed. The present hierarchical mobility management is different from the flat-structure used in the IETF proposed Mobile-IP standard as well as the serving/anchor inter-working function model used in cellular systems like CDPD (based on a standard sponsored by the Cellular Digital Packet Data forum).

Figure 33:
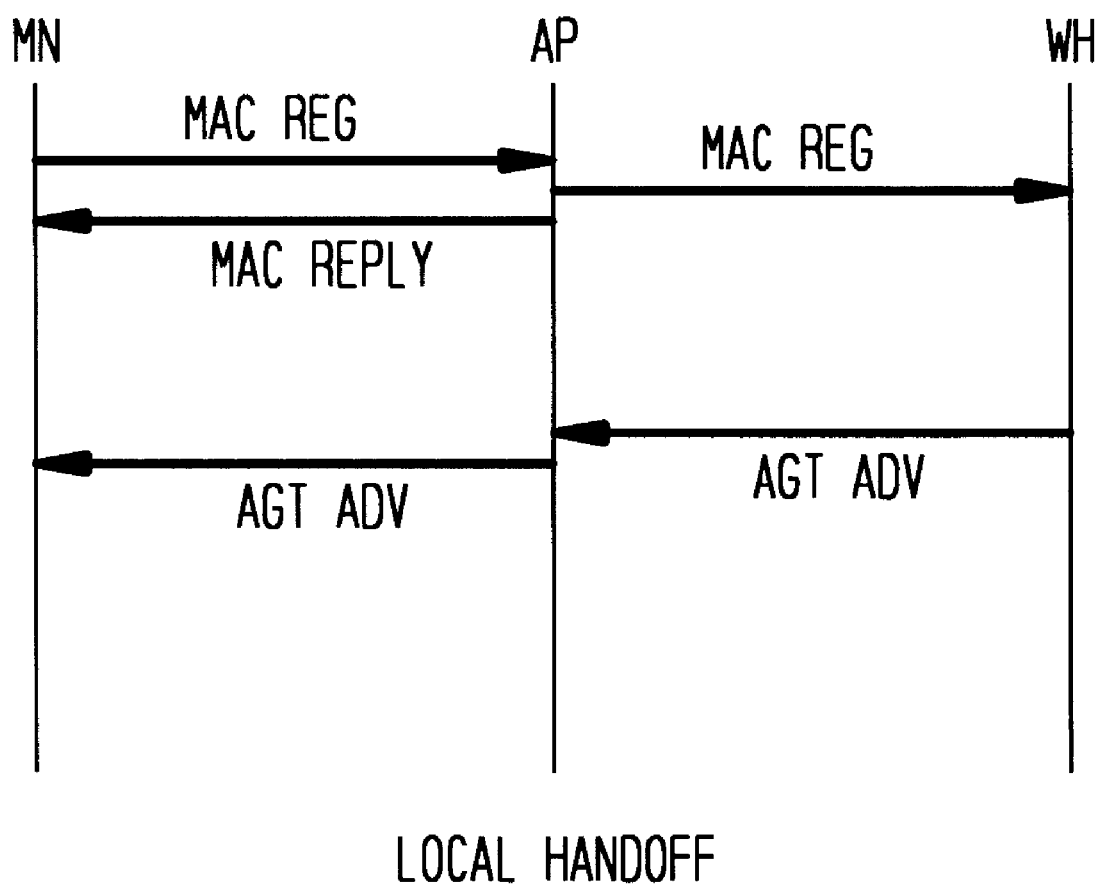
FIGS. 33, 34 and 35 are ladder diagrams depicting a local handoff scenario, a micro handoff scenario and a macro handoff scenario, respectively.

As depicted in FIG. 33, the local mobility handoff handles end system (designated MN for mobile node) movement between APs that belong to the same wireless hub. Thus, only MAC layer re-registration is required. The end system receives a wireless hub advertisement from a new AP and responds with a registration request addressed to the new AP.

The new AP (i.e., the one that receives the registration request from the end system) creates new entries in its connection table and relays the registration message to its wireless hub. In local mobility handoffs, the wireless hub does not change. The wireless hub recognizes the end system's registration request as a MAC level registration request, and it updates its connection table to reflect the connection to the new AP. Then, the old AP deletes the connection entry from its connection table. There are at least three ways whereby the old AP can delete the old entries, namely (i) upon time out, (ii) upon receiving a copy of the relayed MAC layer association message from the new AP to the wireless hub (if this relay message is a broadcast message), and (iii) upon being informed by the wireless hub of the need to delete the entry.

Figure 34:
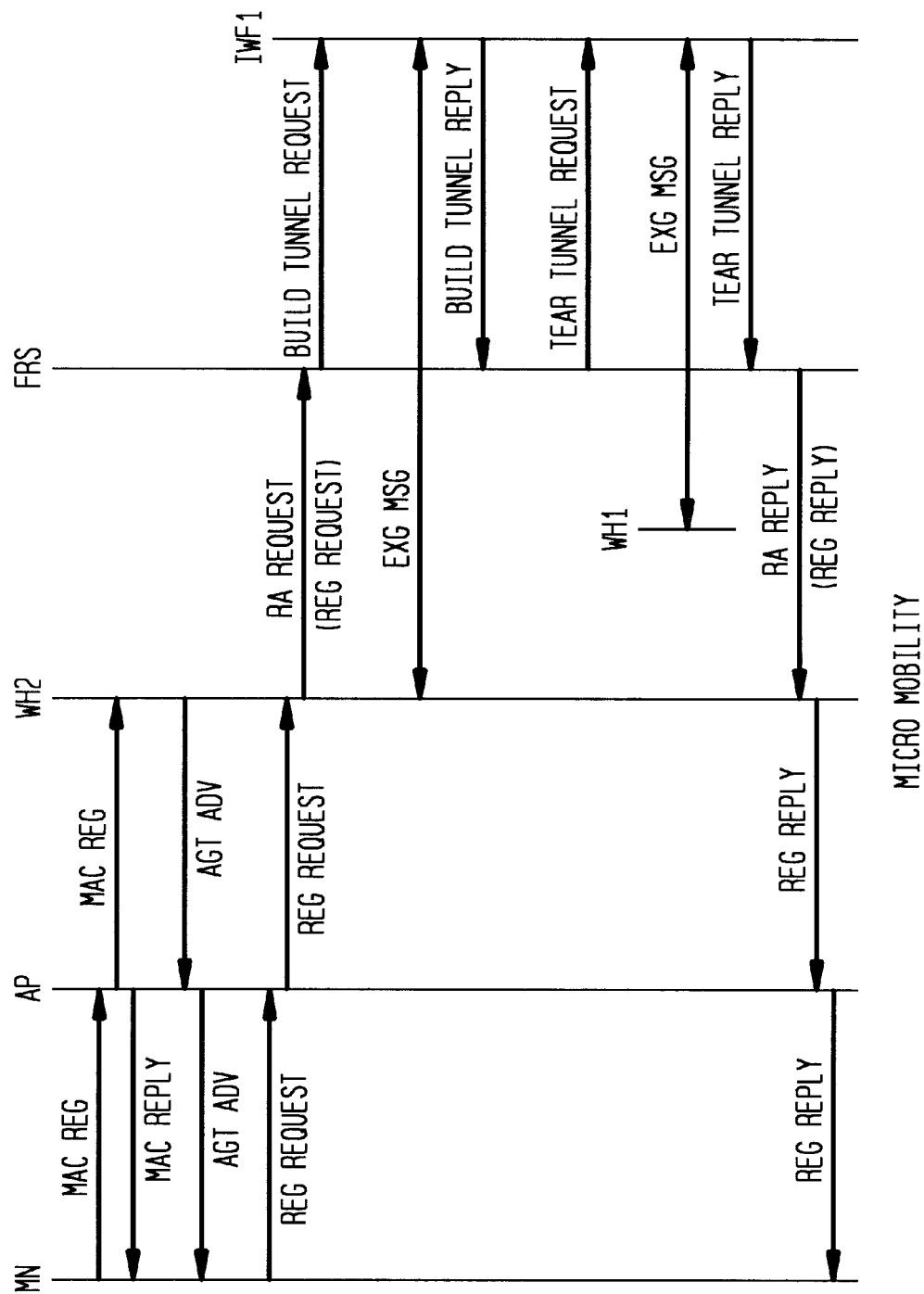

As depicted in FIG. 34, the micro mobility handoff handles end system (designated MN for mobile node) movement between wireless hubs that belong to the same registration server and where the end system can still be served by the existing serving IWF. When an advertisement is received from a new wireless hub (through a new AP), the end system sends a message to request registration to the registration server. The registration request is relayed from the new AP to the new wireless hub to the registration server.

When the registration server determines that the existing IWF can still be used, the registration server sends a build XTunnel Request message to request the existing IWF to build an XTunnel to the new wireless hub. Later, the registration server sends a tear down XTunnel request message to request the existing IWF to tear down the existing XTunnel with the old wireless hub. The build and tear XTunnel Request messages can be combined into one message. A foreign registration server does not forward the registration message to the home registration server since there is no change of IWF, either the serving IWF or home IWF.

Upon receiving a positive build XTunnel reply and a positive tear XTunnel reply from IWF, the registration server sends a registration reply to end system. As the registration reply reaches the new wireless hub, the connection table at the new wireless hub is updated to reflect the connection to the new AP. The new AP updates its MAC filter address table and connection table after receiving a message from the new wireless hub, and the registration reply is forwarded to the end system.

The registration server sends a release message to the old wireless hub. When the old wireless hub receives the release message, it updates its connection table and the MAC filter address table and connection table of the old AP.

Figure 35:
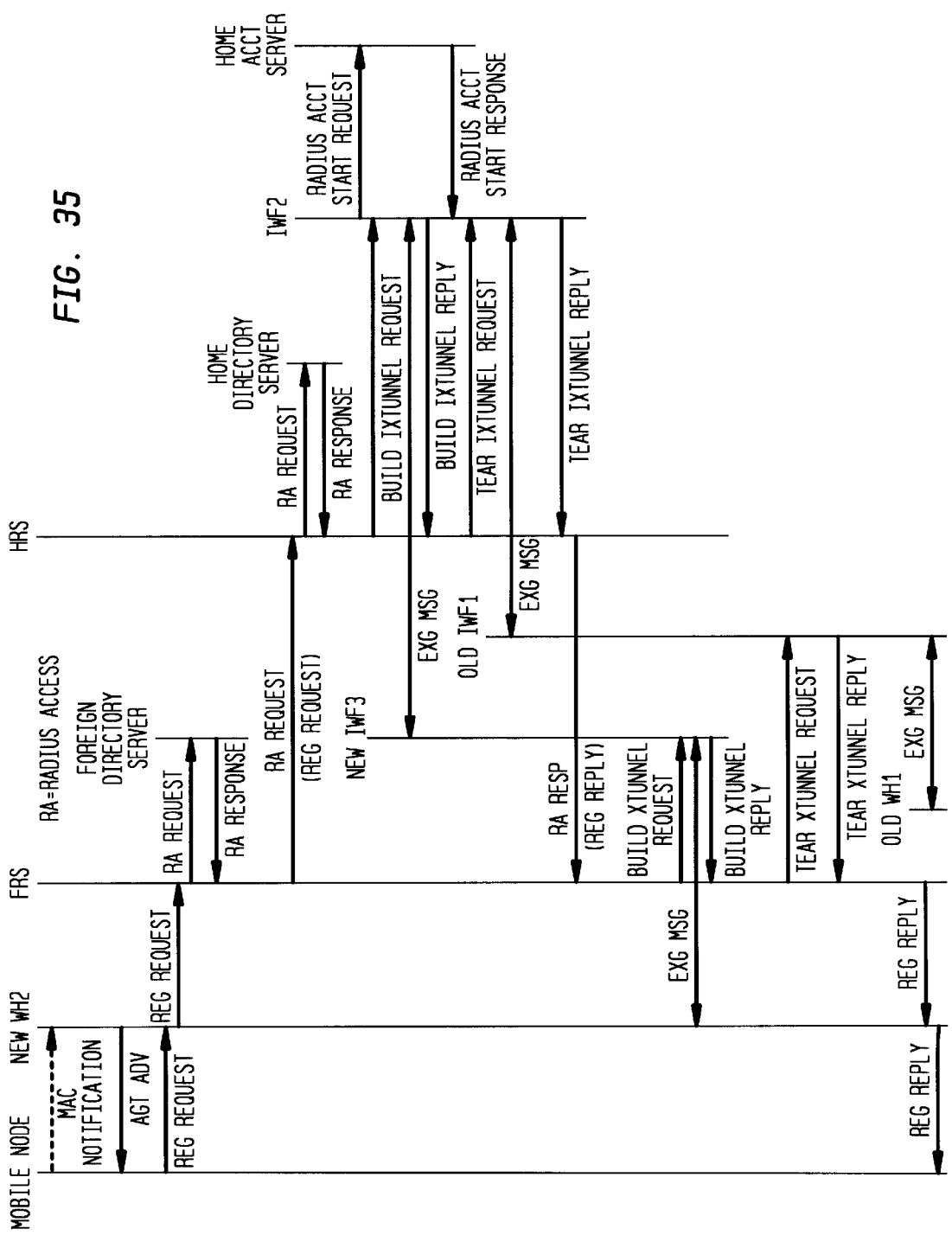

As depicted in FIG. 35, the macro mobility handoff case handles movement between wireless hubs that involves a change of the serving IWF in the foreign network, but it does not involve a change in the registration server. When an advertisement is received from a new wireless hub (through a new AP), the end system sends a message to request a network layer registration to the registration server. The registration request is relayed from the new AP to the new wireless hub to the registration server.

The registration server recognizes that it is a foreign registration server when the end system does not belong to the present registration server's network. This foreign registration server determines the identity of the home registration server by using a request, preferably a Radius Access request (RA request), to the foreign directory server (like a big yellow pages) and then assigns an appropriate IWF to be the serving IWF, and it forwards a registration request to the home registration server, preferably through a Radius Access request (RA request), informing the home registration server of the newly selected IWF.

The home registration server authenticates the registration request by using a request, preferably a Radius Access request (RA request), to the home directory server. Upon authenticating the request and determining that the existing home IWF can still be used, the home registration server instructs the home IWF to build a new I-XTunnel to the newly assigned serving IWF and to tear down the existing I-XTunnel to the old serving IWF. Upon receiving a positive build I-XTunnel reply and a positive tear I-XTunnel reply from the home IWF, the home registration server sends a registration reply to the foreign registration server.

The foreign registration server then instructs the newly assigned IWF to build an XTunnel to the new wireless hub. Upon receiving a positive build XTunnel reply, the foreign registration server instructs the old IWF to tear down the XTunnel to the old wireless hub. Upon receiving a positive build XTunnel reply and a positive tear XTunnel reply, the foreign registration server sends a registration reply to end system.

As the registration reply reaches the new wireless hub, the connection table at the new wireless hub is updated to reflect the connection to the new AP. The new AP updates its MAC filter address table and connection table after receiving a message from the new wireless hub, and the registration reply is forwarded to the end system.

The registration server sends a release message to the old wireless hub. When the old wireless hub receives the release message, it updates its connection table and the MAC filter address table, and the old AP updates its MAC filter address table and connection table after receiving a message from the old wireless hub.

Figure 36:
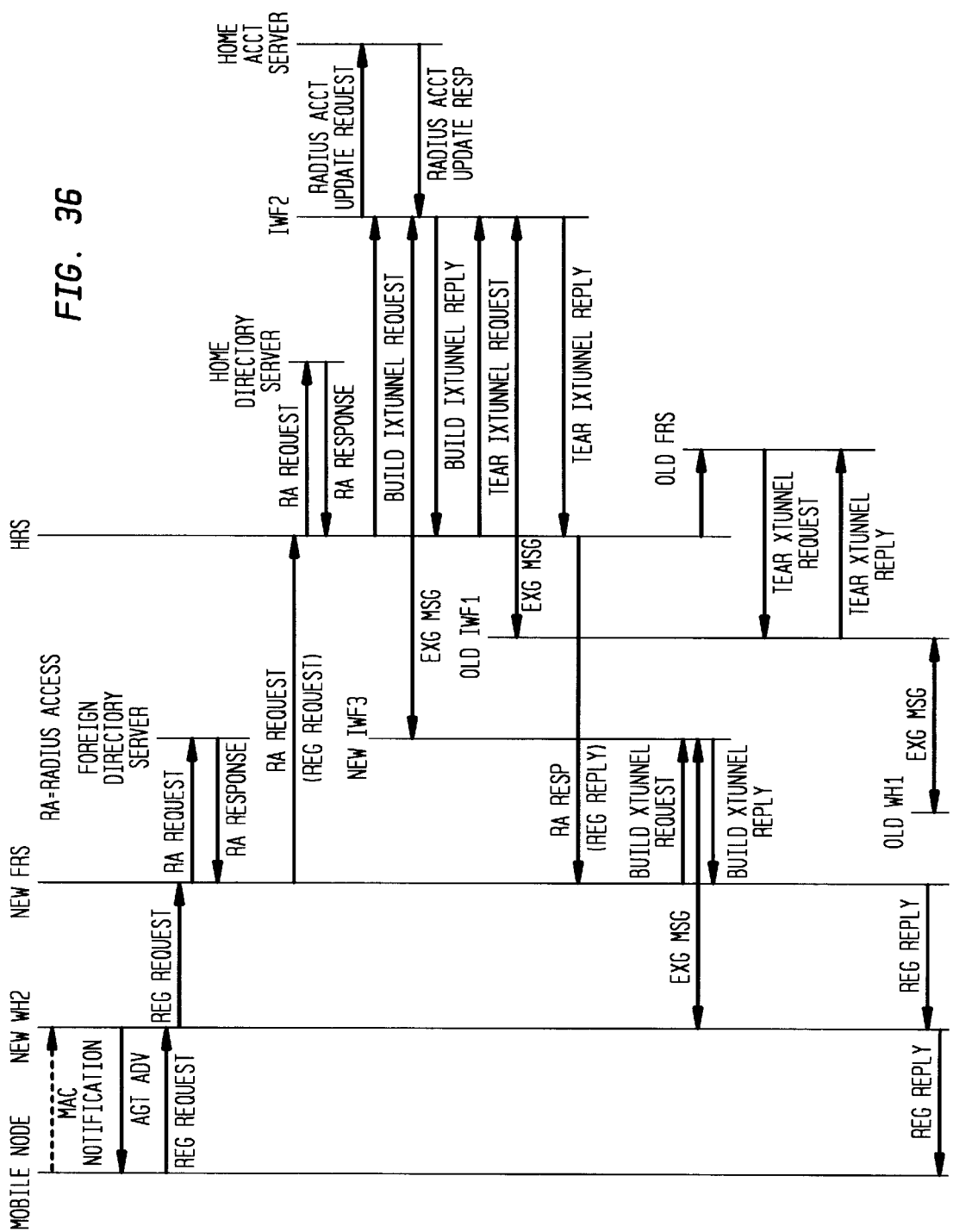
FIG. 36 is a ladder diagram depicting a global handoff scenario where the foreign registration server changes and where home inter-working function does not change.
Figure 37:
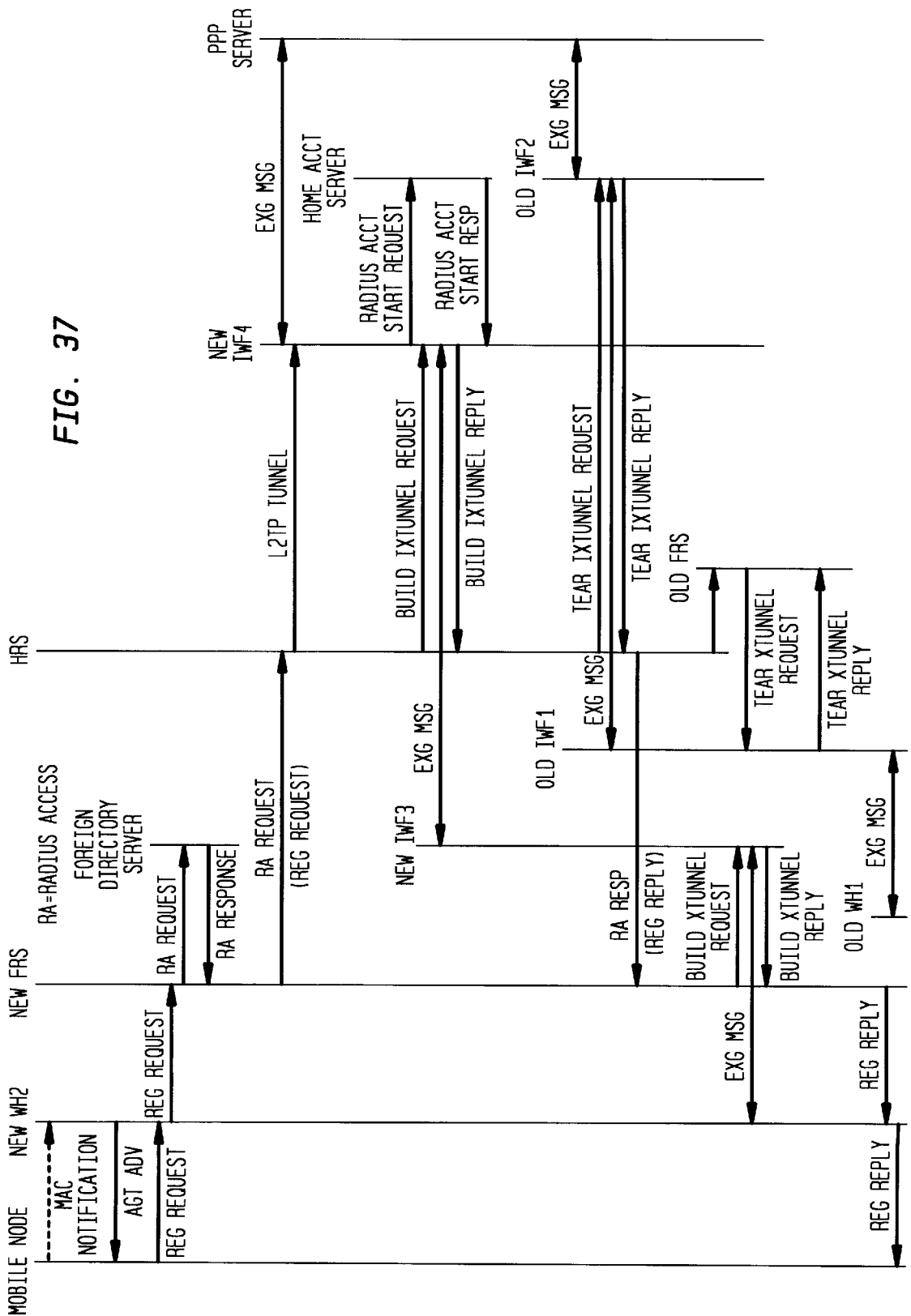
FIG. 37 is a ladder diagram depicting a global handoff scenario where both the foreign registration server and the home inter-working function change.

The global mobility handoff case handles movement between wireless hubs that involves a change of registration servers. FIG. 36 depicts a global mobility handoff where the home IWF does not change, and FIG. 37 depicts a global mobility handoff where the home IWF changes. When an advertisement is received from a new wireless hub (through a new AP) in a new foreign network, the end system sends a message to request a network layer registration to the new foreign registration server. The registration request is relayed from the new AP to the new wireless hub to the new foreign registration server.

The registration server recognizes that it is a new foreign registration server when the end system does not belong to the present registration server's network. This foreign registration server determines the identity of the home registration server by using a request, preferably a Radius Access request (RA request), to the foreign directory server (like a big yellow pages) and then assigns an appropriate IWF to be the serving IWF, and it forwards the registration request to the home registration server, preferably through a Radius Access request (RA request), informing the home registration server of the newly selected IWF.

The home registration server authenticates the registration request by using a request, preferably a Radius Access request (RA request), to the home directory server. Upon authenticating the request and determining that the existing home IWF can still be used (FIG. 36), the home registration server instructs the home IWF to build a new I-XTunnel to the serving IWF newly assigned by the new foreign registration server. The home registration server also sends a de-registration message to the old foreign registration server and instructs the home IWF to tear down the existing I-XTunnel to the existing serving IWF of the old foreign network. Upon receiving a positive build I-XTunnel reply and a positive tear I-XTunnel reply from the home IWF, the home registration server sends a registration reply to the new foreign registration server.

The new foreign registration server then instructs the newly assigned IWF to build an XTunnel to the new wireless hub. Upon receiving a positive build XTunnel reply, the foreign registration server sends a registration reply to end system. As the registration reply reaches the new wireless hub, the connection table at the new wireless hub is updated to reflect the connection to the new AP. The new AP updates its MAC filter address table and connection table after receiving a message from the new wireless hub, and the registration reply is forwarded to the end system.

The old foreign registration server instructs the old IWF to tear down the XTunnel to the old wireless hub. Upon receiving a positive tear XTunnel reply or contemporaneously with the tear down XTunnel request, the old foreign registration server sends a release message to the old wireless hub. When the old wireless hub receives the release message, it updates its connection table and the MAC filter address table, and the old AP updates its MAC filter address table and connection table after receiving a message from the old wireless hub.

Alternatively, after the home registration server authenticates the registration request from the new foreign registration server and determines that the existing home IWF cannot be used (FIG. 37), the home registration server chooses a new home IWF and instructs the new home IWF to build a new level 2 tunnel protocol tunnel (L2TP tunnel) to the present PPP server (e.g., the PPP server in a connected ISP intranet). Then, the home registration server instructs the old home IWF to transfer its L2TP tunnel traffic to the new home IWF.

Then the home registration server instructs the new home IWF to build a new I-XTunnel to the serving IWF newly assigned by the new foreign registration server. The home registration server also sends a de-registration message to the old foreign registration server and instructs the home IWF to tear down the existing I-XTunnel to the existing serving IWF of the old foreign network. Upon receiving a positive build I-XTunnel reply and a positive tear I-XTunnel reply from the home IWF, the home registration server sends a registration reply to the new foreign registration server.

The new foreign registration server then instructs the newly assigned IWF to build an XTunnel to the new wireless hub. Upon receiving a positive build XTunnel reply, the foreign registration server sends a registration reply to end system. As the registration reply reaches the new wireless hub, the connection table at the new wireless hub is updated to reflect the connection to the new AP. The new AP updates its MAC filter address table and connection table after receiving a message from the new wireless hub, and the registration reply is forwarded to the end system.

The old foreign registration server instructs the old IWF to tear down the XTunnel to the old wireless hub. Upon receiving a positive tear XTunnel reply or contemporaneously with the tear down XTunnel request, the old foreign registration server sends a release message to the old wireless hub. When the old wireless hub receives the release message, it updates its connection table and the MAC filter address table, and the old AP updates its MAC filter address table and connection table after receiving a message from the old wireless hub.

End systems constructed according to the present system interoperate with networks constructed according to the proposed IETF Mobile-IP standards, and end systems constructed according to the proposed IETF Mobile-IP standards interoperate with networks constructed according to the present invention.

Differences between the present system and the IETF Mobile-IP (RFC2002, a standards document) include:

(i) The present system exhibits a hierarchical concept for mobility management rather than a flat structure as in the proposed IETT Mobile-IP standard. Small mobility within a small area does not result in a network level registration. Macro mobility involves setting up a new Xtunnel and tearing down of an existing Xtunnel. Global mobility, at the minimum, involves setting up of a new I-Xtunnel and tearing down of an existing I-Xtunnel apart from the setting up/tearing down of Xtunnel. Global mobility sometimes also involves setting up a new L2TP Tunnel and transferring of L2TP state from the existing L2TP Tunnel to the new L2TP Tunnel.

(ii) In the present invention, a user name plus a realm is used to identify a remote dial-up user rather than a fixed home address as in the case of the proposed IETF Mobile-IP standard.

(iii) In the present invention, registration and routing functions are carried out by separate entities. The two functions are carried out by the home agent in the proposed IETF Mobile IP standard, and both functions are carried out by the foreign agent in the proposed IEFT Mobile IP standard. In contrast, in an embodiment of the present invention, registration is carried out in the registration server and routing functions are carried out by both the home and foreign IWF and the wireless hub (also referred to as the access hub).

(iv) The present system utilizes three tunnels per PPP session. The XTunnel is more of a link-layer tunnel between the wireless hub and the serving IWF. The I-XTunnel between the serving IWF and the home IWF is more like the tunnel between home and foreign agents in the proposed IETF Mobile-IP standard. But it also has additional capabilities beyond the tunnels proposed by the Mobile-IP standard. The L2TP tunnel is used only when home IWF is not a PPP server. The number of these tunnels may be reduced by combining some functions in the same nodes as described earlier.

(v) In the present invention, wireless registration occurs before PPP session starts while in the proposed IETF Mobile-IP standard, Mobile-IP registration occurs after PPP session enters into the open state.

(vi) In the present invention, the network entity that advertises the agent advertisement (i.e., the wireless hub) is not on a direct link to the end systems whereas for the proposed IETF Mobile-IP standard, the agent advertisement must have a TTL of 1 which means that the end systems have a direct link with the foreign agent. In addition, the agent advertisement in the present systems not an extension to the ICMP router advertisements as in the proposed IETF Mobile-IP standard.

End systems in the present invention, should support agent solicitation. When an end system in the present system visits a network which is supporting the proposed IETF Mobile-IP standard, it waits until it hears an agent advertisement. If it does not receive an agent advertisement within a reasonable time frame, it broadcasts an agent solicitation.

In the present invention, network operators may negotiate with other networks that support the proposed IETF Mobile-IP standard such that home addresses can be assigned to the end systems of the present system that wish to use other networks. When the end system of the present system receives the agent advertisement, it can determine that the network it is visiting is not an a network according to the present system and hence uses the assigned home address to register.

For networks supporting the proposed IETF Mobile-IP standard, the PPP session starts before Mobile-IP registration, and the PPP server is assumed to be collocated with the foreign agent in such networks. In one embodiment, an SNAP header is used to encapsulate PPP frames in the MAC frames of the present system(in a manner similar to Ethernet format), and the foreign agent interprets this format as a proprietary PPP format over Ethernet encapsulation. Thus, the end system of the present system and its PPP peer can enter into an open state before the foreign agent starts transmitting an agent advertisement, and the end system of the present system can register.

To allow end systems supporting the proposed IETF Mobile-IP standard to work in networks of the type of the present invention, such mobiles are at least capable of performing similar MAC layer registrations. By making the agent advertisement message format similar to the proposed Mobile-IP standard agent advertisement message format, a visiting end system can interpret the agent advertisement and register with a wireless hub. In the present invention, registration request and reply messages are similar to the proposed IETF Mobile-IP standard registration request and reply messages (without any unnecessary extensions) so that the rest of the mobility management features of the present system are transparent to the visiting end systems.

Since end systems supporting the proposed IETF Mobile-IP standard expect a PPP session to start before Mobile-IP registration, an optional feature in wireless hubs of the present system starts to interpret PPP LCP, NCP packets after MAC-layer registrations.

To avoid losing traffic during handoffs, the mobility management of the present system exhibits the make before break concept. For local mobility, a make before break connection is achieved by turning the MAC-layer registration message relayed by the new AP to the wireless hub into a broadcast message. That way, the old AP can hear about the new registration and forward packets destined for the end system that have not been transmitted to the new AP.

For micro mobility, information about the new wireless hub is included in the Tear XTunnel message exchanged between the serving IWF and the old WH. That way, the old wireless hub can forward buffered packets to the new wireless hub upon hearing a TearXTunnel message from the serving IWF. Alternatively, the RLP layer at the IWF knows the sequence number that has been acknowledged by the old wireless hub so far.

At the same time, the IWF knows the current send sequence number of the latest packet sent to the old wireless hub. Therefore, the IWF can forward those packets that are ordered in between these two numbers to the new wireless hub before sending newer packets to the new wireless hub. The RLP layer is assumed to be able to filter duplicate packet. The second approach is probably preferable to the first approach for the old wireless hub may not be able to communicate with one another directly.

For macro mobility, the old serving IWF can forward packets to the new serving IWF, in addition to the packet forwarding done from the old wireless hub to the new wireless. All we need to do is to forward the new serving IWF identity to the new serving IWF in the tear down I-XTunnel message. Another way to achieve the same result is to let the home IWF forward the missing packets to the new serving IWF rather than asking the old serving IWF to do the job since the home IWF knows the I-XTunnel sequence number last acknowledged by the old serving IWF and the current I-XTunnel sequence number sent by the home IWF.

The method of estimating how much buffer should be allocated per mobile per AP per wireless hub per IWF such that the traffic loss between handoffs can be minimized is to let the end system for the AP for the wireless hub for the IWF estimate the packet arrival rate and the handoff time. This information is passed to the old AP of the wireless hub of the IWF to determine how much traffic should be transferred to the new AP of the wireless hub of the IWF, respectively, upon handoffs.

To achieve route optimization in the present invention, the end system chooses the PPP server closest to the serving IWF. Without route optimization, excessive transport delays and physical line usage may be experienced.

For example, an end system subscribed to a home network in New York City may roam to Hong Kong. To establish a link to a Hong Kong ISP, the end system would have a serving IWF established in a wireless hub in Hong Kong and a home IWF established in the home network in New York City. A message would then be routed from the end system (roamed to Hong Kong) through the serving IWF (in Hong Kong) and through the home IWF (in New York City) and back to the Hong Kong ISP.

A preferred approach is to connect from the serving IWF (in Hong Kong) directly to the Hong Kong ISP. The serving IWF acts like the home IWF. In this embodiment, roaming agreements exist between the home and foreign wireless providers. In addition, the various accounting/billing systems communicate with one another automatically such that billing information is shared. Accounting and billing information exchange may be implemented using standards such as the standard proposed by the ROAMOPS working group of the IETF.

However, the serving IWF must still discover the closest PPP server (e.g., the Hong Kong ISP). In the present embodiment, the foreign registration server learns of the end system's desire to connect to a PPP server (e.g., a Hong Kong ISP) when it receives a registration request from the end system. When the foreign registration server determines that the serving IWF is closer to the desired PPP server (e.g., the Hong Kong ISP) than the home IWF is, the foreign registration server instructs the serving IWF to establish an L2TP tunnel to its nearest PPP server (in contrast to the PPP server closest to the home registration server and home IWF). Then, the foreign registration server informs the home registration server that the end system is being served by the serving IWF and the foreign PPP.

In an alternative embodiment, the foreign registration server determines that the serving IWF is closer to the desired PPP server (e.g., the Hong Kong ISP) than the home IWF is, when it receives a registration request from the end system. The foreign registration server relays the registration request message to the home registration server with an attached message indicating the serving IWF information and a notification that route optimization is preferred. At the same time, the foreign registration server instructs the serving IWF to establish an L2TP tunnel to the PPP server. Upon approving the registration request, the home registration server instructs the home IWF to transfer the L2TP state to the foreign IWF.

Having described preferred embodiments of a novel network architecture with wireless end users able to roam (which are intended to be illustrative and not limiting), it is noted that modifications and variations can be made by persons skilled in the art in light of the above teachings. For example, connection links described herein may make reference to known connection protocols (e.g., IP, TCP/IP, L2TP, IEEE 802.3, etc.); however, the system contemplates other connection protocols in the connections links that provide the same or similar data delivery capabilities. Acting agents in the above described embodiments may be in the form of software controlled processors or may be other form of controls (e.g., programmable logic arrays, etc.). Acting agents may be grouped as described above or grouped otherwise in keeping with the connection teachings described herein and subject to security and authentication teachings as described herein. Furthermore, a single access point, access hub (i.e., wireless hub) or inter-working function unit (IWF unit) may provide multi-channel capability. Thus, a single access point or access hub or IWF unit may act on traffic from multiple end systems, and what is described herein as separate access points, access hubs or IWF units contemplates equivalence with a single multi-channel access point, access hub or IWF unit. It is therefore to be understood that changes may be made in the particular embodiments of the system disclosed which are within the scope and spirit of the systems defined by the appended claims.

Having thus described the system with the details and particularity required by the patent laws, what is claimed and desired protected by Letters Patent is set forth in the appended claims.

What is claimed is:

1. A coupled data network comprising:
   a foreign network that includes a foreign mobile switching center with a serving registration server;
   a home network that includes a home mobile switching center with a home registration server and a plurality of unassigned home inter-working functions;
   a first end system subscribed to the home network and operating within the foreign network, the first end system including an end registration agent to form a registration request, the end registration agent sending the registration request through the serving registration server to the home registration server, the home registration server including a module to select an active home inter-working function from the plurality of unassigned home inter-working functions based on the registration request; and
   the serving and home registration servers directly interacting in performing registration while the home inter-working functions perform message routing.

2. The network of claim 1, wherein:
   the serving inter-working function is regarded as an active serving inter-working function;
   the foreign network further includes a plurality of serving inter-working functions; and
   the serving registration server includes a module to select the active serving inter-working function from the plurality of serving inter-working functions based on the registration request.

3. The network of claim 2, wherein:
   the registration request includes quality of service information; and the home registration server includes a module to control the selection of the active home inter-working function based on the quality of service information.

4. The network of claim 3, wherein the quality of service information specifies a request for one of constant bit rate service, real time variable bit rate service, non-real time variable bit rate service, unspecified bit rate service and available bit rate service.

5. The network of claim 1, wherein the home registration server includes a module to authenticate that the foreign network is authorized to host the first end system.

6. The network of claim 1, wherein the home registration server includes a module to authenticate that the first end system is authorized to receive services of the home network.

7. The network of claim 1, wherein the serving registration server includes a module to authenticate that the first end system is a subscriber of the home network.

8. The network of claim 1, wherein:
the registration request includes service type information; and
the home registration server includes a module to control the selection of the active home inter-working function based on the service type information.

9. The network of claim 8, wherein the service type information specifies a request for one of public internet service and private intranet service.

10. The network of claim 8, wherein the service type information specifies a request for one of mobile service and fixed service.

11. The network of claim 8, wherein
the foreign network includes a foreign base station with a foreign access hub, the foreign access hub including a first serving inter-working function;
a first message being transportable between the first end system and a first communications server through a first home inter-working function and through the first serving inter-working function of the foreign access hub in the foreign base station.

12. The network of claim 11, wherein the first message is transportable from the first end system through the first home inter-working function to the first communications server.

13. The network of claim 11, wherein the first mobile end system includes a wireless modem coupleable to the foreign access hub.

14. The network of claim 11, wherein the home network includes a home mobile switching center, the first home inter-working function being included in the home mobile switching center.

15. The network of claim 11, further comprising:
a second end system subscribed to the home network and operating as a fixed end system within the home network; and
a home base station that includes a home access hub with a second home inter-working function, a second message being transportable between the second end system and a second communications server through the second home inter-working function.

16. The network of claim 11, further comprising:
a second end system subscribed to the home network and operating as a mobile end system within the home network;
a home mobile switching center having a second home inter-working function, the first home inter-working function being included in the home mobile switching center; and
a home base station that includes a home access hub with a second serving inter-working function, a second message being transportable between the second end system and a second communications server through the second serving inter-working function and through the second home inter-working function.

17. The network of claim 11, wherein the first home inter-working function includes a home accounting collection module to collect accounting data on message traffic transported through the first home inter-working function.

18. The network of claim 17, wherein:
the home network further includes a home mobile switching center that includes a home accounting server; and
the home accounting collection module includes a sub-module to periodically send accounting reports to a home accounting server.

19. The network of claim 18, wherein:
the home network further includes a home billing processor; and
the home accounting server includes a module to send accounting reports to the home billing processor, the home billing processor including a module to prepare customer bills based on the accounting reports from the home accounting server.

20. The network of claim 19, wherein:
the foreign network further includes a foreign accounting server and a foreign billing processor;
the first serving inter-working function includes a foreign accounting collection module to collect accounting data on message traffic transported through the first serving inter-working function, the foreign accounting collection module including a sub-module to periodically send accounting reports to the foreign accounting server, the foreign accounting server including a module to send accounting reports to the foreign billing processor, the foreign billing processor including a module to send accounting reports to the home billing processor, the home billing processor including a module to prepare customer bills based on the accounting reports from the foreign billing processor.

21. The network of claim 11, wherein:
the home network further includes a home billing processor;
the foreign network further includes a foreign accounting server and a foreign billing processor;
the first serving inter-working function includes a foreign accounting collection module to collect accounting data on message traffic transported through the first serving inter-working function, the foreign accounting collection module including a sub-module to periodically send accounting reports to the foreign accounting server, the foreign accounting server including a module to send accounting reports to the foreign billing processor, the foreign billing processor including a module to send accounting reports to the home billing processor, the home billing processor including a module to prepare customer bills based on the accounting reports from the foreign billing processor.

22. The network of claim 8, wherein
the foreign network includes a base station with an access hub, the access hub including a serving inter-working function, the serving inter-working function including a foreign accounting collection module,
one of the home inter-working functions including a home accounting collection module, and the end system subscribes to the wireless data network and is coupleable to the foreign access hub, the home and serving accounting collection modules collecting accounting data on message traffic transported between the end system and a communications server through the home inter-working function and through the serving inter-working function.

23. The network of claim 22, wherein the home accounting collection module includes a sub-module to collect accounting data on message traffic transported from the end system through the home inter-working function to the communications server.

24. The network of claim 22, wherein:
the foreign mobile switching center includes a foreign accounting server; and
the foreign accounting collection module includes a sub-module to periodically send accounting reports to the foreign accounting server.

25. The network of claim 22, wherein:
the home mobile switching center includes a home accounting server;
the home accounting collection module includes a sub-module to periodically send accounting reports to the home accounting server.

26. The network of claim 25, wherein:
the home network further includes a home billing processor; and
the home accounting server includes a module to send accounting reports to the home billing processor, the home billing processor including a module to prepare customer bills based on the accounting reports from the home accounting server.

27. The network of claim 26, wherein:
the foreign network further includes a foreign accounting server and a foreign billing processor;
the foreign accounting collection module includes a sub-module to collect accounting data on message traffic transported through the first serving inter-working function, the foreign accounting collection module further including a sub-module to periodically send accounting reports to the foreign accounting server, the foreign accounting server including a module to send accounting reports to the foreign billing processor, the foreign billing processor including a module to send accounting reports to the home billing processor, the home billing processor including a module to prepare customer bills based on the accounting reports from the foreign billing processor.

28. The network of claim 22, wherein:
the foreign network further includes a foreign accounting server and a foreign billing processor;
the foreign accounting collection module includes a sub-module to collect accounting data on message traffic transported through the first serving inter-working function, the foreign accounting collection module further including a sub-module to periodically send accounting reports to the foreign accounting server, the foreign accounting server including a module to send accounting reports to the foreign billing processor, the foreign billing processor including a module to send accounting reports to the home billing processor, the home billing processor including a module to prepare customer bills based on the accounting reports from the foreign billing processor.

29. The network of claim 22, wherein:
the foreign mobile switching center includes a foreign accounting server;
the home mobile switching center includes a home accounting server;
the foreign accounting collection module includes a sub-module to periodically send accounting reports to a foreign accounting server; and
the home accounting collection module includes a sub-module to periodically send accounting reports to a home accounting server.

30. The network of claim 1, wherein:
the registration request includes quality of service information; and
the home registration server includes a module to control the selection of the active home inter-working function based on the quality of service information.

31. The network of claim 30, wherein the quality of service information specifies a request for one of constant bit rate service, real time variable bit rate service, non-real time variable bit rate service, unspecified bit rate service and available bit rate service.

32. The network of claim 1, wherein
the foreign network includes a base station, the base station including an access hub with a serving inter-working function, and
a message being transportable between the end system and the home inter-working function through the serving inter-working function using a protocol that ensures in sequence delivery of data packets.

33. The network of claim 1, wherein said end system is a roaming end system.

34. The coupled data network of claim 1 further comprising:
selecting apparatus in the first end system which selects a PPP server closest to the selected inter-working function for route optimization of messages.

35. A data network coupled to a foreign network that includes a foreign mobile switching center with a serving registration server, the data network comprising:
a home network that includes a home mobile switching center with a home registration server and a plurality of unassigned home inter-working functions;
a first end system subscribed to the home network and operating within the foreign network, the first end system including an end registration agent to form a registration request, the end registration agent sending the registration request through the serving registration server to the home registration server, the home registration server including a module to select an active home inter-working function from the plurality of unassigned home inter-working functions based on the registration request; and
the serving and home registration servers directly interacting in performing registration while the home inter-working functions performing message routing.

36. The network of claim 35, wherein the home registration server includes a module to authenticate that the foreign network is authorized to host the first end system.

37. The network of claim 35, wherein the home registration server includes a module to authenticate that the first end system is authorized to receive services of the home network.

38. The network of claim 35, wherein:
the registration request includes service type information; and the home registration server includes a module to control the selection of the active home inter-working function based on the service type information.

39. The network of claim 38, wherein the service type information specifies a request for one of public internet service and private intranet service.

40. The network of claim 38, wherein the service type information specifies a request for one of mobile service and fixed service.

41. The network of claim 35, wherein:
the registration request includes quality of service information; and
the home registration server includes a module to control the selection of the active home inter-working function based on the quality of service information.

42. The network of claim 41, wherein the quality of service information specifies a request for one of constant bit rate service, real time variable bit rate service, non-real time variable bit rate service, unspecified bit rate service and available bit rate service.

43. The network of claim 41, wherein the foreign network includes a foreign base station with a foreign access hub, the foreign access hub including a first serving inter-working function, and
a first message being transportable between the first end system and a first communications server through a first home inter-working function and through the first serving inter-working function of the foreign access hub in the foreign base station.

44. The network of claim 43, wherein the first message is transportable from the first mobile end system through the first home inter-working function to the first communications server.

45. The network of claim 43, wherein the home network includes a home mobile switching center, the first home inter-working function being included in the home mobile switching center.

46. The network of claim 43, further comprising:
a second end system subscribed to the home network and operating as a fixed end system within the home network; and
a home base station that includes a home access hub with a second home inter-working function, a second message being transportable between the second end system and a second communications server through the second home inter-working function.

47. The network of claim 43, further comprising:
a second end system subscribed to the home network and operating as a mobile end system within the home network;
a home mobile switching center having a second home inter-working function, the first home inter-working function being included in the home mobile switching center; and
a home base station that includes a home access hub with a second serving inter-working function, a second message being transportable between the second end system and a second communications server through the second serving inter-working function and through the second home inter-working function.

48. The network of claim 43, wherein the first home inter-working function includes a home accounting collection module to collect accounting data on message traffic transported through the first home inter-working function.

49. The network of claim 48, wherein:
the home network further includes a home mobile switching center that includes a home accounting server; and
the home accounting collection module includes a sub-module to periodically send accounting reports to a home accounting server.

50. The network of claim 49, wherein:
the home network further includes a billing processor; and
the home accounting server includes a module to send accounting reports to the billing processor, the billing processor including a module to prepare customer bills based on the accounting reports from the home accounting server.

51. The network of claim 50, wherein:
the foreign network further includes a foreign accounting server and a foreign billing processor;
the first serving inter-working function includes a foreign accounting collection module to collect accounting data on message traffic transported through the first serving inter-working function, the foreign accounting collection module including a sub-module to periodically send accounting reports to the foreign accounting server, the foreign accounting server including a module to send accounting reports to the foreign billing processor, the foreign billing processor including a module to send accounting reports to the home billing processor, the home billing processor including a module to prepare customer bills based on the accounting reports from the foreign billing processor.

52. The network of claim 43, wherein:
the home network further includes a home billing processor;
the foreign network further includes a foreign accounting server and a foreign billing processor;
the first serving inter-working function includes a foreign accounting collection module to collect accounting data on message traffic transported through the first serving inter-working function, the foreign accounting collection module including a sub-module to periodically send accounting reports to the foreign accounting server, the foreign accounting server including a module to send accounting reports to the foreign billing processor, the foreign billing processor including a module to send accounting reports to the home billing processor, the home billing processor including a module to prepare customer bills based on the accounting reports from the foreign billing processor.

53. The network of claim 41, wherein the foreign network includes a base station with an access hub, the access hub including a serving inter-working function, the serving inter-working function including a serving accounting collection module,
one of the home inter-working function including a home accounting collection module, and
the home and serving accounting collection modules collecting accounting data on message traffic transported between the end system and a communications server through the home inter-working function and through the serving inter-working function.

54. The network of claim 53, wherein the home accounting collection module includes a sub-module to collect accounting data on message traffic transported from the end system through the home inter-working function to the communications server.

55. The network of claim 53, wherein:
the home mobile switching center includes a home accounting server;
the home accounting collection module includes a sub-module to periodically send accounting reports to the home accounting server.

56. The network of claim 55, wherein:

the home network further includes a home billing processor; and the home accounting server includes a module to send accounting reports to the home billing processor, the home billing processor including a module to prepare customer bills based on the accounting reports from the home accounting server.

57. The network of claim 56, wherein:

the foreign network further includes a foreign accounting server and a foreign billing processor;

the foreign accounting collection module includes a sub-module to collect accounting data on message traffic transported through the first serving inter-working function, the foreign accounting collection module further including a sub-module to periodically send accounting reports to the foreign accounting server, the foreign accounting server including a module to send accounting reports to the foreign billing processor, the foreign billing processor including a module to send accounting reports to the home billing processor, the home billing processor including a module to prepare customer bills based on the accounting reports from the foreign billing processor.

58. The network of claim 53, wherein:

the foreign network further includes a foreign accounting server and a foreign billing processor;

the foreign accounting collection module includes a sub-module to collect accounting data on message traffic transported through the first serving inter-working function, the foreign accounting collection module further including a sub-module to periodically send accounting reports to the foreign accounting server, the foreign accounting server including a module to send accounting reports to the foreign billing processor, the foreign billing processor including a module to send accounting reports to the home billing processor, the home billing processor including a module to prepare customer bills based on the accounting reports from the foreign billing processor.

59. The network of claim 53, wherein:

the foreign mobile switching center includes a foreign accounting server;

the home mobile switching center includes a home accounting server;

the foreign accounting collection module includes a sub-module to periodically send accounting reports to a foreign accounting server; and the home accounting collection module includes a sub-module to periodically send accounting reports to a home accounting server.

60. The network of claim 35, wherein the foreign network includes a base station that includes an access hub with a serving inter-working function, a message being transportable between the end system and the home inter-working function through the serving inter-working function using a protocol that ensures in sequence delivery of data packets.

61. The data network of claim 35 further comprising:

selecting apparatus in the first end system which selects a PPP server closest to the selected inter-working function for route optimization of messages.

62. A home network for use in a data network coupled to a foreign network that includes a foreign mobile switching center with a serving registration server, and a first end system subscribed to the home network and operating within the foreign network, the first end system including an end registration agent to form a registration request, the end registration agent sending the registration request through the serving registration server to the home registration server, comprising:

a home network that includes a home mobile switching center with a home registration server and a plurality of unassigned home inter-working functions;

the home registration server including a module to select an active home inter-working function from the plurality of unassigned home inter-working functions based on the registration request; and the serving and home registration servers directly interacting in performing registration while the home inter-working functions performing message routing.

63. The network of claim 62, wherein the home registration server includes a module to authenticate that the foreign network is authorized to host the first end system.

64. The network of claim 62, wherein the home registration server includes a module to authenticate that the first end system is authorized to receive services of the home network.

65. The home network of claim 62 further comprising:

selecting apparatus in the first end system which selects a PPP server closest to the selected inter-working function for route optimization of messages.

* * * * *